United States Patent [19]
Arnold et al.

[11] Patent Number: 5,936,860
[45] Date of Patent: Aug. 10, 1999

[54] OBJECT ORIENTED TECHNOLOGY FRAMEWORK FOR WAREHOUSE CONTROL

[75] Inventors: Vincent Davis Arnold, Dodge Center, Minn.; Alf Christian Berg, Tarnasen, Norway; Kathryn Ann Bohrer, Austin, Tex.; Thomas Karl Athos Brane, Stockholm; Tore Magnus Dahl, Hässelby, both of Sweden; Tor Michaelson, Oslo, Norway; Anders Magnus Nilsson, Hagan, Norway; Helge Odegaard, Frogner, Norway; Torbjorn Harald Osten Pernbeck, Stockholm, Sweden

[73] Assignee: International Business Machines Corporation, Armonk, N.Y.

[21] Appl. No.: 08/834,648

[22] Filed: Mar. 28, 1997

[51] Int. Cl.⁶ .............................. G06F 19/00; G06G 7/66
[52] U.S. Cl. .................................. 364/468.01; 395/200.3; 395/200.43; 395/680; 395/683; 395/701; 395/474; 707/102; 707/103
[58] Field of Search ...................... 364/468.01; 395/701, 395/683, 200.3, 200.43, 680, 474; 707/103, 102

[56] References Cited

U.S. PATENT DOCUMENTS

| | | | |
|---|---|---|---|
| 4,943,932 | 7/1990 | Lark et al. | 364/513 |
| 4,972,318 | 11/1990 | Brown et al. | 364/403 |
| 5,057,996 | 10/1991 | Cutler et al. | 364/200 |
| 5,101,364 | 3/1992 | Davenport et al. | 395/152 |
| 5,119,475 | 6/1992 | Smith et al. | 395/156 |
| 5,181,162 | 1/1993 | Smith et al. | 364/419 |
| 5,195,172 | 3/1993 | Elad et al. | 395/50 |
| 5,226,161 | 7/1993 | Khoyi et al. | 395/650 |
| 5,247,693 | 9/1993 | Bristol | 395/800 |
| 5,249,270 | 9/1993 | Stewart et al. | 395/200 |
| 5,257,384 | 10/1993 | Farrand et al. | 395/725 |
| 5,261,080 | 11/1993 | Khoyi et al. | 395/500 |
| 5,274,572 | 12/1993 | O'Neill et al. | 364/550 |

(List continued on next page.)

FOREIGN PATENT DOCUMENTS 0 459 683 A2   12/1991   European Pat. Off. .

OTHER PUBLICATIONS

Motor Age, (v 109, n9 p80(6) ., pp. 1–11, Sep. 1990.

Text of *IBM Technical Disclosure Bulletin*, vol. 37, DeBinder et al., Feb. 1994, "Results Folder Framework", pp. 431–432.

Text of *IBM Technical Disclosure Bulletin*, vol. 36, Coskun, N., Jun. 1993, "Persistent Framework Independent Record/Playback Framework", pp. 261–264.

(List continued on next page.)

*Primary Examiner*—William Grant
*Assistant Examiner*—McDieunel Marc
*Attorney, Agent, or Firm*—Martin & Associates, L.L.C.; Derek P. Martin

[57]   ABSTRACT

An object oriented framework provides a set of objects that perform warehouse control functioning and that permit a framework user to add extensions for specific processing features, thereby producing a warehouse control application program for managing the warehouse distribution system of a company. The framework includes a Product category of classes that contains product information for inventory processing, a Posting Combinations category of classes that define valid posting combinations for the general ledger, a Journals category of classes that create, process, validate, and post general ledger journals, a Bank Transactions category of classes that process bank statements, a Bank Statements and Reconciliation category of classes that reconcile bank statements with bank accounts, and a Closing category of classes that validate and close the current accounting period. These classes provide the base framework upon which an account management application program is developed by the framework user.

33 Claims, 32 Drawing Sheets

U.S. PATENT DOCUMENTS

| | | | |
|---|---|---|---|
| 5,276,775 | 1/1994 | Meng | 395/55 |
| 5,287,447 | 2/1994 | Miller et al. | 395/157 |
| 5,293,470 | 3/1994 | Birch et al. | 395/135 |
| 5,295,256 | 3/1994 | Bapat | 395/500 |
| 5,297,283 | 3/1994 | Kelly, Jr. et al. | 395/650 |
| 5,315,703 | 5/1994 | Matheny et al. | 395/164 |
| 5,367,633 | 11/1994 | Matheny et al. | 395/164 |
| 5,369,766 | 11/1994 | Nakano et al. | 395/700 |
| 5,379,430 | 1/1995 | Nguyen | 395/700 |
| 5,388,264 | 2/1995 | Tobias, II et al. | 395/650 |
| 5,390,325 | 2/1995 | Miller | 395/575 |
| 5,396,626 | 3/1995 | Nguyen | 395/700 |
| 5,398,336 | 3/1995 | Tantry et al. | 395/600 |
| 5,604,907 | 2/1997 | Conner et al. | 395/683 |
| 5,623,657 | 4/1997 | Conner et al. | 395/683 |

OTHER PUBLICATIONS

Text of *IBM Technical Disclosure Bulletin*, Baker et al., Oct. 1991, "Model View Schema", pp. 321–322.

Text of *IBM Technical Disclosure Bulletin*, Baker et al., Oct. 1991, "Office Container Class", pp. 309–310.

Text of *IBM Technical Disclosure Bulletin*, Cavendish et al., Jul. 1991, "Icon Pane Class", pp. 118–119.

Text of *IBM Technical Disclosure Bulletin*, Baker et al., Jun. 1991, "Distribution List Class", p. 159.

Text of *IBM Technical Disclosure Bulletin*, Cavendish et al., Jun. 1991, "Object–Oriented Documentation Tool", pp. 50–51.

Text of *IBM Technical Disclosure Bulletin*, Allard et al., Feb. 1990, "Object–Oriented Programming in C—the Linnaeus System", pp. 437–439.

Text of *IBM Technical Disclosure Bulletin*, vol. 38, No. 1, Jan. 1995, pp. 411–414, J. Knapman "Generating Specific Server Programs in Distributed Object–Oriented Customer Information Control System".

Text of *IBM Technical Disclosure Bulletin*, vol. 37, No. 12, Dec. 1994, pp. 19–20, Al–Karmi et al., "Events Set for Event Tracing in Distributed Object–Oriented Systems".

Text of *IBM Technical Disclosure Bulletin*, vol. 37, No. 12, Dec. 1994, pp. 375–378, Acker et al., "Automatically Generating Formatted Documentation for Object–Oriented Class Libraries".

Text of *IBM Technical Disclosure Bulletin*, vol. 37, No. 11, Nov. 1994, pp. 71–72, Behrs et al., "Device Support Framework to Support ISO DPA 10175 and POSIX 1387.4".

Text of *IBM Technical Disclosure Bulletin*, vol. 37, No. 7, Jul. 1994, pp. 145–146, Banda et al., "Exception Management Algorithm for Multi–Threaded Method Invocation".

Text of *IBM Technical Disclosure Bulletin*, vol. 37, No. 6B, Jun. 1994, pp. 553–556, Gest et al., "Portable Object–Oriented Event Manager".

Abstract for WIPO Patent Application No. WO 95/04966, F.T. Nguyen, Feb. 16, 1995, "Automatic Management of Components in Object–Oriented System".

Abstract for U.S. Patent No. 5,388,264, Milne et al., Feb. 7, 1995, "Object–Oriented Framework System for Enabling Multimedia Presentations with Routing and Editing of MIDI Information".

Abstract for WIPO Patent Application No. WO 94/23364, Heninger et al., Oct. 13, 1994, "Framework Processing Apparatus for Application Software".

Abstract for U.S. Patent No. 5,369,766, Heninger et al., Nov. 29, 1994, "Object Oriented Application Processing Apparatus".

Abstract from WIPO Patent Application No. WO 9422081, Sep. 29, 1994, "Hardware–Independent Interface for Interrupt Processing", G.O. Norman et al.

Abstract for WIPO Patent Application No. 94/19752, Anderson et al., Sep. 1, 1994, "Concurrent Framework Processing Apparatus For Two or More Users".

Abstract for WIPO Patent Application No. 94/19751, Anderson et al., Sep. 1, 1994, "Concurrent Framework Processing Apparatus For Application Users".

Abstract for WIPO Patent Application No. 94/19740, Goldsmith et al., Sep. 1, 1994 "Framework Processor of Object–Oriented Application".

Abstract for WIPO Patent Appication No. 94/15286, Goldsmith et al., Jul. 7, 1994, "Object–Oriented Framework for Object Operating System".

Abstract for WIPO Patent Application No. 94/15282, Anderson et al., Jul. 7, 1994, "Dialog System Object–Oriented System Software Platform".

Abstract for WIPO Patent Application No. 94/15281, Anderson et al., Jul. 7, 1994, "Atomic Command Object–Oriented System Software Platform".

Abstract from WIPO Patent Application No. WO 9415285, Jul. 7, 1994, "Object–Oriented Notification Framework System", D.R. Anderson et al.

Abstract for U.S. Patent No. 5,119,475, Schoen et al., Jun. 2, 1992, "Object–Oriented Framework for Menu Definition".

Abstract No. 95–091003/12, "Flexible Multi–Platform Partitioning for Computer Applications in Object Oriented System".

Abstract for WIPO Patent Application No. 95/01610, Koko et al., Jan. 12, 1995, "Object Oriented Product Structure Management in Computer–Aided Product Design".

Abstract for WIPO Patent Application No. 95/04967, Feb. 16, 1995, "Access Method to Data Held in Primary Memory Based Data Base".

Abstract for WIPO Patent Application No. 95/02219, Helgeson et al., Jan. 19, 1995, "Distributed Computation Based on Movement, Execution and Insertion of Processes in Network".

Abstract from U.S. Patent No. 5,371,891, "Object Constructions in Compiler in Object Oriented Programming Language", J. Gray et al., Dec. 6, 1994.

Abstract from EPO Patent Application No. EP 622730, "Encapsulation of Extracted Portions of Documents Into Objects", M.A. Malamud, Nov. 2, 1994.

Abstract for EPO Patent No. 619544, S. Danforth, Oct. 12, 1994, "Language–Neutral Object–Oriented Programming".

Abstract for WIPO Patent No. 94/20912, Sep. 15, 1994, "Object–Oriented System for Managing Financial Instruments".

Inspec Abstract No. C9504–7460–043, Sells et al., 1995, "Implementation of the Architecture for a Time–Domain Dynamical System Simulation in a Very High–Level Pictorial Object–Oriented".

Inspec Abstract No. C9504–7460–042, Coleman et al., 1995, "An End–To–End Simulation of A Surveillance System Employing Architecture Independence, Variable Fidelity Components and Software Reuse".

Inspec Abstract No. C9503–6140D–045, Satoh et al., 1995, "Process Algebra Semantics for a Real Time Object Oriented Programming Language".

Inspec Abstract No. C9501–7160–020, C. Le Pape, 1993, "The Cost of Genericity: Experiments With Constraint-–Based Representations of Time–Tables".

Inspec Abstract No. C9501–6140D005, S. Vinoski, 1994, "Mapping CORBA IDL Into C++".
Inspec Abstract No. C9501–7330–007, Salminen et al., 1994, "Modelling Trees Using an Object–Oriented Scheme".
Inspec Abstract No. C9412–6110B–221, Berghel et al., 1992, "A Generic Object–Oriented Concurrency Mechanism for Extensibility and Reuse of Synchronization Components".
Inspec Abstract No. B9412–6210Q–016, from Qingzhong et al., 1992, "An Object–Oriented Model for Intelligent Networks".
Inspec Abstract No. C9412–7810–003, from Jung et al., 1993, "Development of an Object–Oriented Anthropometric Database for an Ergonomic Man Model".
Inspec Abstract No. C9412–6110J–014 from Griss et al., 1994, "Object–Oriented Reuse".
Inspec Abstract No. C9411–6130B–108, from Mili et al., 1992, "Building a Graphical Interface for a Reuse–Oriented Case Tool".
Inspec Abstract No. C9411–7100–029 from C. Le Pape, 1994, "Implementation of Resource Constraints in ILOG Schedule: A Library for the Development of Constraint-–Based Scheduling Systems".
Inspec Abstract No. C9411–6115–035 from Mili et al., 1991, "SoftClass: An Object–Oriented Tool for Software–Reuse".
Inspec Abstract No. C9410–6180G–015, from Eichelberg et al., 1993, "Integrating Interactive 3D–Graphics into an Object–Oriented Application Framework".
Inspec Abstract No. B9409–6210M–025, from Hellemans et al., 1994, "An Object–Oriented Approach to Dynamic Service Descriptions".
Inspec Abstract No. C9409–6180–059, from Wang et al., 1993, "A Framework for User Customization".
Inspec Abstract No. C9408–6110B–016, from Chen et al., 1994, "An Experimental Study of Using Reusable Software Design Frameworks to Achieve Software Reuse".
Inspec Abstract No. C9408–7420–021, from Pirklbauer et al., 1994, "Object–Oriented Process Control Software".
Inspect Abstract No. C9408–6110J–011 from Gyu–Chung et al., 1993, "System Methodologies of Object–Oriented Programs".
Inspec Abstract No. C9407–7420D–045, from Desai et al., 1994, "Controller Structure Definition Via Intelligent Process Control".
Inspec Abstract No. C9407–6140D–014, from Satoh et al., 1994, "Semantics for a Real–Time Object–Oriented Programming Language".
Inspec Abstract No. C9406–6150N–015, from Schmidt et al., 1994, "The Service Configurator Framework: An Extensible Architecture for Dynamically Configuring Concurrent, Multi–Service Network Daemons".
Inspec Abstract No. C9405–6180G–031, from Woyak et al., 1993, "A Motif–Like Object–Oriented Interface Framework Using PHIGS".
Inspec Abstract No. C9403–6180–027, 1991, "An Event–Object Recovery Model for Object–Oriented User Interfaces" from Proceedings of ACMSymposium on User Interface Software & Technology.
Inspec Abstract No. C9504–6130B–049, from A. van Dam, 1995, "VR as a Forcing Function: Software Implications of a New Paradigm".
Inspec Abstract No. C9504–6150D–024, from Sheffler et al., 1995, "An Object–Oriented Approach to Nested Data Parallelism".

Inspec Abstract No. C9503–6110B–045, from Rosiene et al., 1995, "A Data Modeling Framework for Queueing Network Models".
Inspec Abstract No. 89503–8110B–023, from Mautref et al., 1995, "An Object–Oriented Framework for the Development of Interactive Decision Support Systems".
Inspec Abstract No. C9502–7160–026, from Menga et al., 1995, "An Object–Oriented Framework for Enterprise Modelling".
Inspec Abstract No. C9502–6130G–006, "Support for Enterprise Modelling in CSCW", P. Hennessy et al., 1994.
Inspec Abstract No. C9502–7810C–058, from Lin et al., 1995, "Can CAL Software Be More Like Computer Games?".
Inspec Abstract No. C9501–6115–039, from Elia et al., 1993, "G++: An Object Oriented Environment for Developing Distributed Applications".
Inspec Abstract No. C9412–7330–186 from Righter et al., 1994, "An Object–Oriented Characterization of Spatial Ecosystem Information".
Inspec Abstract No. C9412–6160J–025 from J. Iivari, 1994, "Object–Oriented Information Systems Analysis: A Comparison of Six Object–Oriented Analysis Methods".
Inspec Abstract No. C9412–6110J–006, from Lau et al., 1993, "Using SOM for Tool Integration".
Inspec Abstract No. C9411–6160J–011, from Odberg et al., 1992, "A Framework for Managing Schema Versioning in Object–Oriented Databases".
Inspec Abstract No. C9406–7490–012, "A Discrete–Event Object–Oriented Modeling Environment for Sawmill Simulation".
Inspec Abstract No. C9406–6115–048, 1993, "Constructing Multi–View Editing Environments Using MViews".
Inspec Abstract No.4664213, "Maintaining Information about Persistent Replicated Objects in a Distributed System"., 1993 IEEE Conference on Distributed Computing Systems.
Inspec Abstract No. C9406–6110J–029, "A Comparison of Object–Oriented Analysis and Design Methods", Proceedings of C++ World 1993.
Inspec Abstract No. C9406–0310F–011, 1993, "Cost–Benefit Analysis of Object–Oriented Technology".
Inspec Abstract No. C9406–6110J–007, from, J.D. Grimes, 1993, "Objects 101—An Implementation View", Proceedings of C++ World 1993.
Inspec Abstract No. 4647921, from Uhorchak et al., 1993, "An Object–Oriented Class Library for Creating Engineering Graphs Using PHIGS".
Inspec Abstract No. 4642214, from, Marshall et al., 1992, "Using VDM Within an Object–Oriented Framework".
Inspec Abstract No. 4626386, from Arora et al., 1993, "Building Diverse Environments with PCTE Workbench".
Inspec Abstract No. 4622794, from Campbell et al., 1993, "A Technique for Documenting the Framework of an Object–Oriented System".
Inspec Abstract No. 4618974, from Bowers, 1993, "Some Principles for the Encapsulation of the Behaviour of Aggregate Objects".
Inspec Abstract No. 4616931, from, Islam et al., 1993, "Uniform Co–Scheduling Using Object–Oriented Design Techniques".
Inspec Abstract No. 4613481, from Thieme et al., 1993, "Schema Integration in Object–Oriented Databases".
Inspec Abstract No. 4603430, from G. Booch, 1994, "Designing an Application Framework".

Inspec Abstract No. 4596323, from Frank et al., 1993, "An Integrated Environment for Designing Object–Oriented Enterprise Models".

Inspec Abstract No. 4593721, Periyasamy et al, 1993, "A Formal Framework for Design and Verification of Robotic Agents".

Inspec Abstract No. 4588839, from L. Fisher, 1992, "Constructing a Class Library for Microsoft Windows".

Inspec Abstract No. 4588834, from G. Olander, 1992, "Chembrook: Redesign of a Large Commercial Application Using Object–Oriented Techniques".

Inspec Abstract No. 4566447, from J. Rossazza, 1992, "An Object–Centered Fuzzy Representation".

Inspec Abstract No. 4565630, from Karpovich et al., 1993, "A Parallel Object–Oriented Framework for Stencil Algorithms".

Inspec Abstract No. C9402–6150G–002, from Bruegge et al., 1993, "A Framework for Dynamic Program Analyzers".

Inspec Abstract No. 4550414, from Parrish et al., 1993, "Automated Flow Graph–Based Testing of Object–Oriented Software Modules".

Inspec Abstract No. 4540729, from Bailes et al., "The ecology of Class Refinement".

Inspec Abstract No. 4534334, from Campbell et al., 1991, "A Technique for Documenting the Framework of an Object–Oriented Ssytem".

Inspec Abstract No. 4534330, from Istavrinos et al., 1992, "Experiences with an Object–Oriented Mapper for Coherent Distributed Shared Memory".

Inspec Abstract No. 4528985, from Beneventano et al., 1993, "Taxonomic Reasoning with Cycles in Logidata+".

Inspec Abstract No. 4525743, from Hakimzadeh et al., 1993, "Instance Variable Access Locking for Object–Oriented Databases".

Inspec Abstract No. 4512593, from H. Sakai, 1993, "A Method for Contract Design and Delegation in Object Behavior Modeling".

Inspec Abstract No. B9310–6210L–099, "Templates, Types and Classes in Open Distributed Processing", 1993.

Inspec Abstract No. 4459325, from Kesim et al., 1992, "On the Evolution of Objects in a Logic Programming Framework".

Inspec Abstract No. 4447153, from Klein et al., 1992, "An Object–Oriented Framework for Curves and Surfaces".

Inspec Abstract No. 4426852, from Benveniste et al., 1992, "Concurrent Programming Notations in the Object–Oriented Language Arche".

Inspec Abstract No. 4425343, from Demurjian et al., 1993, "Programming Versus Databases in Object–Oriented Paradigm".

Inspec Abstract No. 4417604, from Kraiem et al., 1992, "Mapping of Conceptual Specifications Into Object–Oriented Programs".

Inspec Abstract No. 4417563, from E. Maim, 1992, "Recognizing Objects from Constraints".

Inspec Abstract No. 4411998, from Yi Deng et al., 1992, "Unifying Multi–Paradigms in Software System Design".

Inspec Abstract No. 4408394, from Allen et al., 1992, "GEM: Global Event Management in CAD Frameworks".

Inspec Abstract No. 4400350, from Y. Shoham, 1993, "Agent–Oriented Programming".

Inspec Abstract No. 4395549, from Hogstrom et al., 1992, "Portability and Data Structures in Scientific Computing–Object–Oriented Design of Utility Routines in Fortran".

Inspec Abstract No. 4391388, from Thomas et al., 1992, "A Generic Object–Oriented Concurrency Mechanism for Extensibility and Reuse of Synchronization Components".

Inspec Abstract No. 4387201, from Chu et al., 1992, "A Pattern Based Approach of Integrating Data and Knowledge to Support Cooperative Query Answering".

Inspec Abstract No. 4366189, from Holt, et al., 1992, "A Framework for Using Formal Methods in Object–Oriented Software Development".

Inspec Abstract No. 4356300, from Bertino et al., 1993, "Path–Index: An Approach to the Efficient Execution of Object–Oriented Queries".

Inspec Abstract No. 4341376, from Bertino et al., 1992, "Optimization of Object–Oriented Queries Using Path Indices".

Inspec Abstract No. 4331060, from Lau et al., 1992, "An Object–Oriented Class Library for Scalable Parallel Heuristic Search".

Inspec Abstract No. 4318465, from P. Madany, 1992, "Object–Oriented Framework for File Systems.".

Inspec Abstract No. 4302722, from Eggenschwiler et al., 1992, "ET++SwapsManager: Using Object Technology in the Financial Engineering Domain".

Inspec Abstract No. 4398324, from S. Nichol, 1992, "Extending Turbo Vision".

Inspec Abstract No. 4297404, from Tanaka et al., 1992, "Two–Level Schemata and Generalized Links for Hypertext Database Models".

Inspec Abstract No. 4287814, from Natarajan et al., 1992, "Issues in Building Dynamic Real–Time Systems".

Inspec Abstract No. 4281362, from Marshall et al., 1991, "Using VDM within an Object–Oriented Framework".

Inspec Abstract No. 4275707, from Tsukamoto et al., 1991, "DOT: A Term Representation Using DOT Algebra for Knowledge–Bases".

Inspec Abstract No. 4275698, from Van den Bussche et al., 1991, "Evaluation and Optimization of Complex Object Selections".

Inspec Abstract No. 4275693, from Giannotti et al., 1991, "Non–Determinism in Deductive Databases".

Inspec Abstract No. 4270361, from Artale et al., 1991, "Introducing Knowledge Representation Techniques in Database Models".

Inspec Abstract No. 4270125, from Becker et al., 1991, "Reusable Object–Oriented Specifications for Decision Support Systems".

Inspec Abstract No. 4258492, from M. Ball, 1992, "Inside Templates: Implementing C++ Strategies".

Inspec Abstract No. 4258051, from Rundensteiner et al., 1992, "Set Operations in Object–Based Data Models".

Inspec Abstract No. 4244023, from George et al., 1991, "An Object–Oriented Data Model to Represent Uncertainty in Coupled Artificial Intelligence–Database Systems".

Inspec Abstract No. 4234438, from Madany et al., 1991, "Organizing and Typing Persistent Objects Within an Object–Oriented Framework".

Inspec Abstract No. 4152687, from M. Wolczko, 1992, "Encapsulation, Delegation and Inheritance in Object–Oriented Languages".

Inspec Abstract No. 4117514, from Wuwongse et al., 1991, "An Object–Oriented Approach to Model Management".

Inspec Abstract No. C94204–6110J–017, "Choices Frameworks and Refinement", R.H. Campbell et al., 1991.

Inspec Abstract No. 4090970, from P. Kougiouris, 1991, "Device Management Framework for an Object–Oriented Operating System".

Inspec Abstract No. 4077440, from A. Mahler, 1991, "Organizing Tools in a Uniform Environment Framework".

Inspec Abstract No. 4067033, from Shaw et al., 1990, "Experience with the ET++ Application Framework".

Inspec Abstract No. 4060084, from Muller et al., 1990, "ODICE: Object Oriented Hardware Description in CAD environment".

Inspec Abstract No. 4050569, from Di Giovanni et al., 1990, "HOOD Nets".

Inspec Abstract No. C91072815, from Holtkamp et al., 1990, "DEMOM—A Description Based Media Object Data Model".

Inspec Abstract no. C91072016, from A. Lane, 1991, "/DOS/C++—Application Frameworks".

Inspec Abstract No. C91072574, from Hemery et al., "An Analysis of Communication and Multiprogramming in the Helios Operating System".

Inspec Abstract No. C91064787, from Madany et al., 1989, "A Class Hierarchy for Building Stream–Oriented File Systems".

Inspec Abstract No. C91064580, from Gamma et al., 1989, "Integration of a Programming Environment Into ET++—A Case Study".

Inspec Abstract No. C91058815, from Menga et al., 1990, "G++: An Environment for Object Oriented Analysis and Prototyping".

Inspec Abstract No. B91052096, from Cusack et al., 1990, "Object–Oriented Specification in LOTOS and Z, or My Cat Really is Object–Oriented!".

Inspec Abstract No. C91053475, from Queinnec et al., 1988, "An Open Ended Data Representation Model for EU–LISP".

Inspec Abstract No. C91053151, from E. Cusack, 1991, "Refinement, Conformance and Inheritance".

Inspec Abstract No. C91042802, from T. Yokoyama, 1990, "An Object–Oriented and Constraint–Based Knowledge Representation System for Design Object Modeling".

Inspec Abstract No. C91041980, from Choi et al., 1991, "Graph Interpretation of Methods: A Unifying Framework for Polymorphism in Object–Oriented Programming".

Inspec Abstract No. C91042655, from Q. Li, 1991, "Extending Semantic Object Model: Towards More Unified View of Information Objects".

Inspec Abstract No. C91024852, from Pierra et al., 1990, "An Object Oriented Approach to Ensure Portability of CAD Standard Parts Libraries".

Inspec Abstract No. C91010951, from T. Helton, 1990, "Level5 Object".

Inspec Abstract No. B90075006, from Gossain et al., 1989, "Designing a Class Hierarchy for Domain Representation and Reusability".

Inspec Abstract No. C91003997, from J. Muys–Vasovic, 1989, "MacApp: An Object–Oriented Application Framework".

Inspec Abstract No. C91004708, from Bertino et al., 1990, "Optimization of Queries Using Nested Indices".

Inspec Abstract No. C90052277, from I. Tervonen, 1990, "Object–Oriented Development as a Multiview Software Construction Methodology".

Inspec Abstract No. C90052627, from Schrefl et al., 1988, "A Knowledge–Based Approach to Overcome Stuctural Differences in Object Oriented Database Integration".

Inspec Abstract No. C90047457, from Yokoyama et al., 1990, "A Constraint–Based and Object–Oriented Knowledge Representation".

Inspec Abstract No. C90034818, from Q. Chen, 1988, "Extending the Object–Oriented Paradigm for Supporting Complex Objects".

Inspec Abstract No. C90030609, from Forde et al., 1990, "Object–Oriented Finite Element Analysis".

Inspec Abstract No. C90007733, from Weinand et al., 1989, "Design and Implementation of ET++, A Seamless Object–Oriented Application Framework".

Inspec Abstract No. C89062837, from Pasquier–Boltuck et al., 1988, "Prototyping an Interactive Electronic Book System Using an Object–Oriented Approach".

Inspec Abstract No. C89056727, from Campbell et al., 1989, "Principles of Object–Oriented Operating System Design".

Inspec Abstract No. C89056859, from Hull et al., 1989, "On Accessing Object–Oriented Databases: Expressive Power, Complexity, and Restrictions".

Inspec Abstract No. C89049257, from Madany et al., 1989, "Class Hierarchy for Building Stream–Oriented File Systems".

Inspec Abstract No. C89039001, from Brophy et al., 1989, "A Framework for Multiple, Concurrent Graphical Representation".

Inspec Abstract No. C89033226, from Corradi et al., 1988, "PO: An Object Model to Express Parallelism".

Inspec Abstract No. C89014870, from R. King, 1988, "Semantic and Object–Oriented Database Support for Software Environments".

Inspec Abstract No. C89003142, from Tenma et al., 1986, "A System for Generating Language–Oriented Editors".

Inspec Abstract No. C88013915, from Woelk et al., 1987, "Multimedia Information Management in an Object–Oriented Database System".

Inspec Abstract No. C88007447, from P. Allen, 1987, "A Framework for Implementing Multisensor Robotic Tasks".

Inspec Abstract No. C87007043, from Whitted et al., 1986, "Exploiting Classes in Modeling and Display Software".

Inspec Abstract No. C86039588, from K. Fukunaga,, 1985, "Prompter: A Knowledge Based Support Tool for Code Understanding".

Inspec Abstract No. C86024804, from Greenspan et al., 1986, "A Requirements Modeling Language and Its Logic".

Inspec Abstract No. C84005713, from Meyer et al., 1983, "Towards a Two–Dimensional Programming Environment".

Inspec Abstract No. C81005505, from Mylopoulos et al., 1980, "Some Features of the TAXIS Data Model".

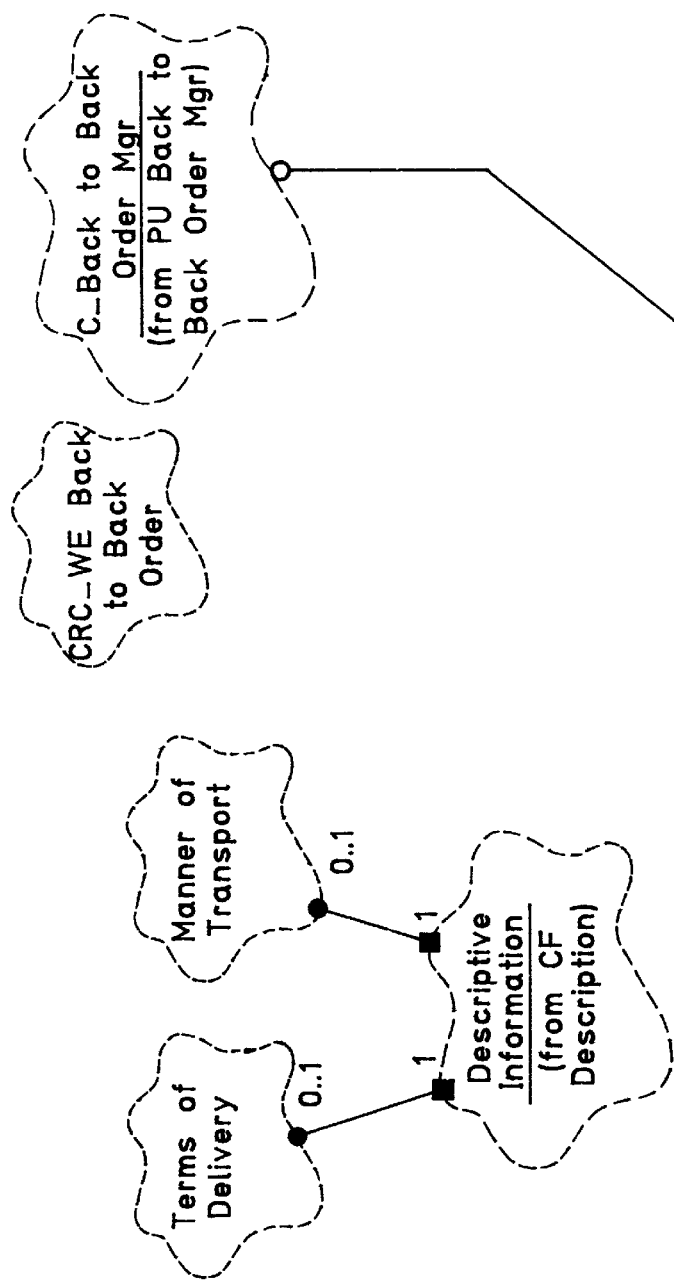
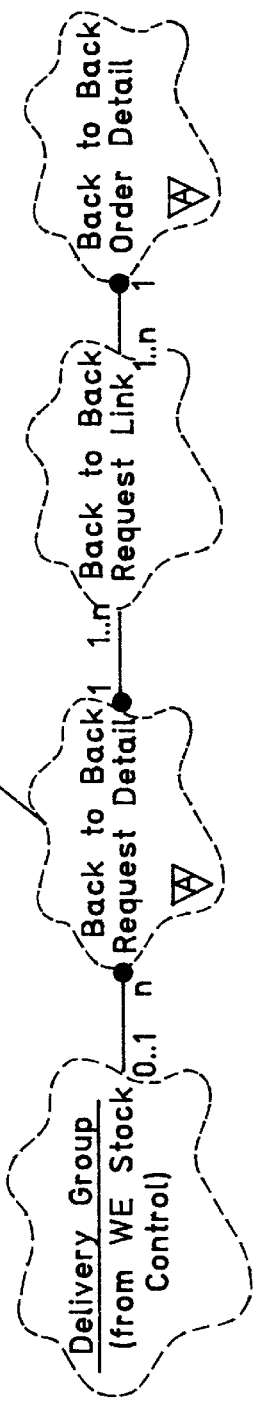
FIG. 24
FIG. 25

OBJECT ORIENTED TECHNOLOGY FRAMEWORK FOR WAREHOUSE CONTROL

BACKGROUND OF THE INVENTION

1. Field of the Invention

This invention relates generally to data processing systems and, more particularly, to object oriented programming systems and processes.

2. Description of the Related Art

Computer programs have typically been developed using procedural programming techniques. Procedural programming techniques emphasize structuring the data processing procedures to which data values are subjected. Efforts to reduce long software development times and high software maintenance costs have resulted in structured programming techniques that attempt to reuse blocks of programming code. For example, tasks or processes that must be repeated can be written as system programming routines or program library functions. Program developers then provide an application program to accomplish a desired result using calls to the system routines and library functions.

System routines and library functions provide only a limited reduction in software development time and maintenance costs. Once a procedural application program is written, it is relatively difficult to incorporate new features or additional data types. There are many processes in an application program that cannot be easily extracted from program code and reused. Additional data types often cannot be inserted into procedural program code without extensive rewriting of the original program code. Thus, even if new features in a program can be implemented using processes similar to those already in the application, the programming for such processes must be largely duplicated, with slight modifications, to provide the new features. This increases program development time. Moreover, if such programs must operate with other applications, it can be difficult to ensure that the changes will interface properly.

Another problem confronting program developers is that of providing program versions capable of operating with the various platforms used by customers. The different platforms encompass different operating systems as well as different companion applications with which the application must interface. With respect to operating systems, for example, a program developer might have to write different versions for satisfactory operation under the "Windows 95" operating system by Microsoft Corp., the UNIX system, the "MacIntosh" operating system by Apple Computer Corp., or the "OS/2" operating system by International Business Machines Corporation (IBM Corporation). In a similar fashion, a program developer might want to provide the ability to interface with application programs such as word processor programs, spreadsheet programs, and the like, meaning that the program developer must provide the ability to accept files (and produce files) in different file formats. Different platforms use different data formats and procedural operations, so program developers must provide different program versions or routines for each platform.

Object oriented programming (OOP) techniques encapsulate, or bind together, data and the methods that operate on them. This permits program development to more closely model real-world systems for problem solution and breaks up program development efforts into smaller, more manageable pieces. OOP programs are developed around object classes that have attributes, also called data values, and methods, also called functions. Although OOP techniques have done much to improve program development efficiency, such techniques still require a great degree of code generation on the part of application developers and limit program reuse among different classes.

OOP frameworks have been developed in an effort to further reduce program development costs. A framework is a set of OOP classes that embodies a predetermined set of attributes and methods for providing a common group of behaviors. An application program developer utilizes the framework and builds upon it, adding subclasses and attributes and modifying methods depending on the problem to be solved. Such changes to the framework are typically referred to as framework extensions, and are made possible by the OOP notions of inheritance and polymorphism. The challenge confronting framework developers, then, is to arrive at a set of classes and methods that will best provide the desired problem solution and will accept the most likely framework extensions. Thus, the designer of a framework must carefully assess what framework users will most likely need in the way of classes and attributes.

One area in which there is a great need for application program development is in the warehouse control domain. In particular, many businesses have computerized the functions of warehouse control. Applications exist, for example, that provide computer controlled purchasing, shipping, and receiving. Many company-specific features are needed for management of warehouse locations and tracking of products, both of which are continually changing, so that program development and software maintenance of applications for warehouse control are critical. Thus, a great deal of cost and effort are devoted to developing and maintaining application programs that perform warehouse control functions.

From the discussion above, it should be apparent that there is a need for a warehouse control application program development tool that permits application program developers to more quickly develop and more easily maintain warehouse control applications. The present invention fulfills this need.

SUMMARY OF THE INVENTION

In accordance with the present invention, a reusable object oriented (OO) framework for use with object oriented programming systems comprises a warehouse control shell that permits a framework adopter to use a set of warehouse internal product-type objects and a set of warehouse external transactional objects that provide product stock tracking, and to then add framework extensions for specific processing features, thereby producing a warehouse control application for all products contained in the warehouse locations of a company. Such a warehouse control application manages inventory stocking, shipping, purchasing, and logistics for warehouses. In this way, the warehouse control framework of the invention provides an OO base on which application program developers can build to add specific data types and processing features they deem important.

The framework includes classes for which it is anticipated extension subclassing with new attributes and methods will occur. An application program developer can customize the extension classes to meet the needs of application users and create all user interfaces with the application program, permitting the developer to more quickly complete program development and more easily perform software maintenance. The end-user interface establishes a means for the end-user to communicate with the application program to receive, process, and report data. The framework frees the program developer to concentrate on application program features, which can easily be implemented by extending the OO classes and methods of the OO framework. The framework thereby provides a base from which a variety of warehouse control systems can be quickly and efficiently produced.

The framework includes object oriented classes that specify object data attributes and methods. The framework adopter is free to incorporate extensions to the framework to provide a unique suite of functions and operations, resulting in the production of an application that is then utilized by an end user. For example, a single object provides a data object location for maintaining and accessing properties, business policies, and attributes that are defined for the company and that are required for the logistics processes. Using OOP principles, the framework adopter can add product attributes not present in the framework to support product types desired by a customers in a particular market niche. In this way, the framework adopter maximizes the exploitation of program commonality and the reuse of programming efforts, thereby reducing program development time and software maintenance costs.

Other features and advantages of the present invention should be apparent from the following description of the preferred embodiment, which illustrates, by way of example, the principles of the invention.

BRIEF DESCRIPTION OF THE DRAWINGS

FIG. 24 is a class diagram of the WE Transport Information category illustrated in FIG. 15, showing the Terms of Delivery class and Manner of Transport class.

FIG. 25 is a class diagram of the WE Back to Back Order Detail category illustrated in FIG. 15, showing the Back to Back Order Manager class and related classes.

DESCRIPTION OF THE PREFERRED EMBODIMENT

1. Application Development

Figure 1:
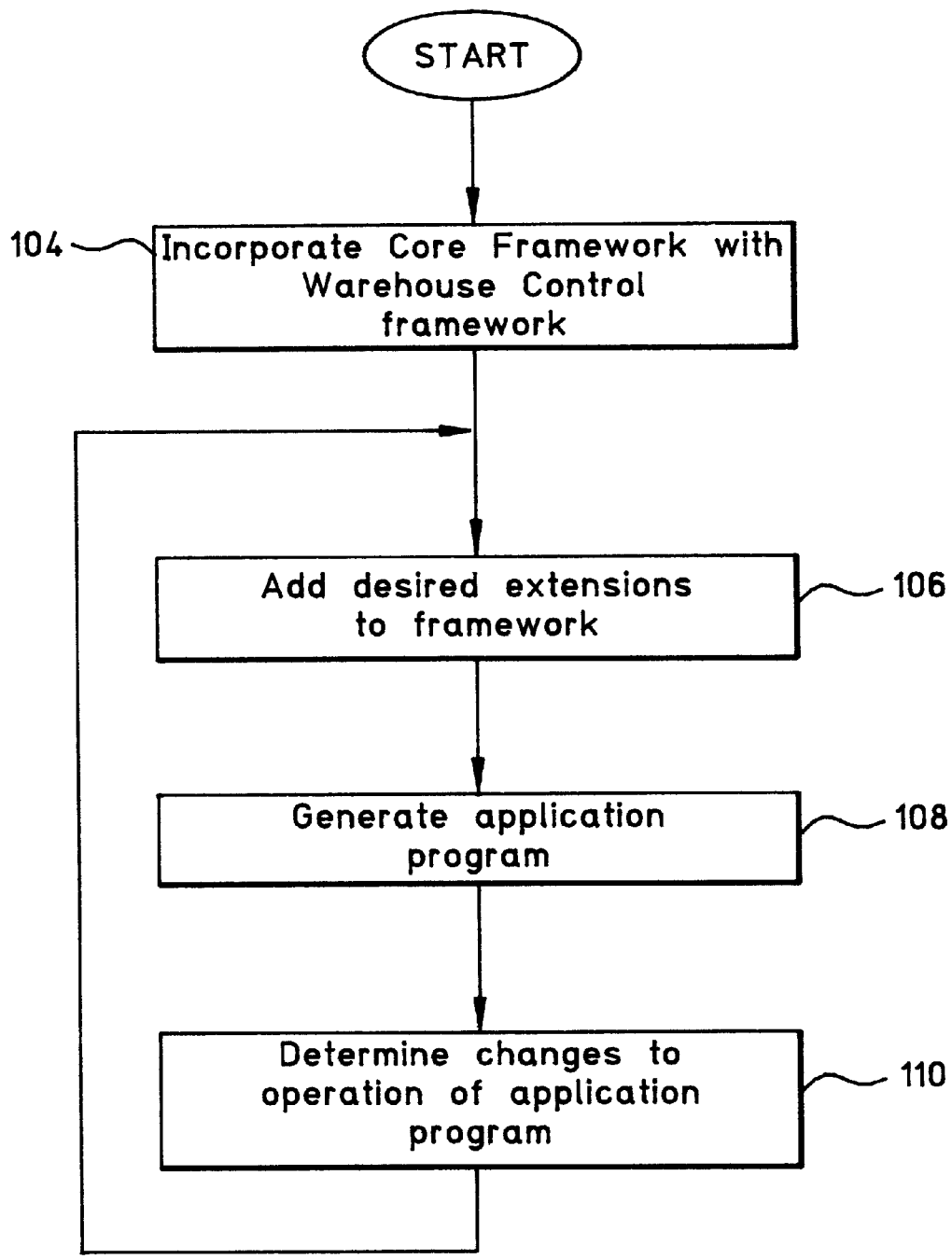
FIG. 1 is a flow diagram representation of the application development process that utilizes the framework of the invention to provide a warehouse control application program.

FIG. 1 is a flow diagram representation of the steps performed with a computer system to produce a warehouse control application program using the framework of the present invention. The warehouse control program of the preferred embodiment is designed to obtain certain information from objects of related core classes. Such information will include business and distribution network information concerning the company for which the warehouse control is to be performed, as well as other information needed to carry out operating in a computer system. These core classes can be organized into a core framework (CF) that is complementary to the framework of the present invention. The application developer provides a user interface and combines operating interface features of the core object classes with the structure and functionality of the Warehouse Control OOP framework constructed in accordance with the present invention, and also adds particular framework extensions as needed, to generate an application program. The resulting application program can be used by customers, such as distribution firms or businesses, to carry out warehouse control functions and other tasks in the product distribution domain. In the following description, "framework" will refer to the framework illustrated in the drawing figures and "application" will refer to an application program that comprises an implementation of the extended framework, produced by an application developer who uses the framework.

In the FIG. 1 flow diagram, the first step is to incorporate the core framework with the Warehouse Control framework of the invention, as represented by the flow diagram box numbered 104. This step includes the incorporation of any object classes necessary for the system on which the application will run. For example, the preferred embodiment achieves operating platform independence and application program inter-operability by extending classes from the core framework (CF) a set of base business classes. In this first step, the application developer will incorporate object classes necessary for achieving operating system independence and program inter-operability by extending and sub-classing from the CF classes. In this way, the warehouse control application program can interface with multiple operating systems because only the CF extensions need change to accommodate new operating systems, while the warehouse control application can remain the same. In a similar way, companion application programs can more easily interface with the extended application program because the core, common set of CF classes will be known and will form a common interface.

The next step of application program development is to add desired extensions to the warehouse control framework, including the user interface. To implement this part of the program development process, the application developer-framework user must decide upon the particular extensions needed for the desired warehouse control operations and user interface, including any modifications or extensions to the class attributes and behaviors. The framework extensions are performed by a framework user in a manner dependent on the particular computer system on which the framework is received and manipulated. Such processing is represented in FIG. 1 by the flow diagram box numbered 106.

After the framework extensions are decided upon, the next step is to generate the application program. This step is represented by the flow diagram box numbered 108. The generation of an application program is generally referred to as program compilation. This step also will depend on the particular computer system on which the framework is used. Changes to the compiled program might be desired, both as part of the initial program debug and as part of revisions due to comments received from actual use. The process of determining such desired changes is represented by the flow diagram box numbered 110. When such changes are determined, they must be implemented into the program structure in the form of modified classes, attributes, and methods, which comprise further extensions to the framework. This is represented by the flow diagram path from the "determine changes" step at box 110 back to the "add desired extensions" step at box 106.

Thus, the design of the framework provides base classes on which application program developers can build to add specific features they deem important. With the core business classes, the framework classes can remain platform independent so that framework extensions are simplified. The application is easily modified without need for writing multiple versions of the program code because the revision of framework classes, attributes, and methods in accordance with the invention is platform independent. Easier development of new code, and seamless operation with applications using the same core classes, is ensured.

2. Operational Structure

Figure 2:
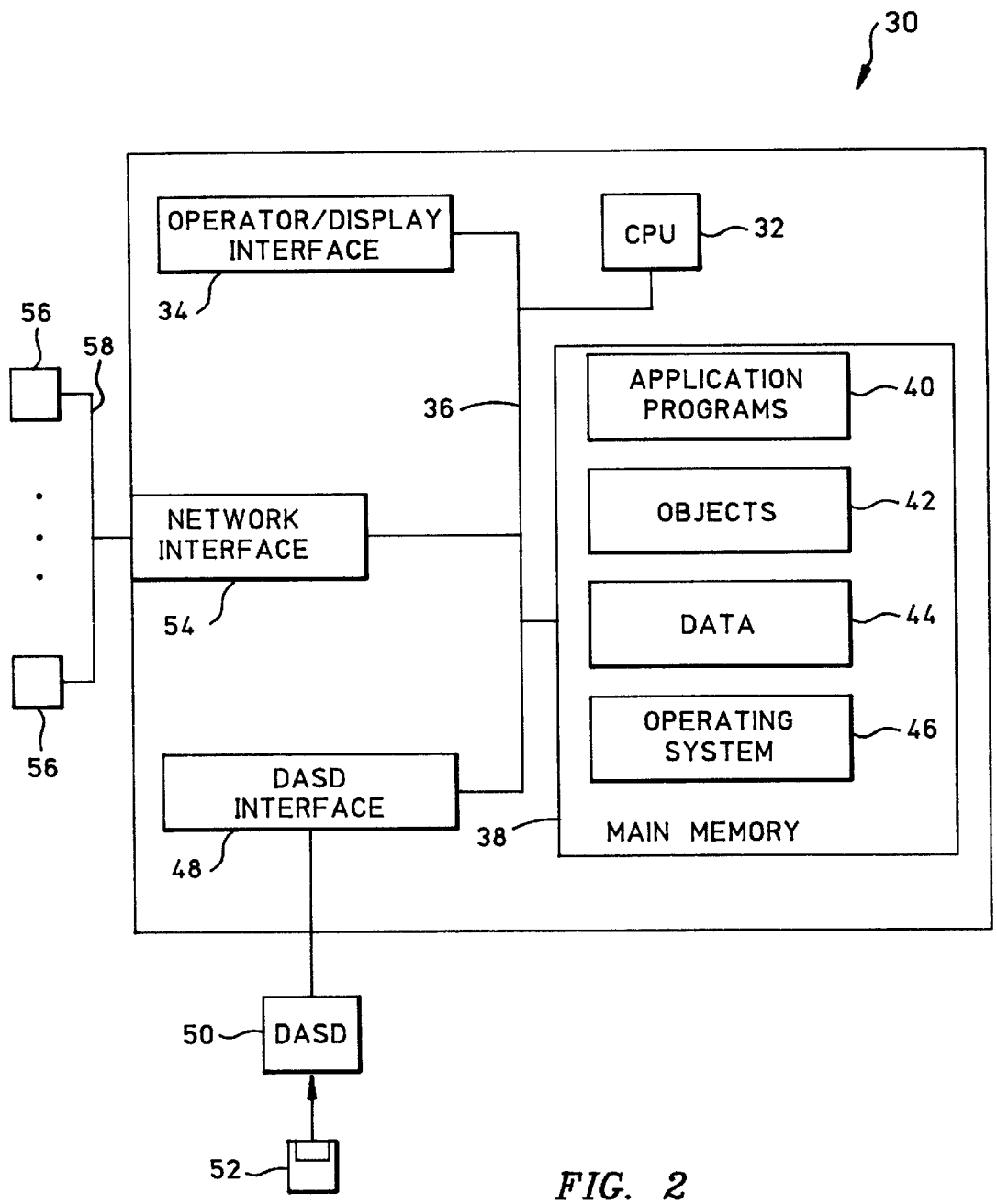
FIG. 2 is a block diagram of a computer system constructed in accordance with the intention.

FIG. 2 is a block diagram of a computer system 30 constructed in accordance with the present invention. The computer system is suitable for utilizing the framework of the invention to develop an application program, and for using the extended framework application program. The computer system 30 includes a central processing unit (CPU) 32 that operates in response to operator commands, which it receives from an operator/display interface 34 to which it is connected by a system bus 36. The CPU also communicates over the system bus with a main memory 38. The main memory is illustrated containing a variety of data structures, including application programs 40, objects 42, data 44, and an operating system 46. The main memory 38 is represented as a single entity, but those skilled in the art will appreciate that the main memory can comprise a combination of random access memory (RAM), hard disk drives, optical disk drives, and other storage devices containing logically segmented storage locations.

The operating system 46 preferably supports an object oriented programming environment such as provided, for example, by the C++ programming language. The application programs 40 are invoked, or launched, by a user through the operator/display interface 34. The application programs can be written in a variety of languages, including C++. The objects 42 are object data structures of an object oriented programming language, such as C++.

The computer system 30 also includes a direct access storage device (DASD) interface 48 that is connected to the system bus 36 and also is connected to a DASD 50. Those skilled in the art will appreciate that the DASD 50 can receive and read from program products comprising machine-readable storage devices 52, such as magnetic media disks on which are recorded program instructions whose execution implements the framework of the present invention. The storage devices 52 also can comprise, for example, media such as optical disks and other machine-readable storage devices. The computer system 30 also includes a network interface 54 that permits communication between the CPU 32 and other computer systems 56 over a network 58. The other computer systems 56 can comprise, for example, computer systems similar in construction to the exemplary computer system 30. In that way, the computer system 30 can receive data into the main memory 38 over the network 58 after communication between the computer systems has been established by well-known methods that will be understood by those skilled in the art without further explanation.

3. System Modules

In the preferred embodiment of the invention, the object oriented framework includes system modules comprised of a Warehouse External (WE) mechanism, which tracks stock control, shipment, and sourcing, and a Warehouse Internal (WI) mechanism, which tracks product identification and logistics. With such a framework structure, the WI mechanism is the primary interface between the framework classes and underlying business objects that might comprise, for example, accounting functions and operating system interfaces, and the WE mechanism is the primary interface to order management applications that keep track of sales orders being received and purchase orders being issued.

The WI categories include a WI Product object category that contains attributes and methods of the products for which inventory control will be performed and the warehouse locations at which the products may be found. The WI Product category is used by other categories that perform the warehouse control function, including: a WI Stock Take category for taking count of inventory; a WI Stock Transaction category for representing activities that change stock levels; a WI Stock Analysis category for taking action in response to changing stock levels; a WI Quality Control category for monitoring the condition of the inventory; and a WI Manual Product Reservations category for setting atypical stock requirements. Other categories provide additional features that improve the ability of the framework to accommodate user-defined data types and features, as desired.

The WE categories include a WE Stock Control category that tracks product movements into and out of a warehouse and between warehouses. Accordingly, the WE Stock Control category uses the WI Product category to relate the Stock Control actions to products, warehouses, and inventories, and uses the transport time category to determine shipment times anticipated. Other WE categories include WE Picking, WE Reception, and WE Shipment categories, which track movements from stock, receipt of new stock, and shipment of existing stock, respectively. Further WE categories include a WE Sourcing category that determines what source will provide the products to satisfy a demand; a WE Kit Assembly category that manages the creation of an assembly from a set of components; and a WE Stock Movements category that uses the WI Product category and other object categories to manage product movements between the warehouses. Other categories provide additional features that improve the ability of the framework to accommodate user-defined data types and features, as desired.

Figure 3:
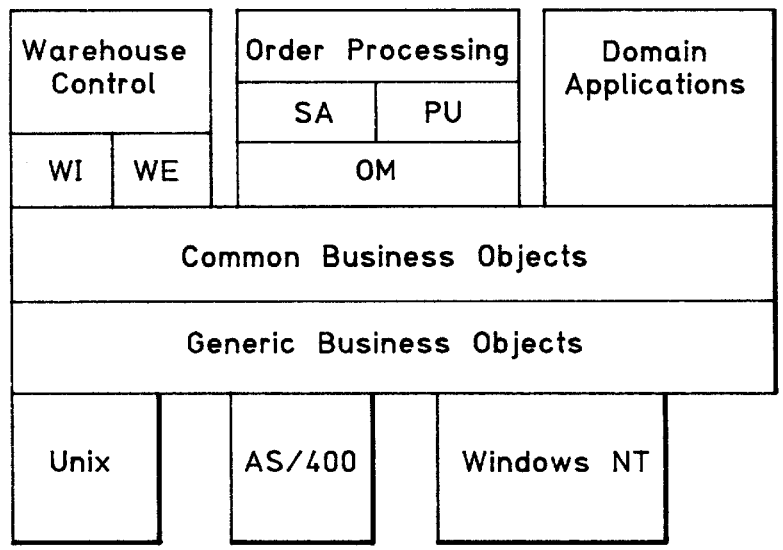
FIG. 3 is a representation of the computer system of FIG. 2, showing the Warehouse Internal (WI) and Warehouse External (WE) mechanisms that comprise the framework, and also showing related common business objects utilized by the extended Warehouse Control framework of the invention.

FIG. 3 is a representation of the framework that operates in the system of FIG. 2, showing the Warehouse Internal (WI) and Warehouse External (WE) modules, or mechanisms, that comprise the Warehouse Control system that is the subject of this description. The WI and WE mechanisms are shown attached to a Common Business Objects framework (CBOF) mechanism and a Generic Business Objects framework (GBOF) mechanism, which together comprise a core framework (CF) utilized by the framework of the invention. The CF provides common functionality to permit communication between application mechanisms (such as Warehouse Control) and different operating platforms, which are indicated in FIG. 3 by the modules indicated as "Unix", "AS/400", and "Windows NT" attached to CF.

Application developers will add subclassing to the classes of which CBOF and GBOF are comprised. The classes of CBOF, for example, will include company identification classes that can serve as base classes for defining companies to multiple application programs. A CBOF "Company" class might contain general identifying company information, while the warehouse control framework of the invention might extend from the CBOF and include "Company" classes that identify distribution network parameters of the Company. Another application program, such as a manufacturing application, might include company classes that identify finished products of the Company. The GBOF classes are more directly related to the operating system and computer system side of the operating environment. That is, the GBOF classes are responsible for object persistence according to the operating system and object environment being supported, so that a Warehouse Control object that wants to maintain an object in persistent data storage must interface with GBOF classes. All application programs in related "business object" subject areas, or domains, should be able to make use of the common object classes specified by the CBOF and GBOF classes.

In FIG. 3, a mechanism called Warehouse Control (comprising Warehouse Internal and Warehouse External) is shown attached to the CF (CBOF/GBOF) combination with an Order Processing mechanism (application) and a module identified as "Domain Applications". All of these mechanisms are shown attached to the CF to indicate that other modules may be developed to communicate with the Warehouse Control framework. In this way, other domain applications may communicate with the Warehouse Control application and similarly interface with different operating platforms. It should be understood that the application mechanisms shown interfacing with the CF and interfacing with the alternative operating systems are exemplary only. That is, it is contemplated that additional domain applications may interface with the Warehouse Control mechanism, and it is contemplated that additional operating platforms may interface with the Warehouse Control.

The CF interface, however, does not form a part of the invention described herein. As noted above, those skilled in the art should be able to produce, without further explanation, a framework that provide the common functionality between operating systems and application domains that are provided by CF.

The WI and WE mechanisms of the warehouse control framework function in a computer system that includes order management categories, accounting categories, and business model categories. After a framework adopter has extended the framework so as to produce a warehouse control application, the end user of the application provides data and commands to the warehouse control application through the business model categories, provides accounting input through the accounting categories, and receives order management information through the order management categories.

The categories of the WI mechanism will be described next, followed by a description of the classes that comprise the WI categories. The categories of the WE mechanism will be described thereafter, followed by a description of the classes that comprise the WE categories. The processing of the extended framework will then be described, in accordance with accompanying flow diagrams of the processing.

4. WI Category Diagram

The framework categories provide a base of information and executable software that can be used by program developers and from which extensions can be developed. That is, the inventors of the present framework have identified a set of OOP classes most likely to be desired by developers of warehouse control application programs and have defined the relationships between such classes. Those skilled in the art will recognize that such classes can be overridden by users of the framework in that framework users who are developing applications can incorporate extensions and additions that suit the purposes of the user.

The categories of the Warehouse Internal portion of the framework will be referred to with a preceding "WI" and the categories of the Warehouse External portion of the framework will be referred to with a preceding "WE", unless not required by the context in which the category is being described.

Figure 4:
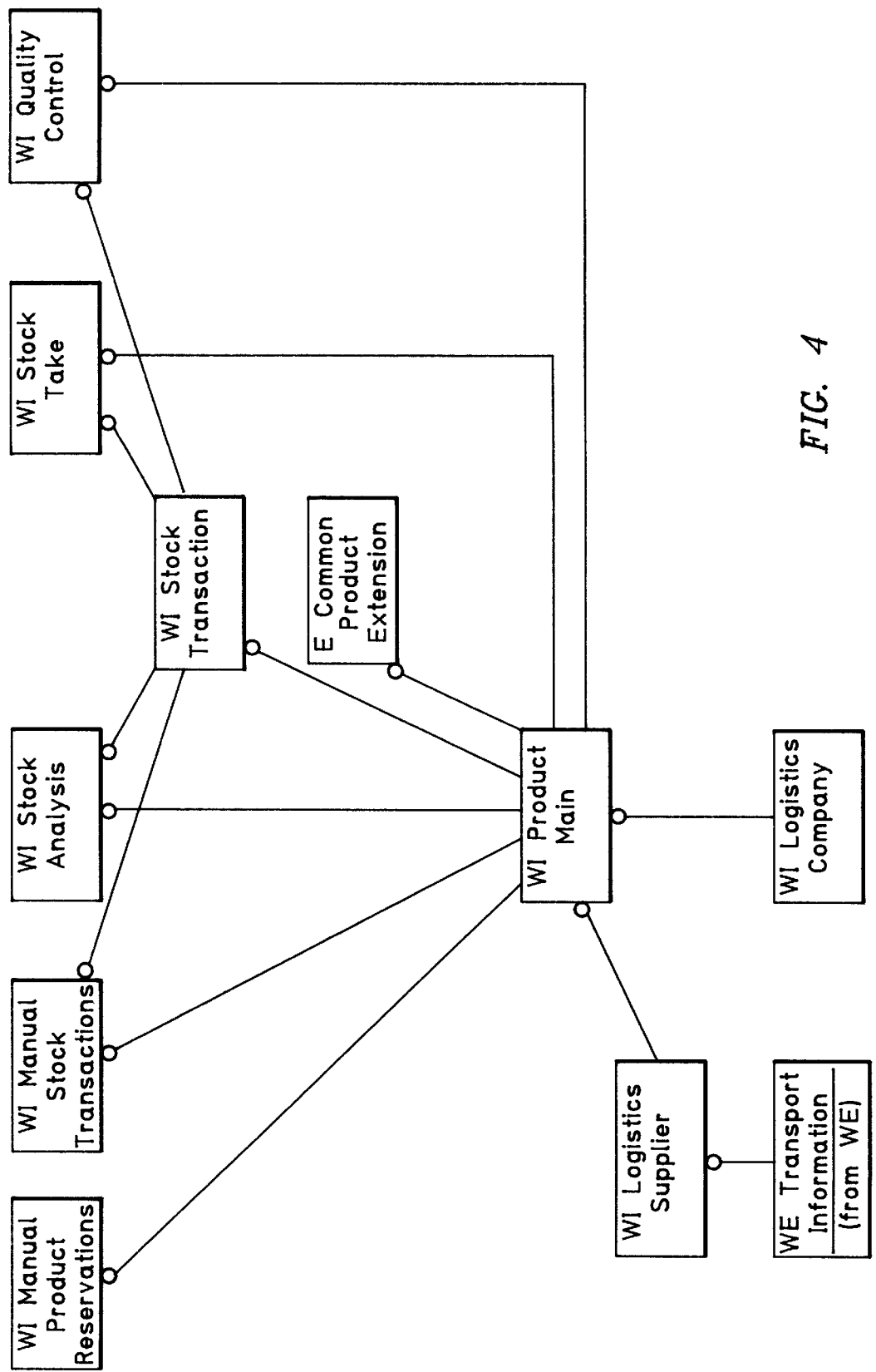
FIG. 4 is a category diagram representation of the WI categories.

FIG. 4 is a category diagram for the WI mechanism of the framework implemented in the computer system of FIG. 2. Those skilled in the art will appreciate that the categories illustrated in FIG. 4 contain groups of OOP classes that encapsulate data attributes and behaviors, and are stored in the memory of the computer system. Such classes can be implemented, for example, in a computer system operating environment that supports the C++ programming language. It should be understood that a category as used in this description refers to describing the classes that make up the framework in terms of categories for purposes of easier explanation. The categories do not necessarily represent a structure that is reflected in any programming implementation of the framework. Those skilled in the art will appreciate the OO classes specify characteristics of the objects that will be instantiated at run time and will cooperate to perform the program functions.

The WI categories include a WI Logistics Company category of classes that contains information concerning properties, policies, and attributes of the company for whom warehouse control is to be performed. That is, the company that is the end user of the application program developed with this framework is identified by data contained in the WI Logistics Company category of classes. References to "Company" (initial letter capitalized) will be understood to refer to the end user company. The WI categories also include a WI Logistics Supplier category of classes that contains information about suppliers of the Company, referred to generally as Business Partners. The information about Business Partners that is contained in the Logistics Supplier category is similar to the information about the Company that is contained in the WI Logistics Company category.

Other WI categories include a WI Product category that provides needed product definition, structure, and default behavior for object oriented classes of products, a WI Stock Take category that manages information about product stock on hand, a WI Stock Transaction category that generates a log of all events concerning stock movement, a WI Manual Stock Transactions category that permits actions to increase or decrease stock balances for special circumstances, a WI Stock Analysis category that evaluates the current stock situation considering stock, supply orders, and demands, a WI Quality Control category that supports product inspection requests and reports, and a WI Manual Product Reservations category that creates and maintains temporary reservations on stock. The WI mechanism category diagram also shows a WE category called WE Transport Information. This category contains information specifying terms of delivery and transport for products, and is described further below in connection with the WE category diagram.

5. WI Class Diagrams

There is no uniform standard for OO programming, but this description will use the widely followed convention that class names comprise descriptive words whose initial letters are upper case.

a. WI Logistics Company Class Diagram.

Figure 5:
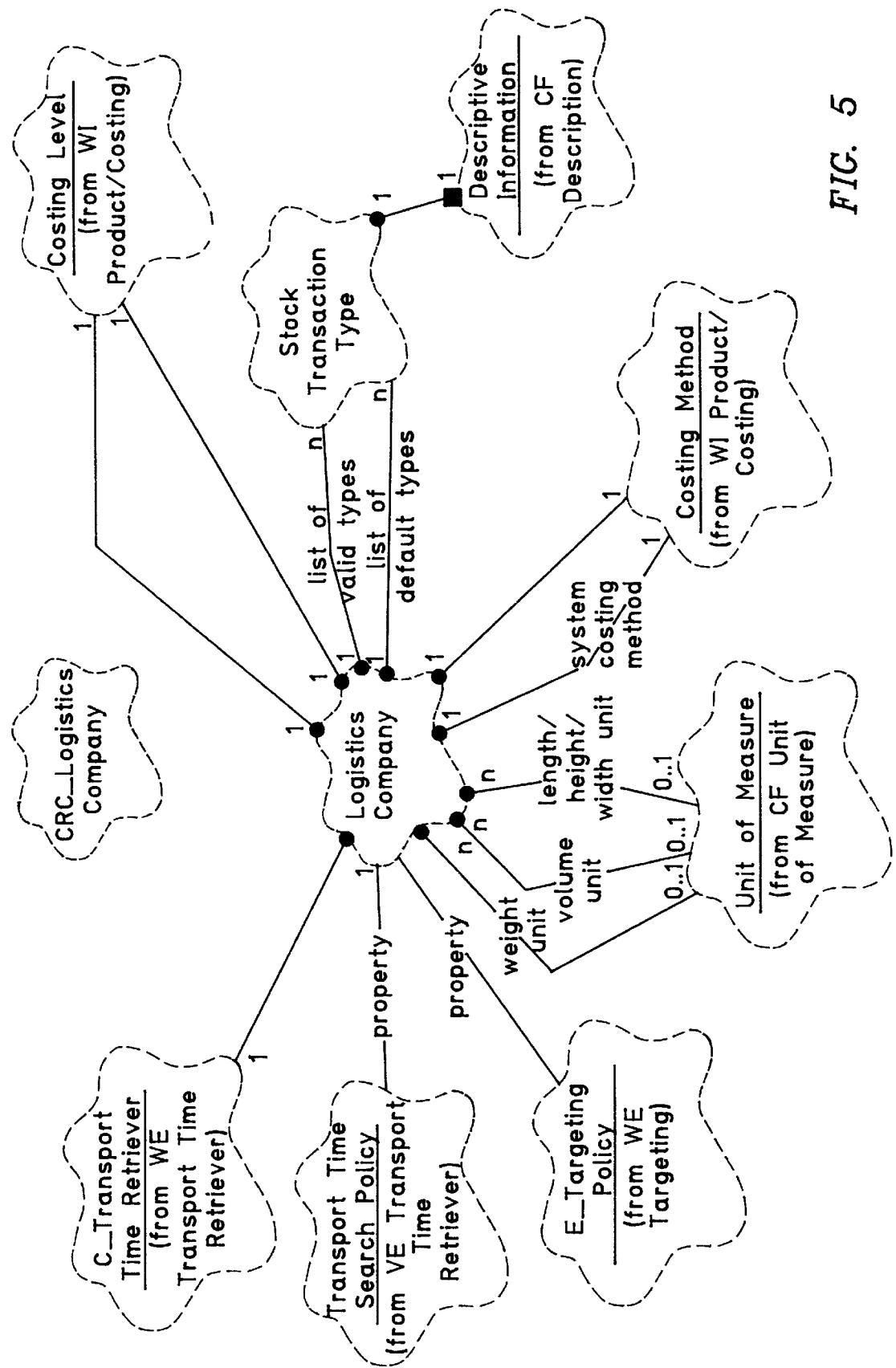
FIG. 5 is a class diagram of the WI Logistics Company category illustrated in FIG. 4, showing the Logistics Company class and related classes.

FIG. 5 is an object class diagram that illustrates the characteristics of the class called Logistics Company. A Logistics Company class member comprises an object that contains attributes specified by the Logistics Company class definition. The class definition describes the company that is the subject of the warehouse control application. That is, the Logistics Company object identifies the Company, whose warehouse system is to be controlled. FIG. 5 shows that the Logistics Company has, or contains, relationships with several classes, including Costing Level, Transport Time Retriever, Transport Time Search Policy, Targeting Policy, Unit Of Measure, Costing Method, and Stock Transaction Type.

The class of Stock Transaction Type has ownership of a Descriptive Information class that defines each stock transaction type. FIG. 5 indicates that the Descriptive Information is "from" a core file (CF) Description class, indicating that in the preferred embodiment the Stock Transaction Type class members make use of the underlying CBOF categories illustrated in FIG. 3, thereby leveraging OOP techniques implemented in the FIG. 2 computer system.

The Costing Method class defines the costing method that will be used for the Company. The costing methods can include, for example, standard costing methods, average costing methods, last in first out (LIFO), first in first out (FIFO), latest new cost, and so forth. The framework developer can extend the framework to provide additional costing methods.

The Unit of Measure class holds the weight units and volume units that will be used for the company. This class also can hold physical dimensions of products, such as length, height, and width, if the application requires such information. Such information might be beneficial, for example, if it must be determined whether a product will fit into a particular stock location.

The Targeting Policy and Transport Time Search Policy class comprises extension classes where policy logic can be added to set properties that determine how the company will decide which warehouse locations will receive in-bound shipments and how to select the transport time to be used. The Transport Time Retriever class is used by the Company object to calculate the time required to ship products between addresses.

b. WI Logistics Supplier.

Figure 6:
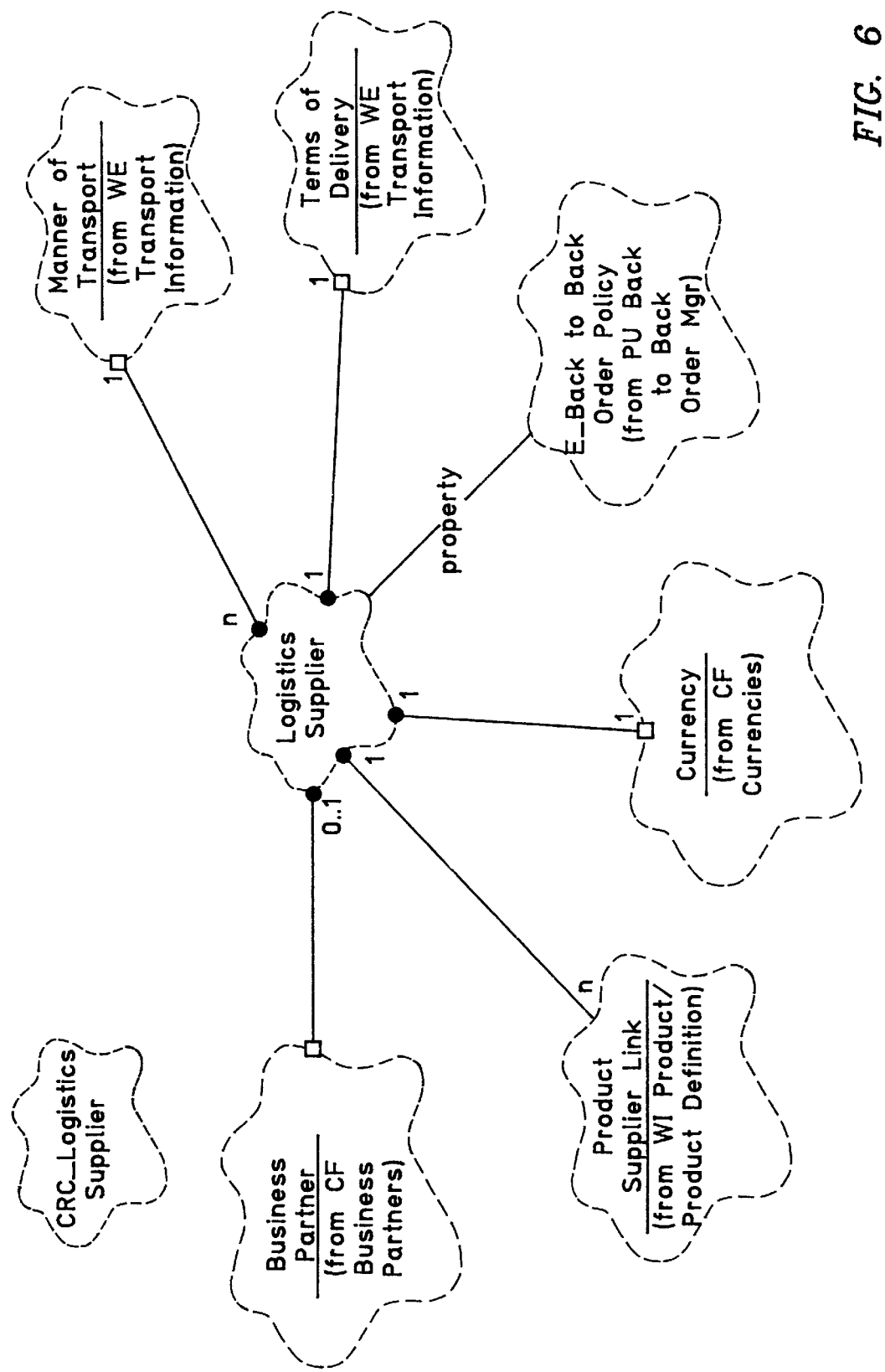
FIG. 6 is a class diagram of the WI Logistics Supplier category illustrated in FIG. 4, showing the Logistics Supplier class and related classes.

FIG. 6 is a class diagram that illustrates the characteristics of the WI Logistics Supplier category illustrated in FIG. 4. The WI Logistics Supplier category provides a single location for accessing properties, policies, and attributes that are associated with a supplier and are only required by the logistics processes of the FIG. 2 system. The Logistics Supplier class references a Business Partner class that provides the attributes and behaviors for a supplier. The Business Partner class is part of the Common Business Objects module (CBOF) described above.

Other classes that comprise the WI Logistics Supplier category include the Manner of Transport class, which defines the default method for transporting products from the supplier to the company location. Terms of Delivery, which defines the default terms for deliveries from a specific supplier, Currency, which determines the default currency in which the supplier is to be paid. Back to Back Order Policy class, and a Product Supplier Link class. The Back to Back Order Policy class is an extension point to the framework that permits the resulting application to define properties that control the company policy for automatically creating a purchase order, which is directly associated with a sales order. The Product Supplier Link class contains methods and attributes associated with procuring a specific product from a specific supplier. For example, the Product Supplier Link might define minimum order quantities from suppliers.

c. WI Product.

Figure 7:
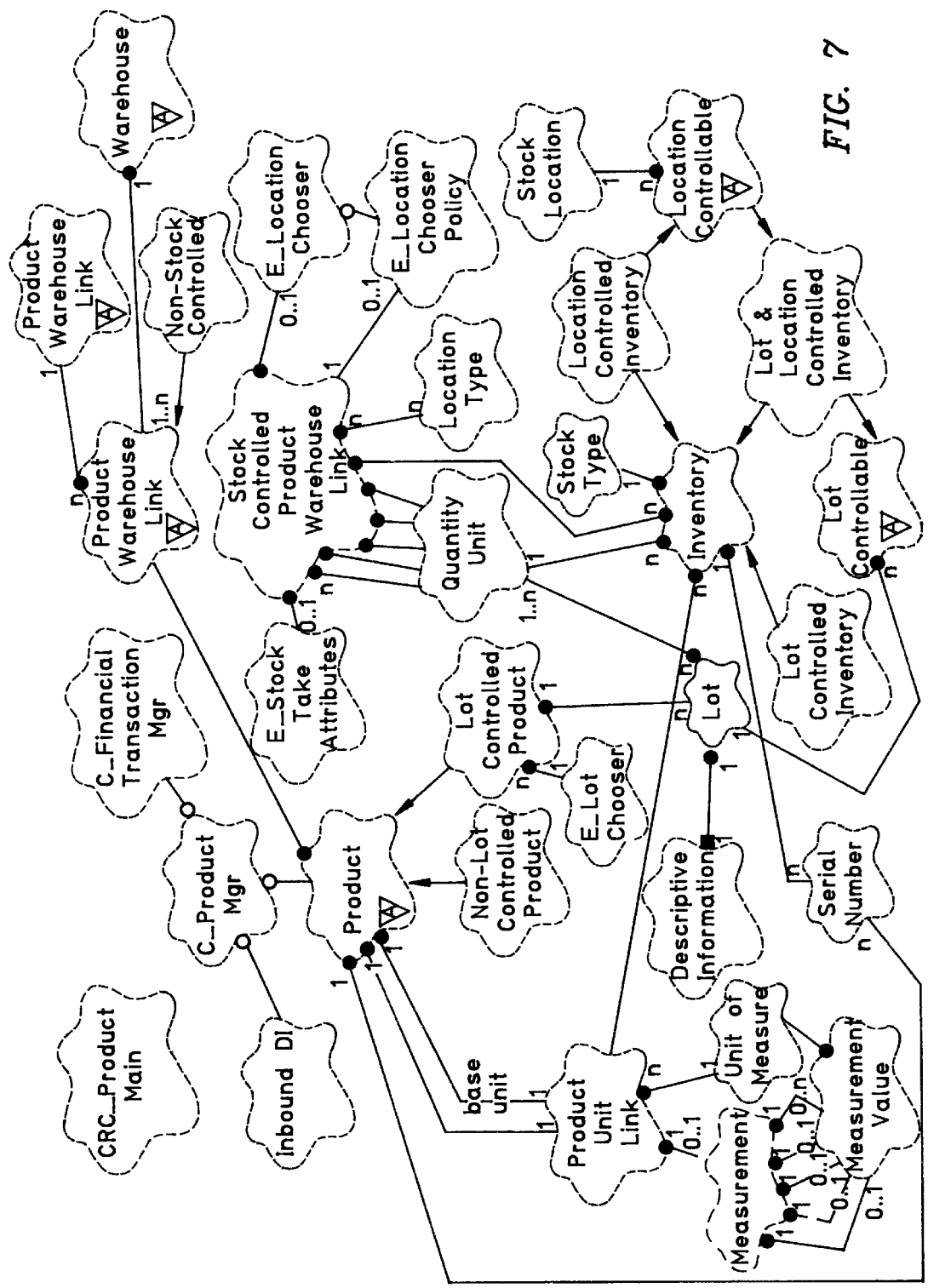
FIG. 7 is a class diagram of the WI Product category illustrated in FIG. 4, showing the Product class and related classes.

FIG. 7 is a class diagram that illustrates the components of the WI Product category. In the preferred embodiment, the WI product category includes classes that form a core of the internal and the external warehouse logistics subsystems. The category is composed of several classes that provide the necessary product structure and default behavior, including the Product class, which is an abstract base class. An abstract class represents a class that will be extended by the framework user to provide features specially selected by the framework user to add value to the resulting application program. Abstract classes will be designated in the drawings with an "A" enclosed in a triangle within a corresponding class cloud. The Product class provides a framework extension point where application program developers can specialize the application to hold product information associated with an inventory item for warehouse control. The classes of the WI Product category also include Product Main, Product Definition, Product Policies, Kit Definition, Warehouse Information, Costing Product Availability Check, Product Balances, Product Reservations, Product Location Assignor, Product Lot Chooser, Product Serial Number Chooser. The WI Product category also includes a Lead Time Retriever class from the Warehouse External category described below.

The Product category contains methods and attributes that are common to all types of products that will be part of the application. Additional classes that are associated with the Product category include Product Warehouse Link, for connecting a product to the warehouses in which it stored, Product Unit Link, for connecting a product to classes describing the various units in which a product can exist, and Serial Number, which can optionally be used to list the specific serial numbers for a product.

Subclasses define a product as Non-lot Controlled or Lot Controlled and add capabilities unique to each type of product. The Lot Controlled class, in turn, will reference other classes, such as the Lot class for describing specific lots for a product, Quantity Unit class, for specifying the configuration of the product lots, and Descriptive Information, for containing information about a Lot of products.

The WI Product category includes classes that define whether the stock within a specific warehouse to subject to stock control and provide the structure necessary for tracking stock quantities. Such classes are part of the Warehouse Information category. Other subclasses hold references to a set of inventory objects that describe the inventory situation for one product in a single warehouse. Such categories reference classes that provide a place for business rules to be applied by the application to set attributes that control when and how often such stock will be counted. Other classes include Quantity Unit, Location Type, Location Chooser, Location Chooser Policy, and Inventory. The Inventory class is further specialized with subclasses that identify as either lot and/or location controlled. Inventory that is lot controlled references the Lot class for definition of a lot. Inventory that is location controlled references a Stock Location class for definition of the stock location.

d. Common Product Extension Example

Figure 8:
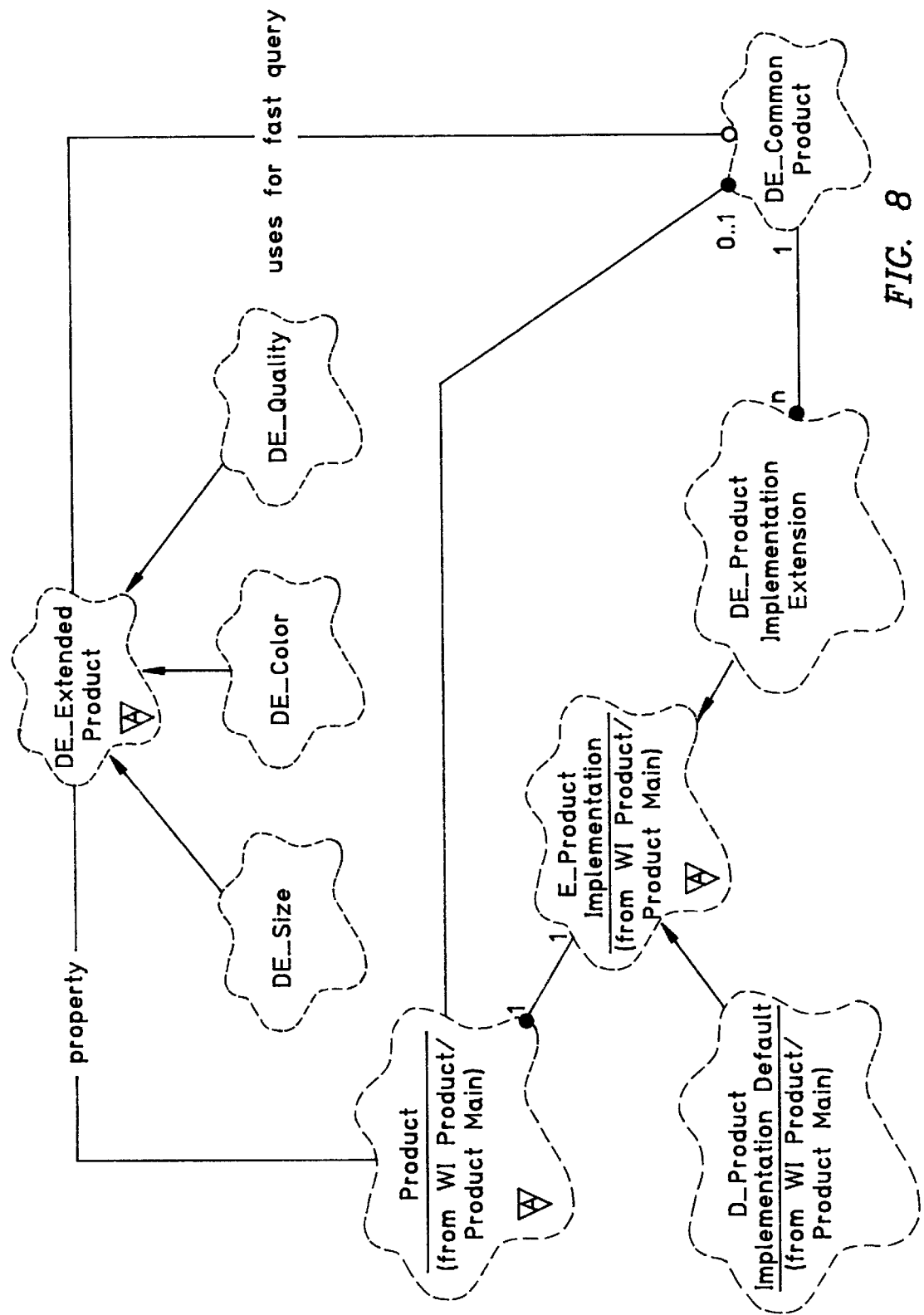
FIG. 8 is a class diagram of the WI Common Product Extension category illustrated in FIG. 4, showing the Extended Product class and related classes.

FIG. 8 is a class diagram that illustrates a product that has been extended from the core framework. The extended product includes the abstract base class Product, which references classes called Product Implementation and Extended Product. The Extended Product includes subclasses that further define the product in terms of Size, Color, and Quality. It should be clear to those skilled in the art that other subclass extensions for the Product may be depended upon by the framework user.

The Product Implementation class references classes called Implementation Default and Implementation Extension. The Implementation Extension class, Product class, and Extended Product class all reference a Common Product class.

e. WI Stock Take.

Figure 9:
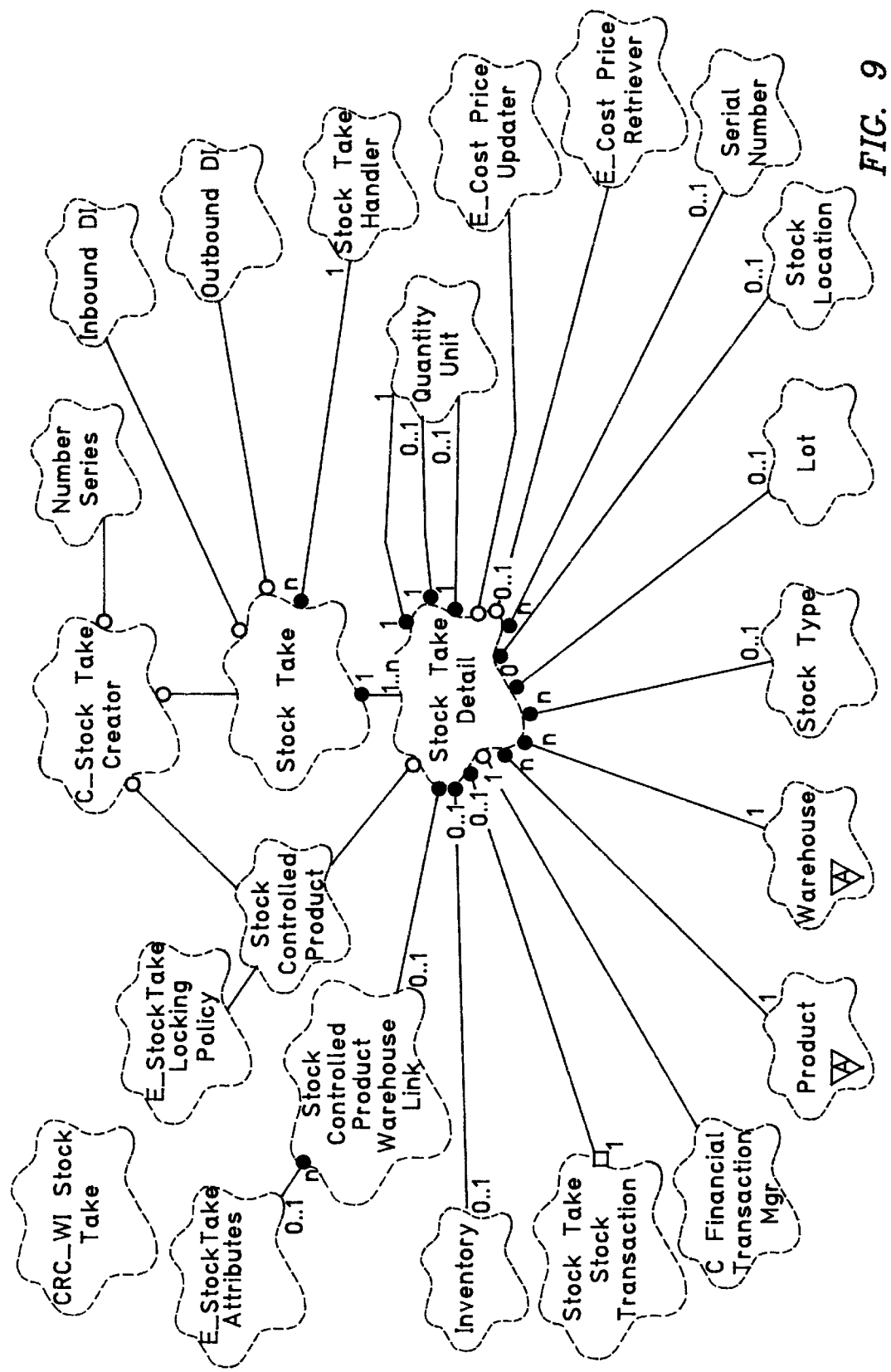
FIG. 9 is a class diagram of the WI Stock Take category illustrated in FIG. 4, showing the Stock Take class and related classes.
Figure 10:
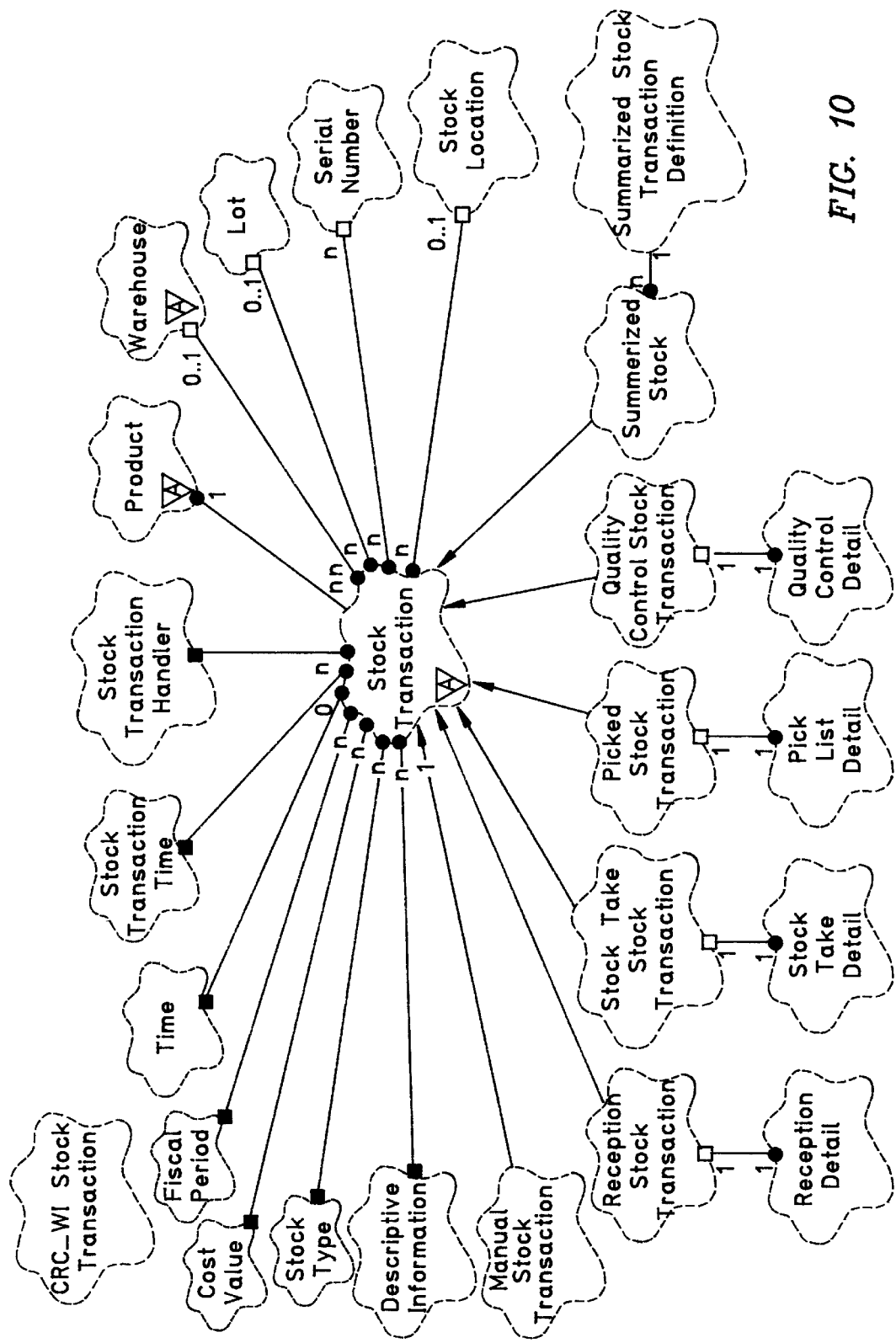
FIG. 10 is a class diagram of the WI Stock Transaction category illustrated in FIG. 4, showing the Stock Transaction class and related classes.

FIG. 9 is a class diagram that illustrates the characteristics of the WI Stock Take category illustrated in FIG. 4. The WI Stock Take category supports the process for counting physical stock on hand and selects stock to count. The category also creates a count document, records results of the count, analyzes results of the count, performs a recount if required, and updates stock figures. FIG. 9 shows three major classes, Stock Take Creator, Stock Take, and Stock Take Detail. The Stock Take Creator class drives the Stock Take process. This class interfaces with the external world to select which stock locations should be counted and creates instances of the stock take class, each of which groups together a list of stock take details. The stock take creator class uses or references a Stock Controlled Product class, which accesses product and inventory information for purposes of identifying stock take candidates, and Number Series, which assigns a control number for each Stock Take.

The Stock Take class groups together an arbitrary list of stock take details, such as all of the stock takes for a warehouse zone on a given day. This class processes external inputs to maintain the Stock Take class and records the results of the physical count. The Stock Take references or uses classes called Inbound Data Interchange, Outbound Data Interchange, and Stock Take Handler.

Each member of the Stock Take Detail class contains all information to define and process a single stock take task which usually involves counting a single product at the lowest level at which it is visible in inventory records, such as at one stock location. The Stock Take Detail class references numerous classes that define the units and inventory from which selection will be made.

f. WI Stock Transaction Definition.

The Stock Transaction classes provide a log for tracking all events resulting in goods going in or out of stock, such as due to picking, reception, or stock take. The log permits analyzing what transactions have made up the stock situation as it currently exists. The Stock Transaction Definition category defines the structure and behavior of all types of stock transactions. All stock transactions are associated with a Product and stock transactions are accessed through the product.

The preferred embodiment includes a Stock Transactions class that is an abstract class. Thus, it will be specialized by the framework developer according to various types of stock transactions. The Stock Transactions class references classes called Stock Transaction Handler, the person or department responsible for stock transactions. Stock Transaction Type, for example, taking stock or receiving stock. Date and Time, the date and time at which a transaction occurred, Fiscal period, the accounting period impacted by the transaction, Cost Value, the value of the transaction based upon the costing principal used. Stock Type, the stock impacted by the transaction, for example in quality, or transit, Descriptive Information, description of the transaction. Additional references may optionally be included for a Stock Transaction class member, including classes called Warehouse, Stock Location, Lot, Serial Number.

Some of the specialization for the Stock Transaction class are achieved through references to several classes. The classes include Manual Stock Transaction, which provides a record of after the fact maintenance of inventory records, Reception Stock Transactions, provides a record of completed receptions and is associated with a Reception Detail class as long as one exists. Other references are to Stock Take Stock Transaction, a record of a stock balance change resulting from a stock take action, it is associated with a Stock Take Detail class as long as one exists, a Picked Stock Transactions class, a record of completed stock picks that is associated with a Pick List Detail class as long as one exists. Other classes referenced by the Stock Transaction include Quality Control Stock Transaction class, which provides a record of a stock balance change resulting from quality control and is associated with a Quality Control Detail class as long as one exists, and Summarized Stock Transactions, which references Summarized Stock Transaction Definition class to provide a method to summarize stock transactions based upon various criteria, such as date, product, type and stock transaction type, if the number of transactions becomes a factor.

g. WI Manual Stock Transactions.

Figure 11:
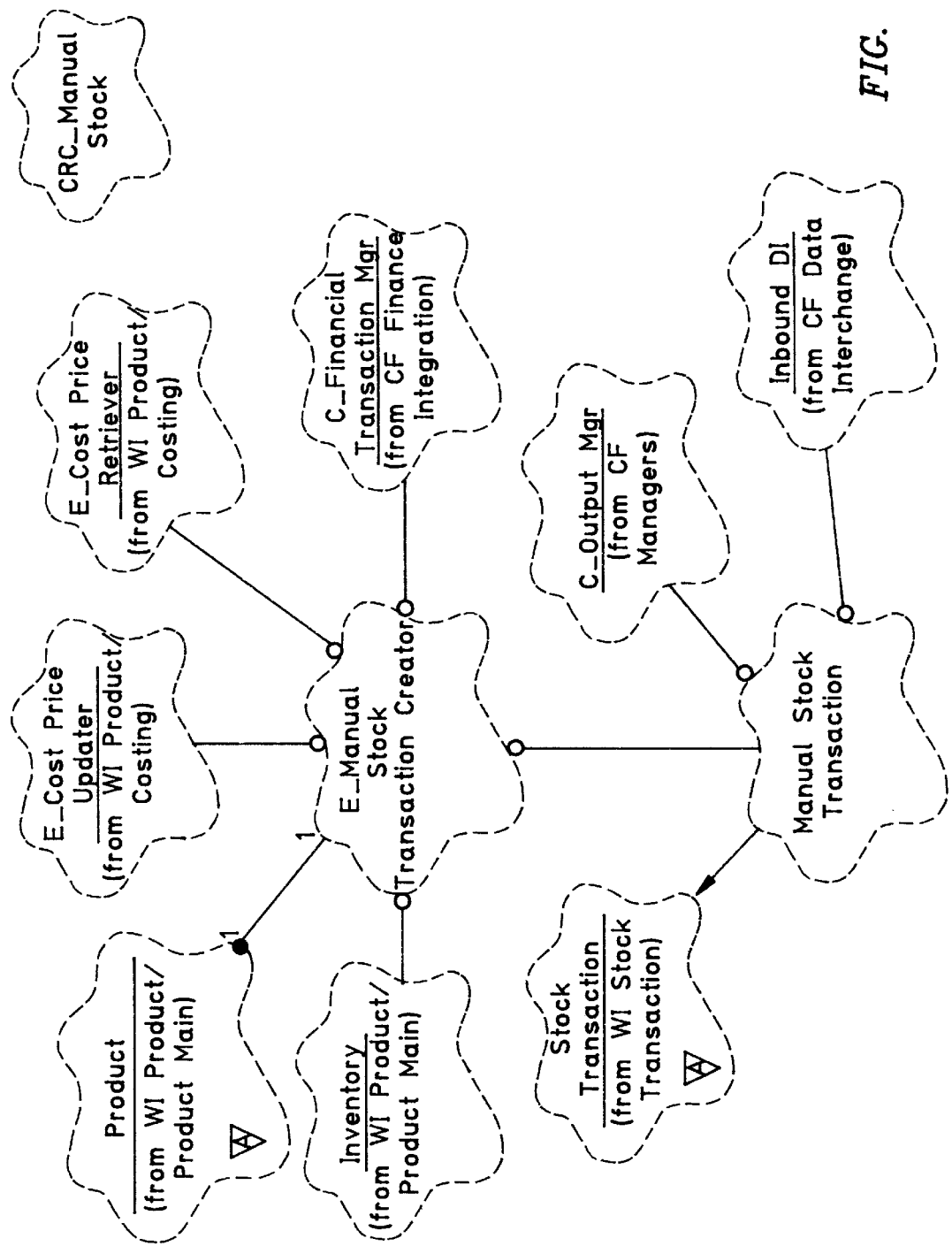
FIG. 11 is a class diagram of the WI Manual Stock Transaction category illustrated in FIG. 4, showing the Manual Stock Transaction Creator class and related classes.

FIG. 11 is a class diagram that illustrates the characteristics of the WI Manual Stock Transactions category illustrated in FIG. 4. The WI Manual Stock Transactions category handles miscellaneous receiving and issuing transactions of products for all types of stock. For each transaction, product availability is checked, product cost for bookkeeping is retrieved, and a reason code is added to identify why a product movement has taken place. The process is initiated by a request to a Product object to create a member of the Manual Stock Transaction class. The Product passes the request to the Manual Stock Transaction Creator method, which is an extension class responsible for creating the various types of manual transaction objects. This is a feature that a framework user application developer will add, incorporating business rules that control the creation of manual transactions.

Thus, the Manual Stock Transaction Creator will attend to the creation of the Manual Stock Transactions objects, which specialize the abstract Stock Transaction class to hold information that is unique to manual stock transactions and makes adjustments to stock balances and assigns reasons codes. The Manual Stock Transaction Creator uses a class called Inventory, which associates the stock transaction with inventory instances to validate and check availability as defined by business rules. The Manual Stock Transaction Creator class also uses Cost Price Updater, which updates cost price for the product and warehouse combination to reflect the impact of the stock transaction, Cost Price Retriever, which retrieves the cost price to be associated with the manual stock transaction, and Financial Transaction Manager, which creates an interface to General Ledger objects to reflect the impact of the Manual Stock Transaction object.

h. WI Stock Analysis.

Figure 12:
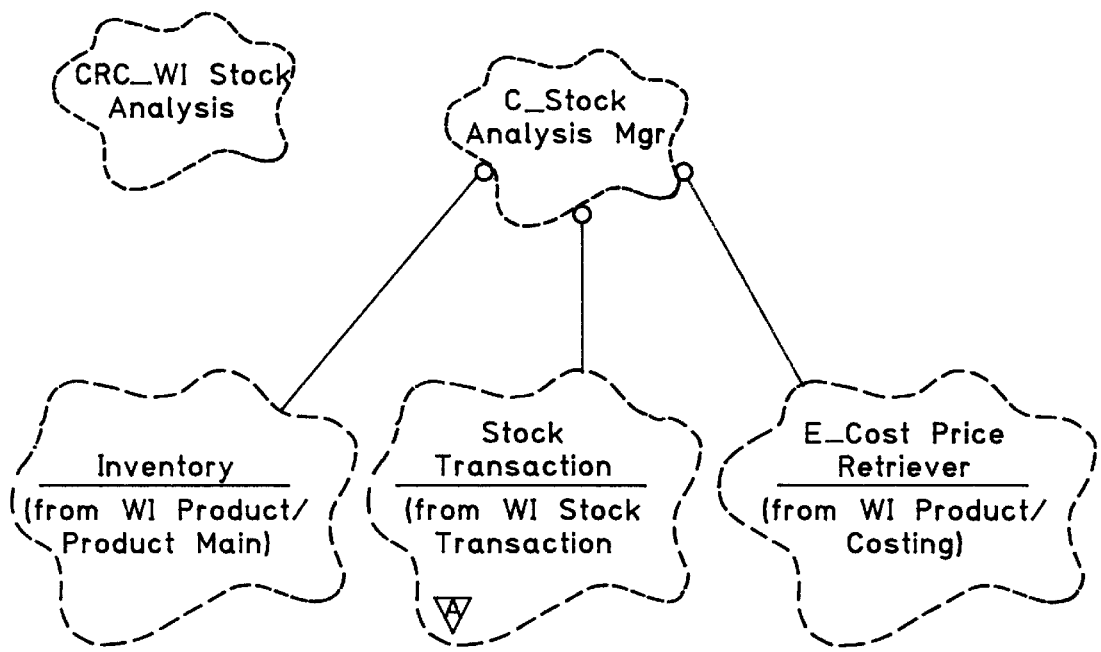
FIG. 12 is a class diagram of the WI Stock Analysis category illustrated in FIG. 4, showing the Stock Analysis Manager class and related classes.

FIG. 12 is a class diagram that illustrates the characteristics of the WI Stock Analysis category illustrated in FIG. 4. This category evaluates the current stock situation of supply verses demand. It also tracks movement into and out of stock for various products, and analyzes stock cost according to principles supported in the WI Product category.

i. WI Quality Control.

Figure 13:
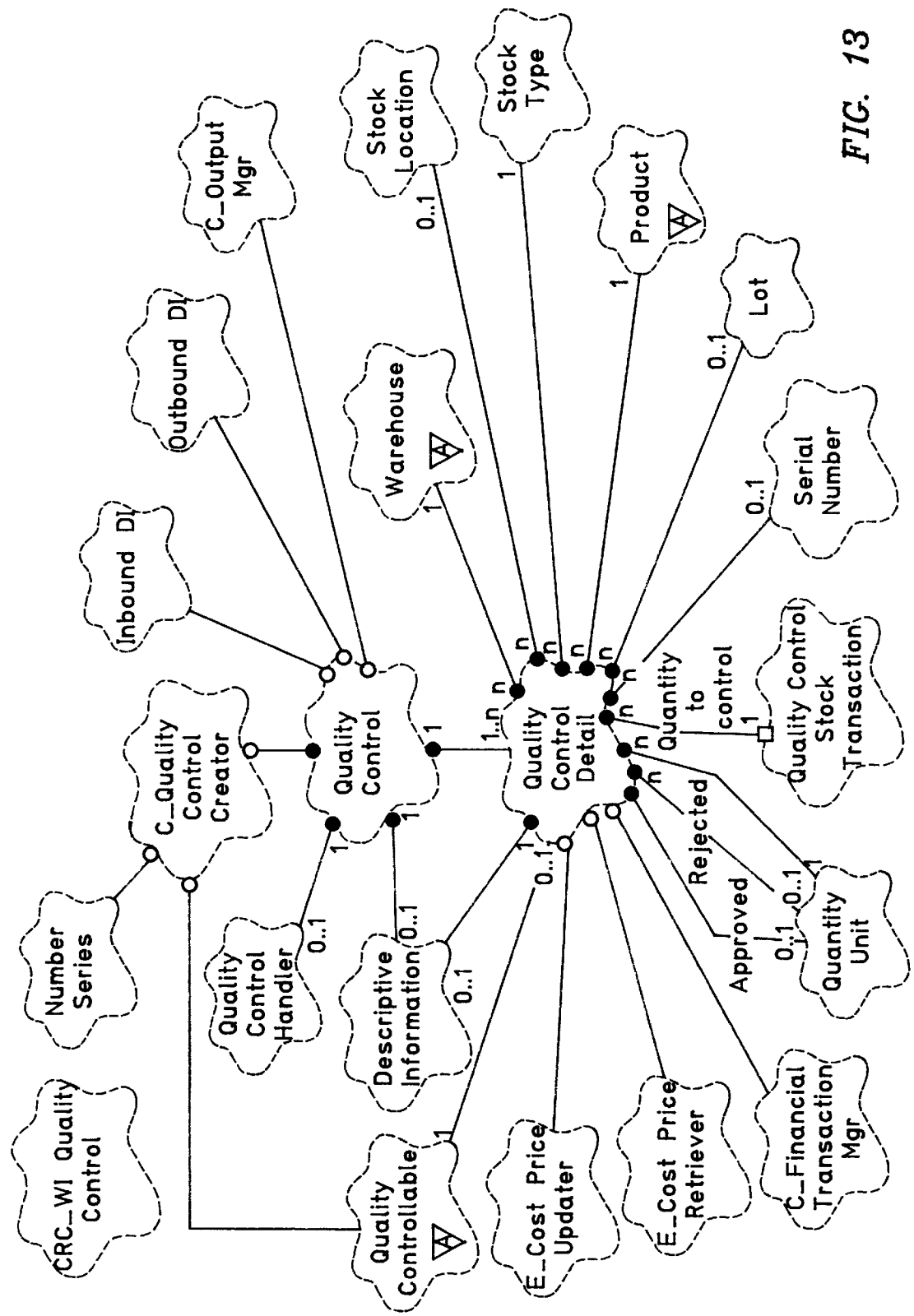
FIG. 13 is a class diagram of the WI Quality Control category illustrated in FIG. 4, showing the Quality Control Detail class and related classes.

FIG. 13 is a class diagram that illustrates the characteristics of the WI Quality Control category illustrated in FIG. 4. This category supports the process for inspection and quality control of products. It also creates documents to authorize inspection, records the results of inspection, and maintains quality control records and stock balances. A request for a quality control operation can originate from different processes, such as Reception or Picking. FIG. 13 shows that the WI Quality Control category includes various classes including Quality Controllable, Quality Control Creator, Quality Control, and Quality Control Detail.

The Quality Controllable class is an abstract base class that captures the common aspects of any quality control activity that has been requested by one of the specific processes, including Reception Quality Control from Stock.

The Quality Control Creator drives the quality control process. This class interfaces with the external world to determine which Quality Controllable class members to process and creates instances of the Quality Control class, each of which groups together a list of Quality Control Detail members. The Quality Control Creator uses or references classes called Quality Control Detail, which are the input provided by other processes to be used to create Quality Control Detail members, and Number Series, which assign a control number for each Quality Control object.

The Quality Control class is used to group together an arbitrary list of control details. For example, all products from a given reception action might be subjected to a quality control activity. The Quality Control class processes external input to maintain the class and record the results of the quality inspection. As shown in FIG. 13, this class references or uses: the Inbound Data Interchange class, an extension point to accept external inputs to maintain the Quality Control or record results; Outbound Data Interchange, an extension point to feed the quality control to external destinations; Quality Control Handler, which identifies the person responsible for the quality actions; Descriptive Information, a free form data class to describe the Quality Control activity, and may be the requestor's notes on why a particular group was sent to quality; and Output Manager, an extension point to permit interface with application-specific printing functions.

Each member of the Quality Control Detail class contains all information to define and process a single quality control task. Members of this class reference numerous classes to perform the quality control task. The Warehouse class identifies the warehouse responsible for the products to be inspected for quality. The Stock Location class identifies the stock location from which a product to be inspected will be taken. The Stock Type class identifies the stock type being inspected. The Product class identifies the product to be inspected. The Lot class specifies a lot with which a Quality Control Detail class may be associated, if applicable, and Serial Number identifies the serial number to be inspected, if applicable.

The Quality Control Stock Transaction class creates a stock transaction to record any stock balance adjustments taken, based upon the results of the Quality Control action. The Quantity Unit defines the units in which the quantities for the Quality Control action are stated. Quantities include the quantity sent to quality control, the quantity rejected, and the quantity approved. The Financial Transaction Manager class creates an interface to the General Ledger to reflect any stock balance adjustments taken, based upon the results of the quality control action. The Cost Price Retriever class associates a cost price with any stock balance adjustment taken, based upon the results of the quality control action. The Cost Price Updater class potentially updates the cost price for a product or a product and warehouse combination, based upon the results of the quality control action. Finally, the Quality Controllable class maintains tracking between the Quality Controllable Detail (that is, the quality control request) and the Quality Control Detail (that is, the quality control inspection).

j. WI Manual Product Reservations.

Figure 14:
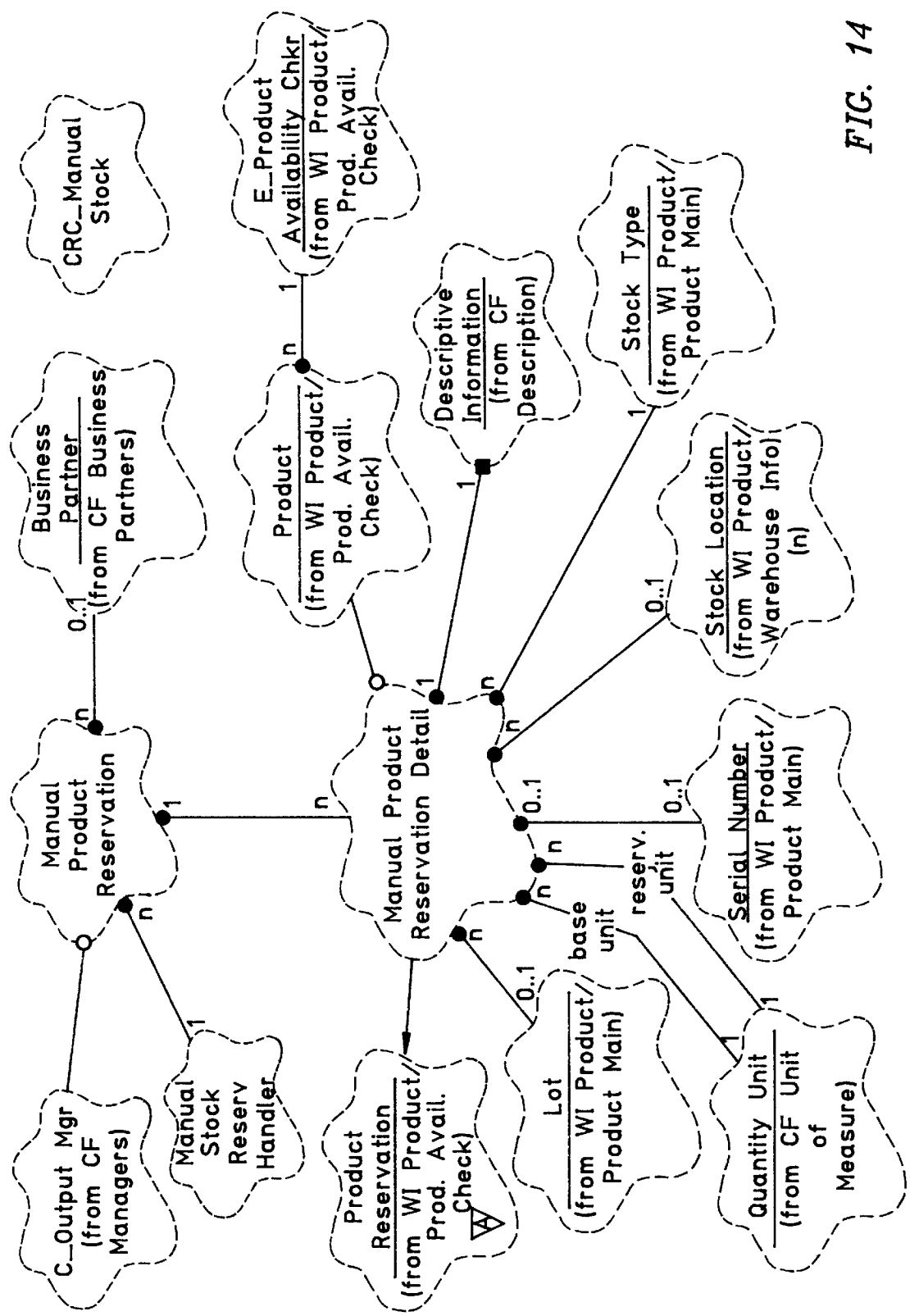
FIG. 14 is a class diagram of the WI Manual Products Reservations category illustrated in FIG. 4, showing the Manual Product Reservation Detail class and related classes.

FIG. 14 is a class diagram that illustrates the characteristics of the WI Manual Product Reservations category illustrated in FIG. 4. The WI Manual Product Reservations category creates and maintains reservations on current or future stock, depending on the implementation, and removes temporary reservations of stock when their time period has expired. This category includes a Manual Product Reservation class and a Manual Product Reservation Detail class. The Manual Product Reservation class is the means for grouping together an arbitrary list of Manual Product Reservation objects, for example, a list of products being temporarily removed from stock for display at a trade show. This class references or uses classes called Business Partner, the reservation may optionally be related to a specific customer or supplier, Manual Reservation Handler, which identifies the person responsible for a reservation, and Output Manager, an extension point to interface with application-specific printing functions.

Each object of the Manual Product Reservation Detail class contains information sufficient to define a specific product reservation. Members of this class reference other classes including Product Reservation, which is a parent class for the Manual Product Reservation, which references the parent class for common structure and behavior, Lot, which permits a reservation to be made for a specific lot of products, Quantity Unit, which defines the units in which the quantities for the Product Reservation Detail are stated. Quantity units include the base unit for the product and the unit in which the reservation quantity is stated. Other classes referenced by the Manual Product Reservation Detail class include Serial Number, Stock Location, Stock Type, and Descriptive Information, all of which relate to identifying and describing the product involved. The Manual Product Reservation Detail class also references the Product Availability Checker class, which is accessed via the Product class to check for a quantity available to be reserved.

6. WE Category Diagram

As noted above, the inventors of the present framework have identified a set of OOP classes most likely to be desired by developers of warehouse control application programs and have defined the relationships between such classes. Those skilled in the art will recognize that such classes can be overridden by users of the framework in that framework users who are developing applications can incorporate extensions and additions that suit the purposes of the user. In this way, the framework categories provide a base of information from which extensions can be developed by program developers.

The categories of the Warehouse External portion of the framework will be referred to with a preceding "WE" and the categories of the Warehouse Internal portion of the framework will be referred to with a preceding "WI", unless not required by the context in which the category is being described.

Figure 15:
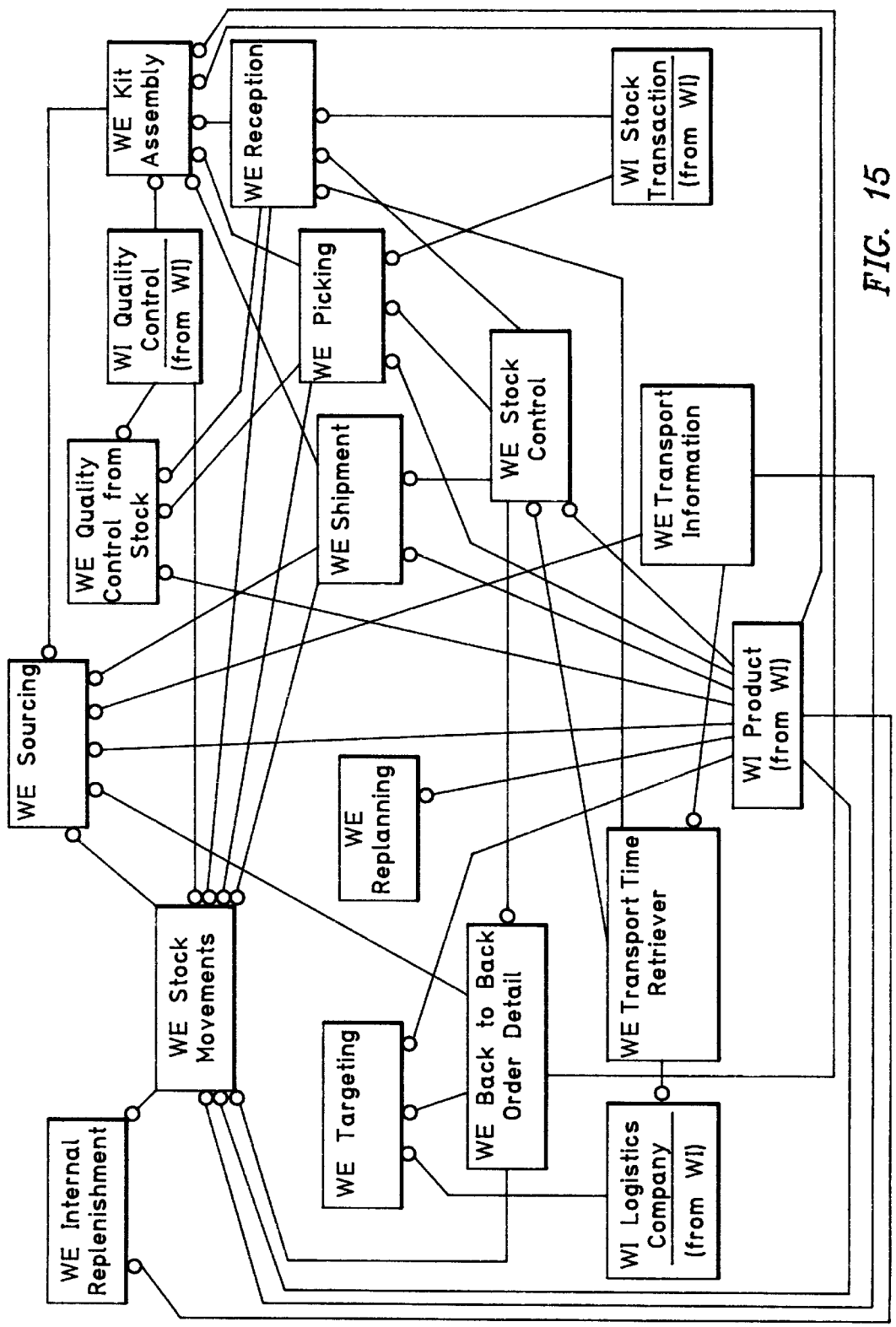
FIG. 15 is a category diagram representation of the WE categories.

FIG. 15 is a category diagram representation of the categories that comprise the WE mechanism. Those skilled in the art will appreciate that the categories illustrated in FIG. 15 correspond to OOP classes that capsulate data attributes and behavior, and are stored in the memory of the computer system illustrated in FIG. 2. Such objects can be implemented, for example, in a computer system operating environment that supports the C++ programming language.

The WE mechanism includes a Stock Control category that contains attributes and methods required by any movement into and out of stock. The WE mechanism also includes categories called Picking, Reception, Shipment, Targeting, Sourcing, Kit Assembly, Transport Time Retriever, Transport Information, Back to Back Order Detail, Stock Movements, Quality Control From Stock, and Internal Replenishment. The WE category also makes use of categories from the Warehouse Internal (WI) category, namely, WI Product, WI Logistics Company, and WI Quality Control.

7. WE Class Diagrams

The description of the WE classes will use the widely followed convention that class names comprise descriptive words whose initial letters are upper case.

a. WE Stock Control.

Figure 16:
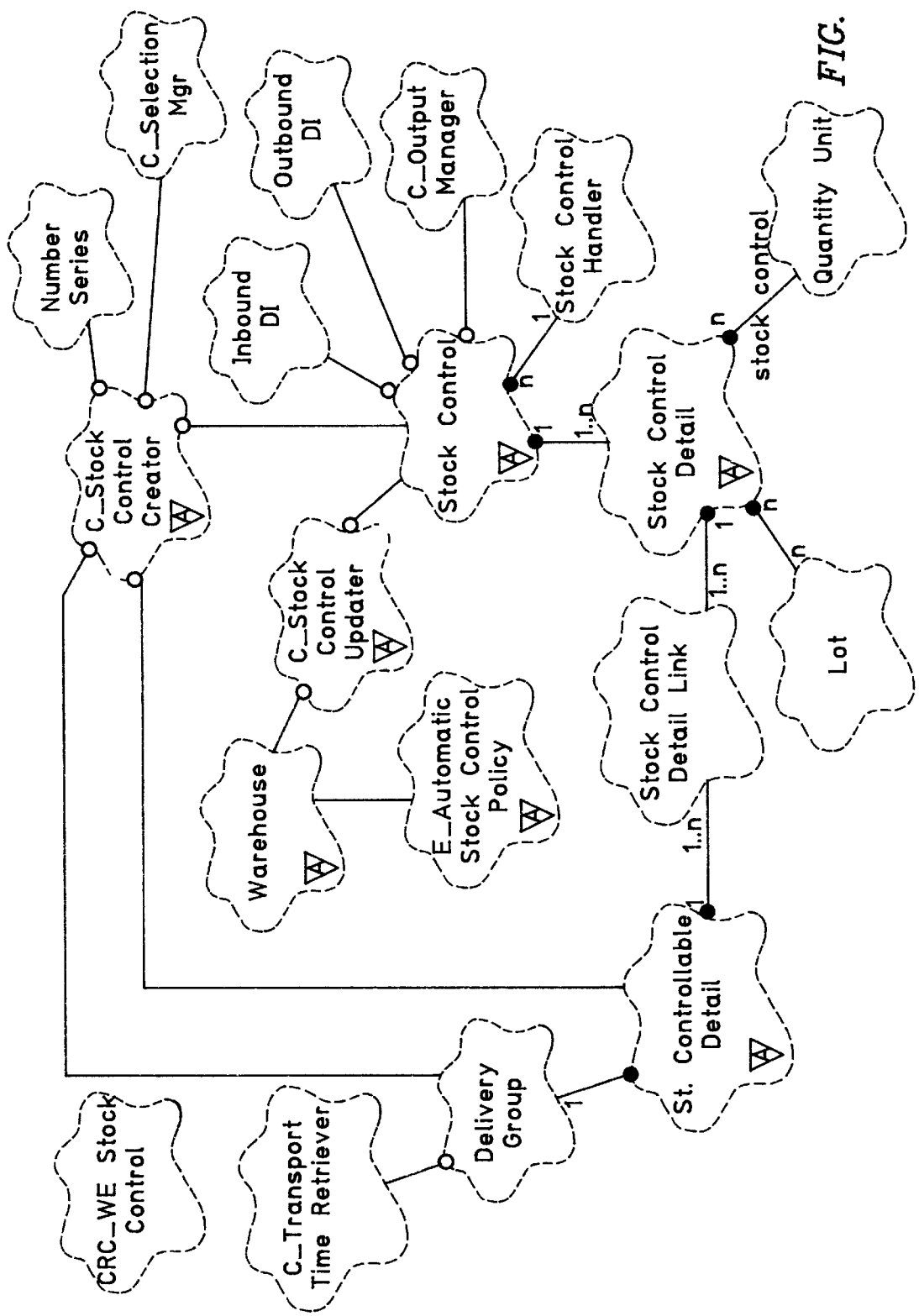
FIG. 16 is a class diagram of the WE Stock Control category showing the Stock Control class and related classes.

FIG. 16 is a class diagram that illustrates the characteristics of the category called WE Stock Control. The various processes that track product movements in the warehouse have structure and behavior in common. This commonality is modeled in the Stock Control category and is referenced or inherited by each of the individual processes. FIG. 16 shows that the Stock Control category includes primary classes called Stock Controllable Detail, Stock Control Creator, Stock Control, Stock Control Updater, and Stock Control Detail.

The Stock Controllable Detail class is an abstract base class that captures the common characteristics of any stock control task that has been identified by one of the specific processes as being ready to proceed. These processes include, for example, the pickable, shippable, and receivable processes. This class references classes called Delivery Group and Stock Control Detail Link. The Delivery Group class permits the aggregation of several stock control activities into a single delivery group. Such an aggregation must be processed all at the same time. The Stock Control Detail Link is described further below.

The Stock Control Creator class drives the stock control process. This class interfaces with the external world to select the particular controllable details that should be processed and creates instances of the Stock Control class, each of which groups together a list of controllable details. The Stock Control Creator class uses or references classes called Stock Controllable Detail, Delivery Group, Number Series, and Selection Manager. The Stock Controllable Detail class is described further below, and provides inputs from other processes requesting a stock control activity. The Delivery Group was described above, as was the Number Series. The selection manager queries the Stock Controllable Detail to select which selections to process.

The Stock Control class represents a proposal for stock control activity. This class aggregates one or more Stock Control Detail instances, each of which defines a specific picking, shipping, or reception activity. This class processes external inputs to maintain the Stock Control proposal and confirms when it has been completed. The Stock Control class references or uses classes called Inbound Data Interchange, Outbound Data Interchange, Output Manager, and Stock Control Handler. The Inbound and Outbound Data Interchange classes provide extension points to accept external confirmation inputs or destinations, respectively. The Output Manager provides an extension point to interface with application-specific printing functions. The Stock Control Handler identifies the person responsible for the stock control activity.

The Stock Control Updater class provides a common base for handling different types of automatic confirmation for Stock Control activities. This class determines if there exists a policy with the chain of responsibility that will permit the stock activity to be confirmed without additional inputs and, if so, it will interact with the Stock Control class to confirm. The Stock Control Updater class references the Warehouse class and the Automatic Stock Control Policy class. The Warehouse class is the starting point to see if an automatic confirmation policy exists within the chain of responsibility for the stock item. The Automatic Stock Control Policy class is an extension class that permits the framework user/application developer to implement the company policy.

The Stock Control Detail class represents the common aspects of each specific picking, shipping or reception activity. This class references classes called Quantity Unit to define the units in which the quantity for the stock control detail is stated. Lot, which may or may not be associated with a particular stock item, and Stock Control Detail Link, which provides tracking between the input and the results for a Stock Controllable Detail class member.

b. WE Picking.

Figure 17:
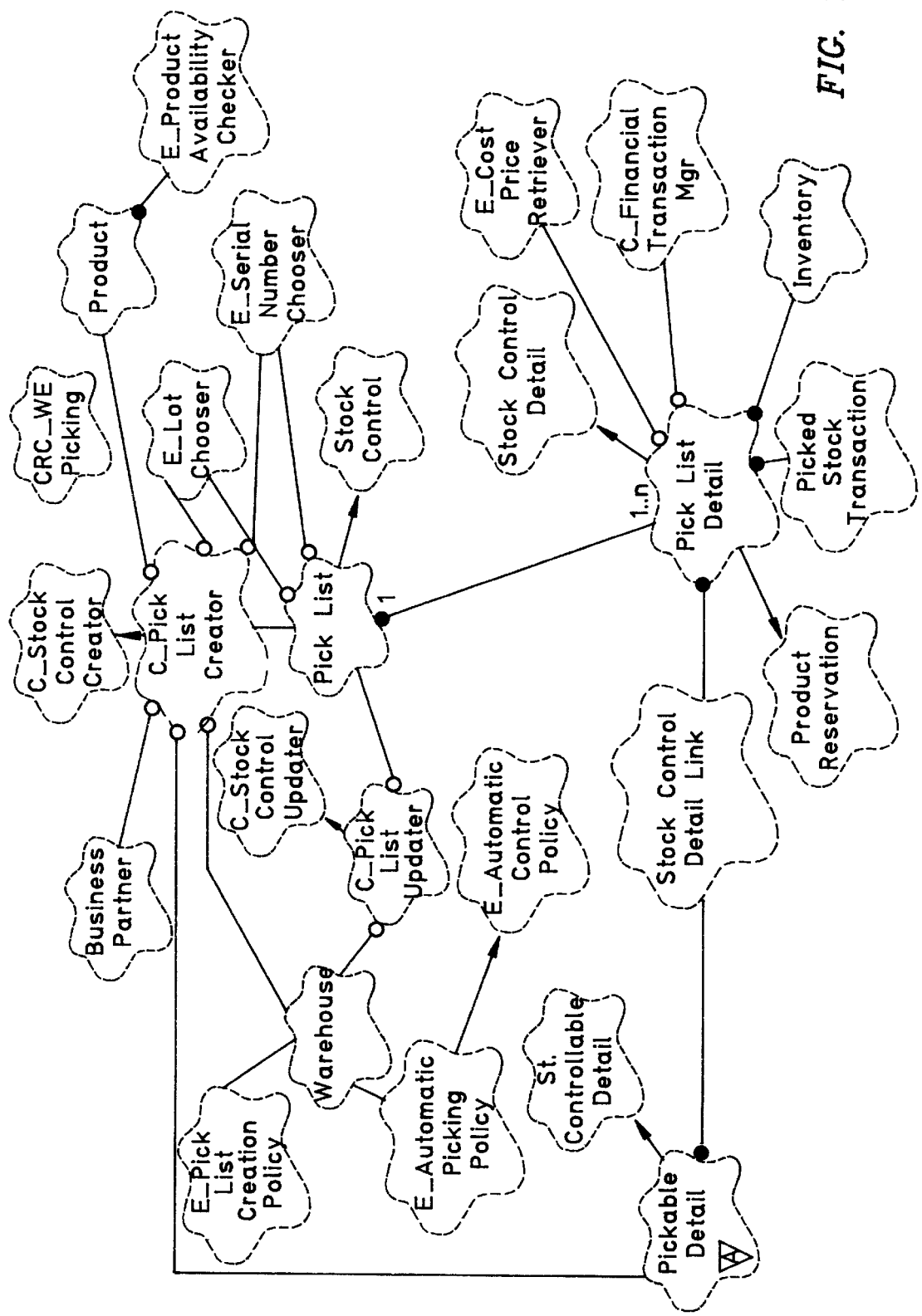
FIG. 17 is a class diagram of the WE Picking category illustrated in FIG. 15, showing the Pick List Creator class and related classes.

FIG. 17 is a class diagram of the WE Picking category, which manages all picking (or selection) from stock for sales orders, stock movements, kit assembly, and the like. This category enables prioritizing between demands from different sources to different destinations. This category covers the entire pick process from the creation of a pick demand to the completion of the pick, the process includes creation and management of a pick proposal, creation of a pick document, and confirmation of a pick result. The WE Picking category inherits much of its structure and behavior from the WE Stock Control category, which should be referred to for details of the stock picking operation.

The WE Picking category includes a Pickable Detail class, which specializes the Stock Control Detail class and adds the aspects common to all demands that are ready for picking. Each process that needs to pick products from stock, such as sales order picking and kit assembly picking, will further specialize the Pickable Detail class by defining a subclass that supports the unique requirements of that process.

The WE Picking category also includes the Pick List Creator class, which creates a pick list proposal for a pick list directly without going through a proposal stage. This class obtains much of its structure and behavior from the Stock Control Creator class and adds those capabilities specific to the creation of the pick lists. The Pick List Creator class also references other classes, specifically Warehouse, Product, Business Partner, Lot Chooser, Serial Number, and Location Chooser.

The Warehouse class is used to determine the pick list creation policy for the company. The Pick List Creation Policy class is an extension class where the application provide/framework user can add their business rules to control such things as grouping of multiple orders or diverse types of picking detail onto the same pick list.

The Product class permits product availability to be checked right before the pick list is proposed. The Product Availability Checker is an extension class where the application provider/framework user can add their business rules as to when and how availability is checked and how results of the check are handled.

The Lot Chooser class is an extension class where the application provider/framework user can implement business goals for determining which lot to assign to a Pick List Detail class for products that are under lot control. Lots may be assigned in any one of three ways. First, when the Pick List class is created, by the Pick List class when the Pick List is printed, and by manual input when the Pick List is confirmed. The remaining classes were defined adequately above.

The Pick List class holds the attributes and operations for a pick list. A pick list is an arbitrary grouping of Pick List Details. For example, all of the pick list details associated with a single sales order. This class is responsible for maintenance and confirmation of a pick list proposal or a pick list. This class obtains much of its structure and behavior from the Stock Control class and adds those capabilities specific to a pick list.

The Pick List Detail class represents a specific activity to pick a quantity of a product from stock. This class obtains much of its structure and behavior from the Stock Control Detail class and adds capabilities specific to a pick list detail. The Pick List Detail class is a type of product reservation that need to be considered by the product availability checker. The Pick List Detail is a type of product reservation that needs to be considered by the Product Availability Checker. The Picked Stock Transaction class creates a Stock Transaction when the Pick List Detail is confirmed. The Inventory class identifies the inventory instance against which the pick is to be or has been made. The Financial Transaction Manager class creates a General Ledger interface to reflect the pick from stock, and the Cost Price Retriever calculates the cost price for the pick list detail.

c. WE Reception.

Figure 18:
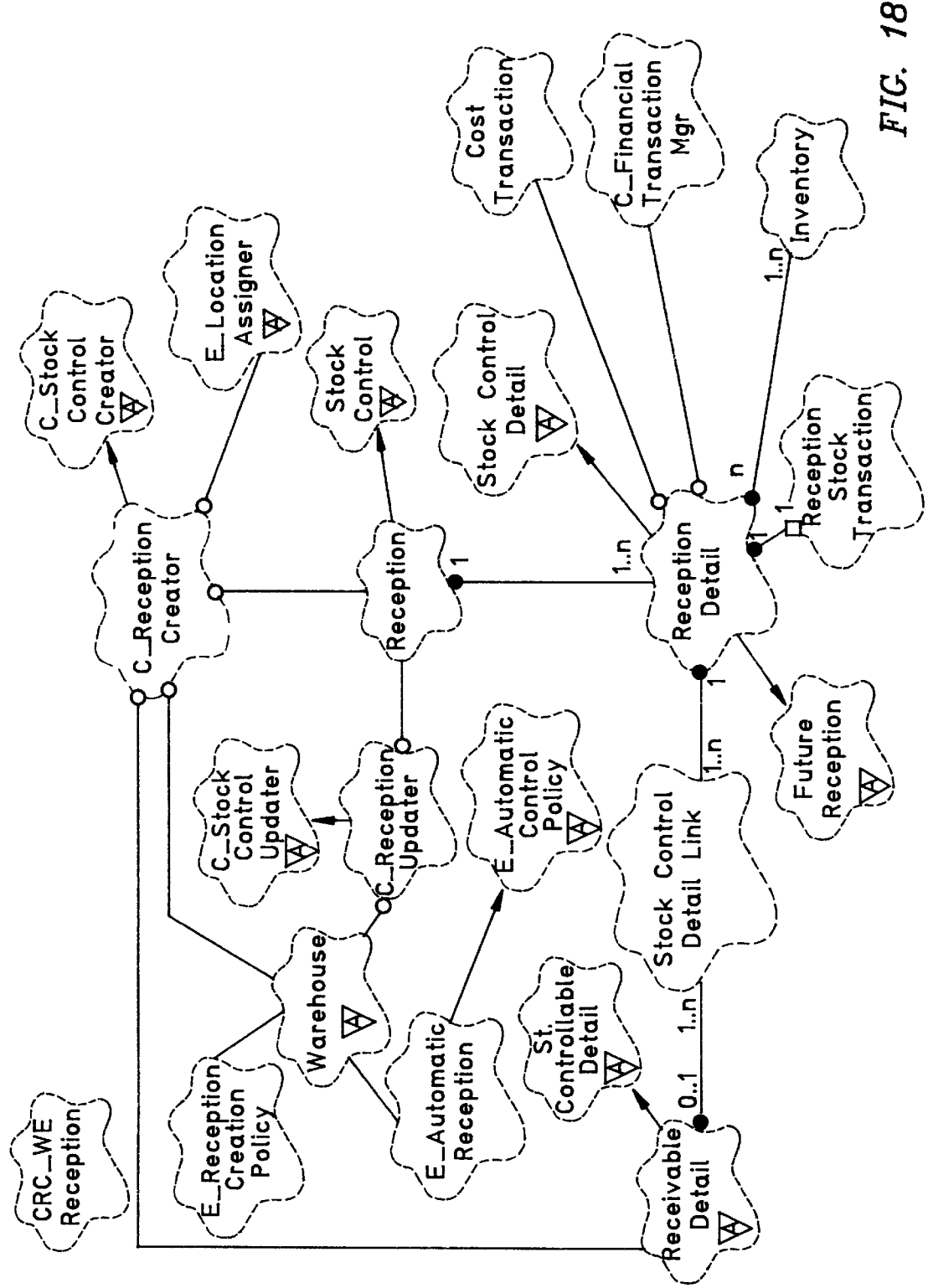
FIG. 18 is a class diagram of the WE Reception category illustrated in FIG. 15, as abstracted from the WE Stock Control category.

FIG. 18 is a class diagram representation of the WE Reception category, which manages all planned and unplanned reception of products into the stock, whether from purchase orders, kit assembly, stock movements, or the like. This category inherits much of its structure and behavior from the WE Stock Control category, which was described above in connection with the FIG. 16 WE Stock Control category diagram.

The WE Reception category includes the Receivable Detail class, which specializes the Stock Control Detail class and adds the aspects common to all types of receptions. Each process of this class that needs to receive products into stock (such as purchase order reception, reception of kit assemblies, etc.) will further specialize the Receivable Detail class by defining a subclass that supports the unique requirements of that process.

The WE Reception category also includes Reception Creator class, which creates the Reception class. The Reception Creator class groups together one or more Reception Detail class members each of which is a specific instance of a product being received. The Reception Creator class obtains much of its structure and behavior from the Stock Control Creator class and adds those capabilities specific to the creation of Reception members.

The Reception Creator class references the Warehouse class, which determines the reception creation policy for the company. The Reception Creation Policy class is an extension class where the application provider can add their business rules to control the creation of Reception class members. The Reception Creator class also references the Location Assignor class, which is an extension class where the application can add capabilities the stop location where a Reception Detail class member will be stopped. The default behavior in the framework will probably be to assign the primary stock location from the related Product Warehouse instance.

Also referenced by the WE Reception category are reception class members. The Reception class holds the attributes and operations for a Reception. This class is responsible for maintenance and confirmation of a Reception. The class obtains much of its structure and behavior from the stop control class and adds those capabilities specific to a Reception class member.

The WE Reception category also includes the Reception Detail class, which represents a specific activity to receive a quantity of a product into stock. This class obtains much of its structure and behavior from the Stock Control Detail class and adds those capabilities specific to a Reception Detail class member. This class additionally references a class called Future Reception. The Reception Detail is a Future Reception class that needs to be considered by the Product Availability Checker until the reception process is completed. The Reception Detail class also references the Reception Stock Transaction, which creates a Stock Transaction class member when the Reception Detail category is confirmed. The Reception Detail class also references the Inventory class, which identifies the Inventory instance into which the reception is to be or has been stopped, the Financial Transaction Manager class creates a General Ledger interface to reflect the reception into stock.

d. WE Shipment.

Figure 19:
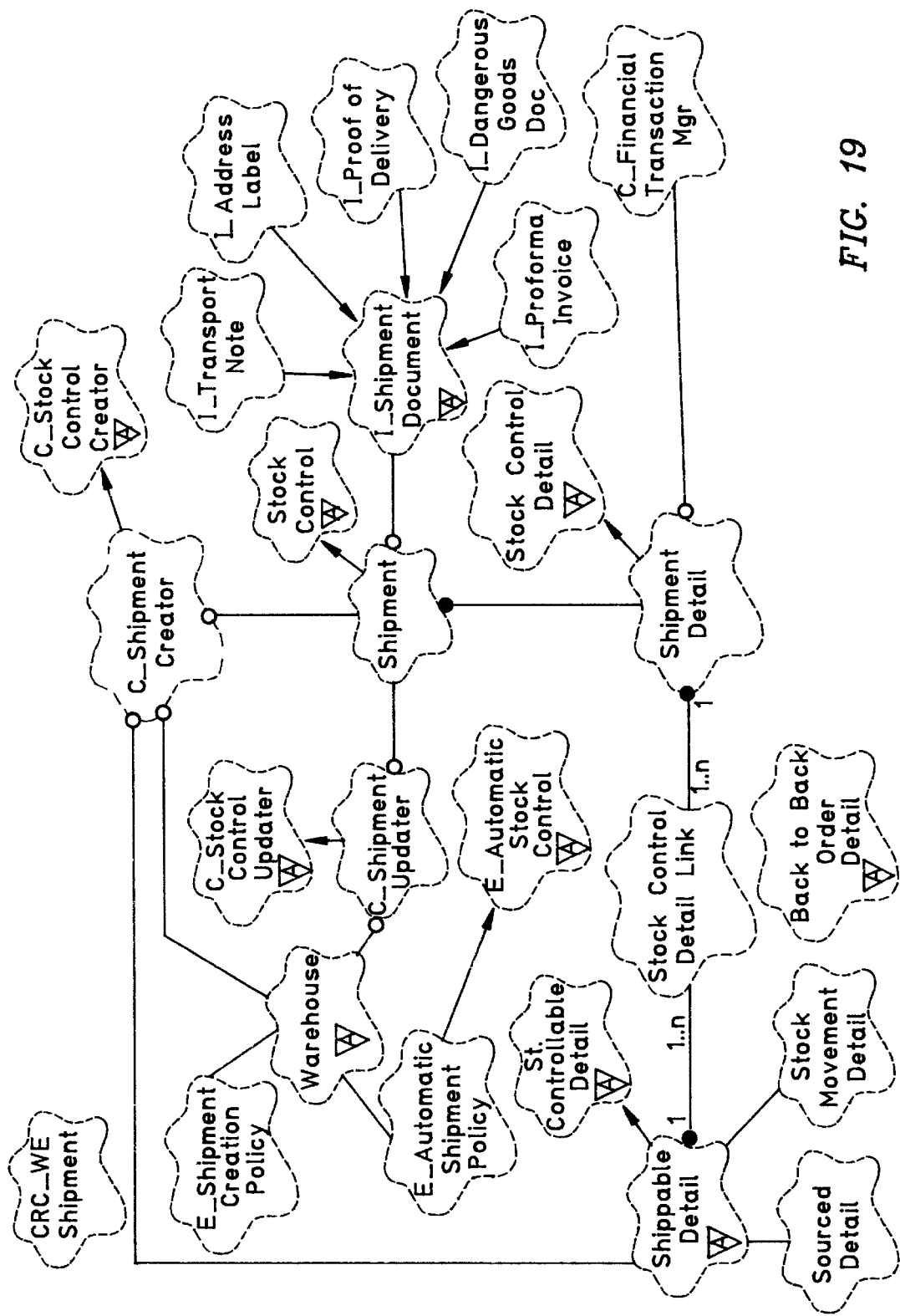
FIG. 19 is a class diagram of the WE Shipment category illustrated in FIG. 15, as abstracted from the WE Stock Control category.

FIG. 19 is a class diagram that illustrates the WE Shipment category, which manages all shipments from the warehouse. This category creates a shipment proposal from order lines, and confirms when the shipment leaves the warehouse. The WE Shipment category inherits much of its structure and behavior from the WE Stock Control category, which was described above in connection with the FIG. 16 category diagram.

The WE Shipment category includes the Shippable Detail class, which specializes the Stock Control Detail class (see FIG. 16) and adds aspects common to all types of shipments. Each process that needs to ship products will further specialize the Shippable Detail class by defining a subclass that supports the unique requirements of that process. There are three examples of the specialized Shippable Details class shown in FIG. 19. The examples include a Sourced Detail class, a Stock Movement Detail, and a Back-to-Back Order Detail class.

The Sourced Detail class relates to an order detail for which the source has been determined. The Stock Movement Detail class describes a detail that is being moved between locations within the Company. The Back to Back Order Detail class is used when a detail that has been received on a supply order (purchase order) is being shipped to satisfy a directly related demand order (sales order).

The WE Shipment category also includes a Shipment Creator class, which creates the Shipment class and is used for grouping together one or more Shipment Details, each of which is a specific instance of a quantity of a product being shipped. This class obtains much of its structure and behavior from the Stock Control Creator class and adds those capabilities specific to the creation of Shipment objects. This Creator class additionally references the Warehouse class, which determines the Shipment creation policy for the company. The Shipment Creation Policy class is an extension class where the application provider/framework user can add their business rules to control the creation of Shipment class members.

The Shipment class within the WE Shipment category holds the attributes and operations for a shipment. This class is responsible for the maintenance and confirmation of the shipment and obtains much of its structure and behavior from the Stock Control class and adds those capabilities specific to a Shipment. The Shipment class also references the Shipment Document class which is an example interface class that is provided along with the frameworks that will likely be replaced by application providers/framework users to produce the necessary shipment documents required in support of customer businesses.

Lastly, the WE Shipment category includes a Shipment Detail class, which represents a specific activity to ship a quantity of a product. The Shipment Detail class obtains much of its structure and behavior from the Stock Control Detail class and adds those capabilities specific to a Shipment Detail. In addition, the Shipment Detail references the Financial Transaction Manager class, which creates a General Ledger interface to reflect the shipment.

e. WE Targeting.

Figure 20:
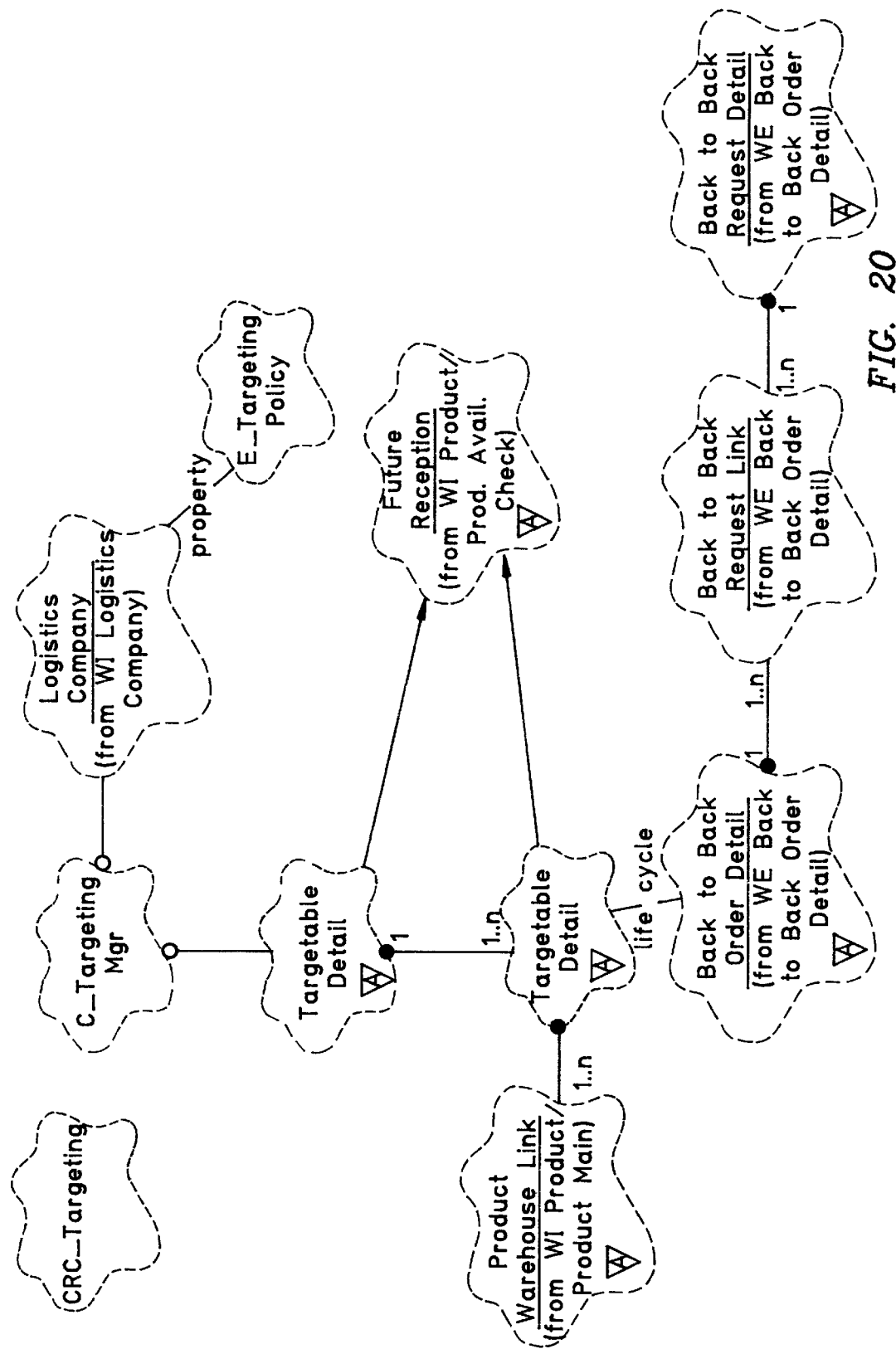
FIG. 20 is a class diagram of the WE Targeting category illustrated in FIG. 15, as abstracted from the WE Stock Control category.

FIG. 20 is a class diagram that illustrates the WE Targeting category, which decides how future receptions are to be used. Receptions may be targeted to a specific order, or a to a warehouse or to the like. The WE Targeting category permits redirecting a future reception designated for a specific sales order, known as a back-to-back order. The WE Targeting category includes three classes called Targeting Manager, Targetable Detail, and Targeted Detail.

The Targeting Manager class has overall responsibility for assigning a target for which a future delivery will be delivered or providing target alternatives. If successful, the Targeting Manager will create one or more Targeted Detail instances for each Targetable Detail. The Targeting Manager class also uses a class called Targeting Policy, which is an extension class associated with the company. The Targeting Policy class defines a policy for the Targeting class. The policy includes such things as available targets and default targets.

The WE Targeting category also includes the Targetable Detail class, which provides the common structure and behavior for any future reception for which a target needs to be identified. Each process that is to assign a target will further specialize the Targetable Detail class by defining a subclass that supports the unique requirements of that process. Initially, only Purchase Order class members will create a Targetable Detail class member, but later this might be expanded to include other processes such as Production Orders. The Targetable Detail class references the Future Reception class, as the Targetable Detail is a type of Future Reception class member, which needs to be considered by the Product Availability Checker.

The WE Targeting category also includes the Targeted Detail, which represents a quantity of a product to be delivered to a specific target when it is received. The Targeted Detail class references the Product Warehouse Link class and the Back to Back Order Detail class. The Product Warehouse Link identifies the warehouse that will receive the targeted detail, if the product is targeted to stop. The back to back Order Detail comprises a supply and is referenced by the Targeted Detail class if the Targeted Detail is allocated to a specific sales order, that is, back to back orders. The back to back order detail class is linked via the Back to Back Request Link to the back to back Request Detail.

f. WE Sourcing.

Figure 21:
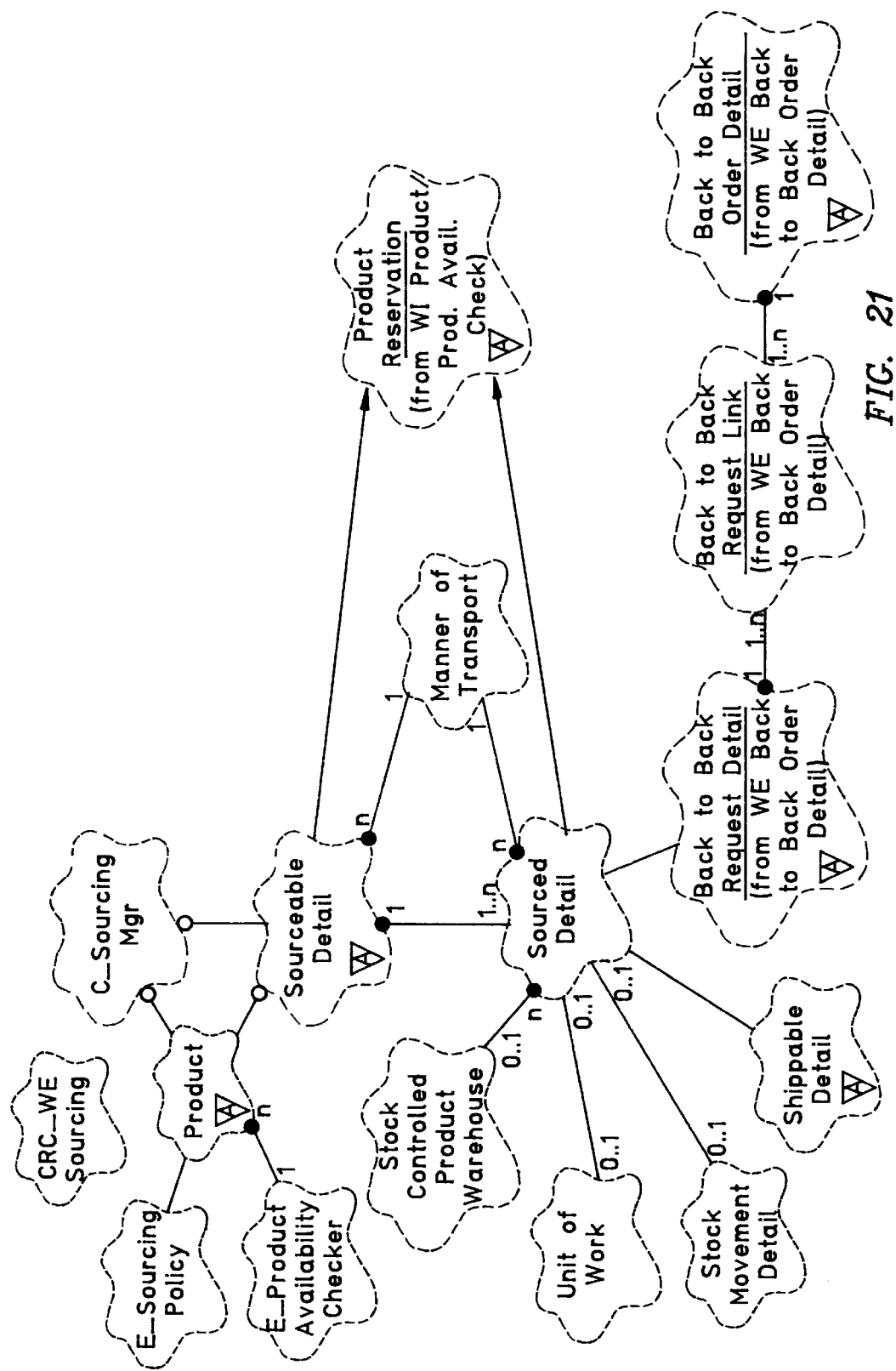
FIG. 21 is a class diagram of the WE Sourcing category illustrated in FIG. 15, showing the Sourcing Manager class and related classes.

FIG. 21 is a class diagram of the WE Sourcing category, which includes the Sourcing Manager class, the Sourceable Detail class, and the Sourced Detail. The WE Sourcing category decides the location from which an order line is to be delivered, for example, a warehouse, a supplier, or a kit assembly. The decision is based upon business rules of the category.

The Sourcing Manager has overall responsibility for assigning the source from which delivery is to be made to satisfy a demand or provide sourcing alternatives. If successful, the Sourcing Manager will create one or more Source Detail class instances for each Sourceable Detail class member. The Sourcing Manager also uses the Sourcing Policy class, which is an extension class associated with a product, and defines policy and the chain of responsibility for sourcing. The Sourcing Policy includes such things as the order in which to consider sources, preferred or default sources and the like.

The WE Sourcing category also includes the Sourceable Detail class, which provides the common structure and behavior for any type of demand for which a source needs to be identified. Each process that needs to assign a source will further specialize the Sourceable Detail class by defining a subclass that supports the unique requirements of that process. Only Sales Orders will initially Sourceable Detail, but later this might be expanded to include other processes such as Production Orders. The Sourceable Detail class references the Product Availability Checker class, the Manner of Transport, and the Product Reservation. The Product Availability Checker is an extension class where the application provider/framework user can plug in business rules for assessing the availability of the product being sourced in the main warehouse, in other warehouses, and for ordering. The Manner of Transport identifies the manner of transport requested for the detail being sourced. The Product Reservation is a parent class to the Sourceable Detail class, because the Sourceable Detail class is a type of product reservation that needs to be considered by the Product Availability Checker.

The WE Sourcing category also makes use of the Sourced Detail class, which represents a quantity to be obtained from a specific source to satisfy part or all of a demand, for example, sales order detail. The Sourced Detail references five different classes. The first class referenced is called Stock Controlled Product Warehouse, if sourced from stock, this is the warehouse that will supply the Sourced Detail. A Unit of Work, which if sourced as a kit assembly, it will supply the Sourced Detail. Also referenced, is the Stock Movement Detail class if sourced from a remote warehouse, this is the stock movement that will supply the Sourced Detail. The Back to Back Request Detail class is referenced by the Sourced Detail class if the Sourced Detail is to be supplied by a specific purchase order. That is, if there are back to back orders. The Sourced Detail that is linked via the back to back request link to the back to back order detail (that is, the supply).

g. WE Kit Assembly.

Figure 22:
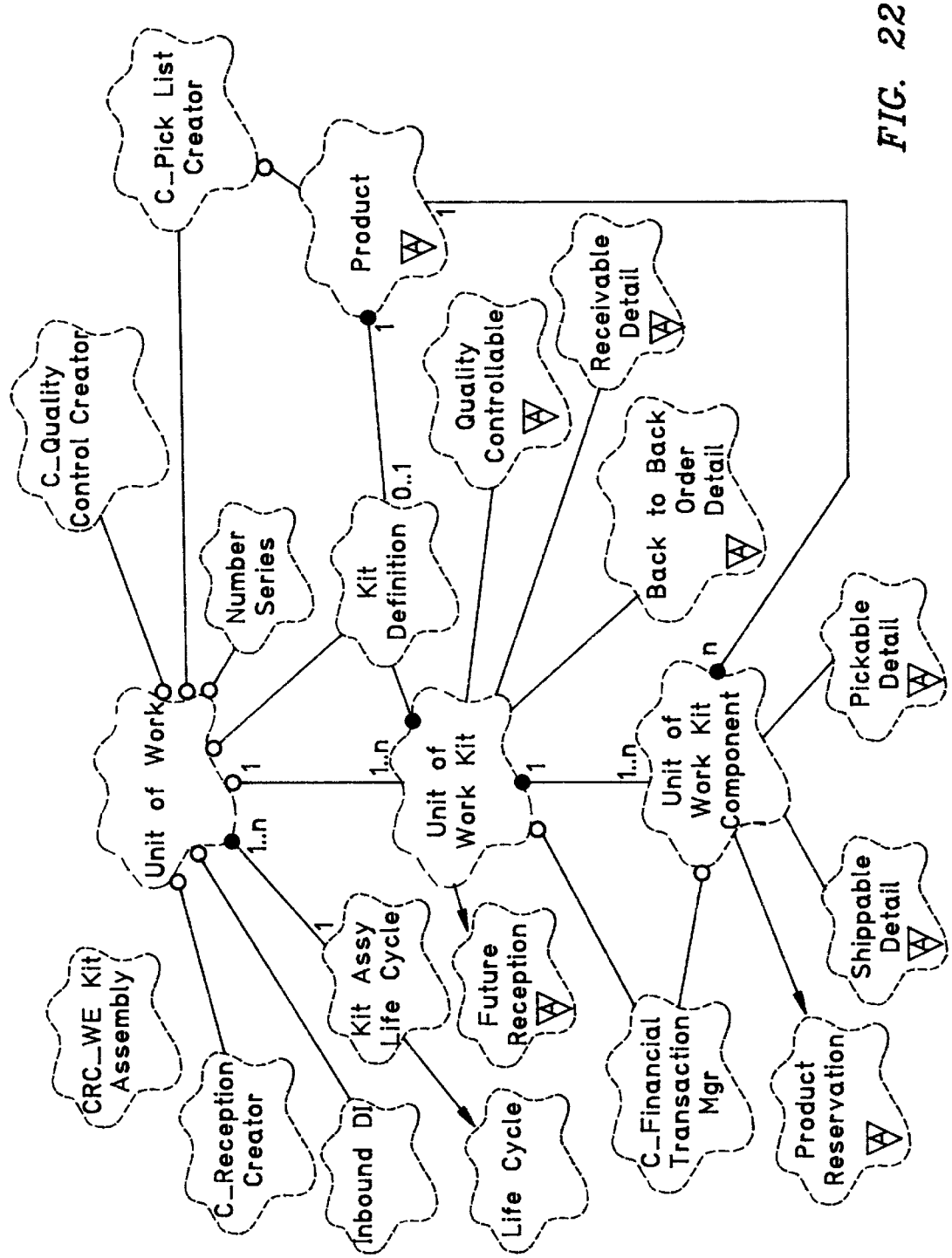
FIG. 22 is a class diagram of the WE Kit Assembly category illustrated in FIG. 15, showing the Unit of Work class and related classes.

FIG. 22 is a class diagram of the WE Kit Assembly category illustrated in FIG. 15. The WE Kit Assembly category manages the assembly of components into products. The assembly is driven by a manually prepared unit of work that defines the components to be used. The assembly is not a full work order support process, such as would be found in a manufacturing type of application, but rather represents a single level structure to provide basic support for assembly of components into a kit in the distribution environment. There are three major components of the kit assembly category comprising the Unit of Work, the Unit of Work Kit, and the Unit of Work Kit Component.

The Unit of Work class manages the kit assembly process. This class creates one or more Unit of Work kits, each of which is composed of one or more Unit of Work Components. The Unit of Work class uses classes called Kit Definition, which selects the default definition of the component content of the Kit, Kit Assembly Life Cycle, which creates an instance of the Life Cycle that will dictate a life cycle for a specific unit of work, Inbound Data Interchange, an extension point to permit receipt of input that impacts the unit of work from external sources. Reception Creator, which creates, maintains, and processes the Future Reception instances to receive the completed kit assembly into stock, Quality Control Creator, which initiates quality inspection for the completed kit assembly, if required, Pick List Creator, which initiates the picking process to pick the Unit of Work Kit Components from Stock, and Number Series, which assigns a unique identification number for the Unit of Work Kit.

The WE Kit Assembly category also includes the Unit of Work Kit class, which contains the results of a single kit assembly unit of work. That is, this class contains a quantity of an assembled product. The Unit of Work Kit class contains references to multiple instances of the Unit of Work Kit Component class, which represents the components used to assemble the kit. The Unit of Work Kit also references classes, including Kit Definition, which references the default definition of the component content of the kit. A user of the extended framework can alter the kit definition by adding or deleting components. Also referenced by the kit class is the Future Reception class, which is referred to by the Unit of Work Kit for common structure and behavior. When the Unit of Work Kit is completed, it will be received into stock or used to satisfy a back to back sales order detail. Also referenced by the kit class is the Quality Controllable class, which provides the common structure and behavior for all products going through quality inspection and is referenced when the completed assembly is routed to quality control.

The Unit of Work Kit class also references the Receivable Detail class, which provides the common structure and behavior for all products going through reception and is referenced when the completed assembly is ready to be received into stock. The Back to Back Order class is referenced by the Unit of Work Kit for common structure and behavior if the completed assembly is to be used to satisfy a specific sales order, that is, if it is a back to back Order Detail. The Financial Transaction Manager class creates a General Ledger member interface to reflect the reception of the completed assembly into stock. The Kit Assembly category also includes the Unit of Work Kit Component class. Each member of this class contains all of the information to define and process one of the component products that must be picked from stock to assemble the Unit of Work Kit. This class references the Product Reservation class, which referred to for common structure and behavior, because the kit component is a product reservation.

The Shippable Detail class is referenced by the Unit of Work Kit Component class because that class may be referenced from Sales Order Processing as a shortcut or ordering a kit of related products, in which case the components will reference the Shippable Detail class when the Sales Order is ready to ship. In this way, the Shippable Detail class provides the common structure and behavior for all products going through shipping. The Pickable Detail class provides the common structure and behavior for all products being picked, and is referenced when the unit of work kit component is ready to be picked from stock. The Back to Back Order class is referenced for common structure and behavior if the completed assembly is to be used to satisfy a specific sales order, that is, if the sales order is a Back to Back Order Detail. The Unit of Work Kit Component also references the Financial Transaction Manager class, which creates a General Ledger interface to reflect the component being picked from stock, and the Product class, which provides all product related structure and behavior for the components.

h. WE Transport Time Retriever.

Figure 23:
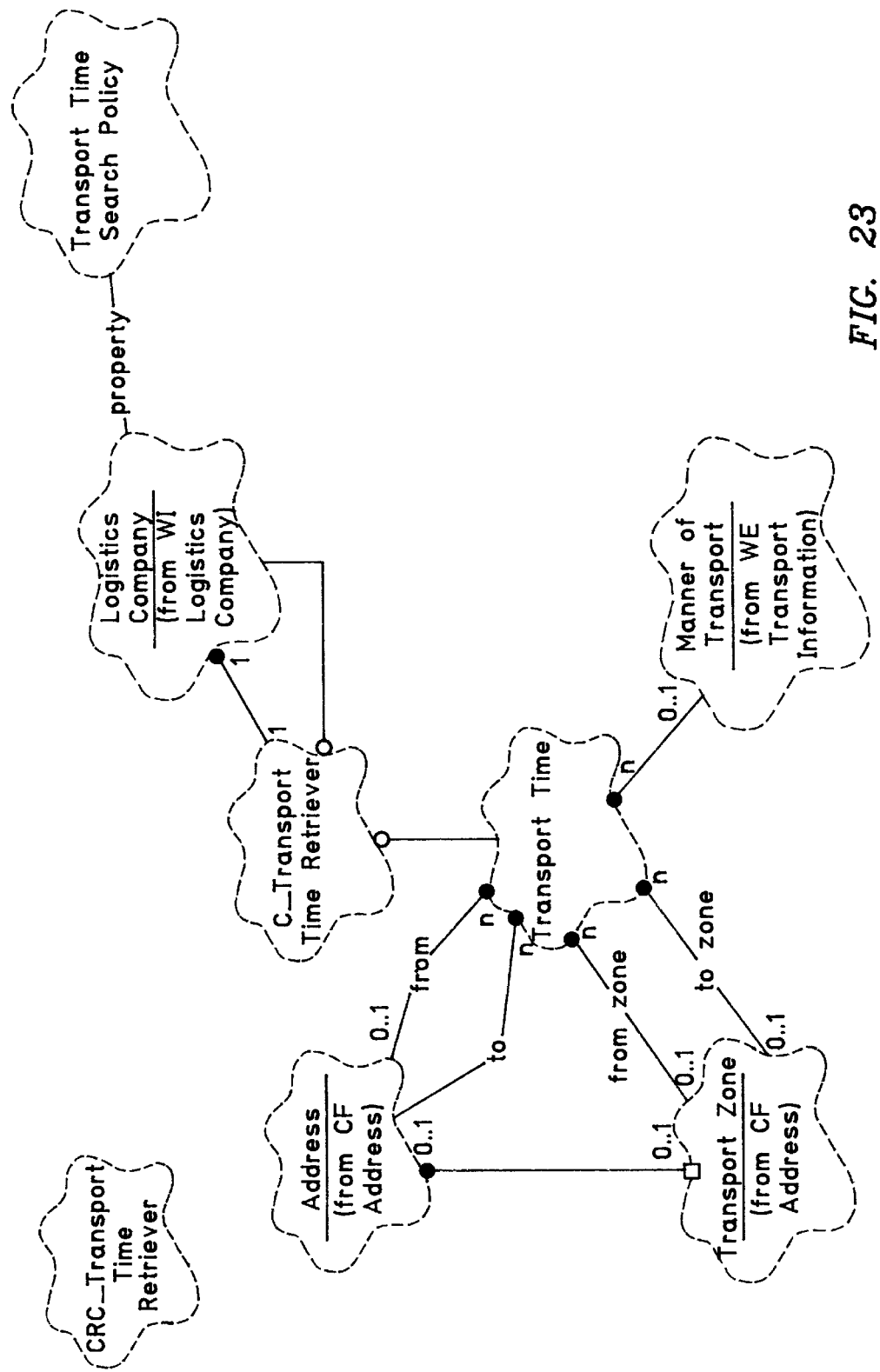
FIG. 23 is a class diagram of the WE Transport Time Retriever category illustrated in FIG. 15.

FIG. 23 is a class diagram that illustrates the WE Transport Time Retriever category. This category determines the time to move goods between locations based upon the manner of transport used. Transport time is associated with the Logistics Company. It typically would be initiated by a method call to the Logistics Company requesting the elapsed time to move goods between two locations. The Logistics Company class would then delegate the task to Transport Time Retriever class.

The Transport Time Retriever class uses a class called Transport Time Search Policy, which is a property of the Logistics Company class and will be populated by the application developer to control the order in which the alternative methods for determining transport time are checked. The Transport Time Retriever class also uses the Transport Time class, which holds the time it takes to transport goods between two locations. Two provide the context for the time values it contains, the Transport Time class references or uses other classes. One of these classes is the Address-Transport Time, which defines the time to transport goods between a "from" and "to" address. Also referenced is the Transport Zone class, which is defined by the Transport Time class to contain the time to transport goods between "from" and "to" zones. Finally, Manner of Transport class qualifies the "from" and "to" times between addresses or zones, according to the manner of transport to be used.

i. WE Transport Information.

FIG. 24 is a class diagram that illustrates the WE Transport Information category of the framework. This category contains the definition for the various Terms of Delivery and Manner of Transport classes, which comprise ways in which goods can be transported. These classes would be defined by the application program user via the user interface supplied by the application developer, and as such is completely implementation dependent.

Thus, the WE Transport Information category provides an opportunity for the application developer to provide particular features desired by customers and unique to its application program.

j. WE Back to Back Order.

FIG. 25 is a class diagram that illustrates the WE Back to Back Order category, which refers to the situation where a supply order is the direct source for a demand order. A supply order can comprise a purchase order, a stock movement, or a kit assembly unit of work. A demand order is typically a sales order detail.

The Back to Back Order Delivery class makes use of the Back to Back Order Manager class, which creates and maintains the back to back order relationship between demand orders and supply orders. This class references the Back to Back Request Detail class, which contains the demand order that will be satisfied by a back to back supply order detail. The demand order is usually a Sales Order Detail. The Back to Back Order Delivery category also includes the Back to Back Request Detail class, which references the Delivery Group class, which ties together multiple Back to Back Request Detail instances that are to be delivered at the same time, and references the Back to Back Request Link, which provides the association between the Back to Back Request Details and the specific supply orders that will satisfy them.

k. WE Replanning.

Figure 26:
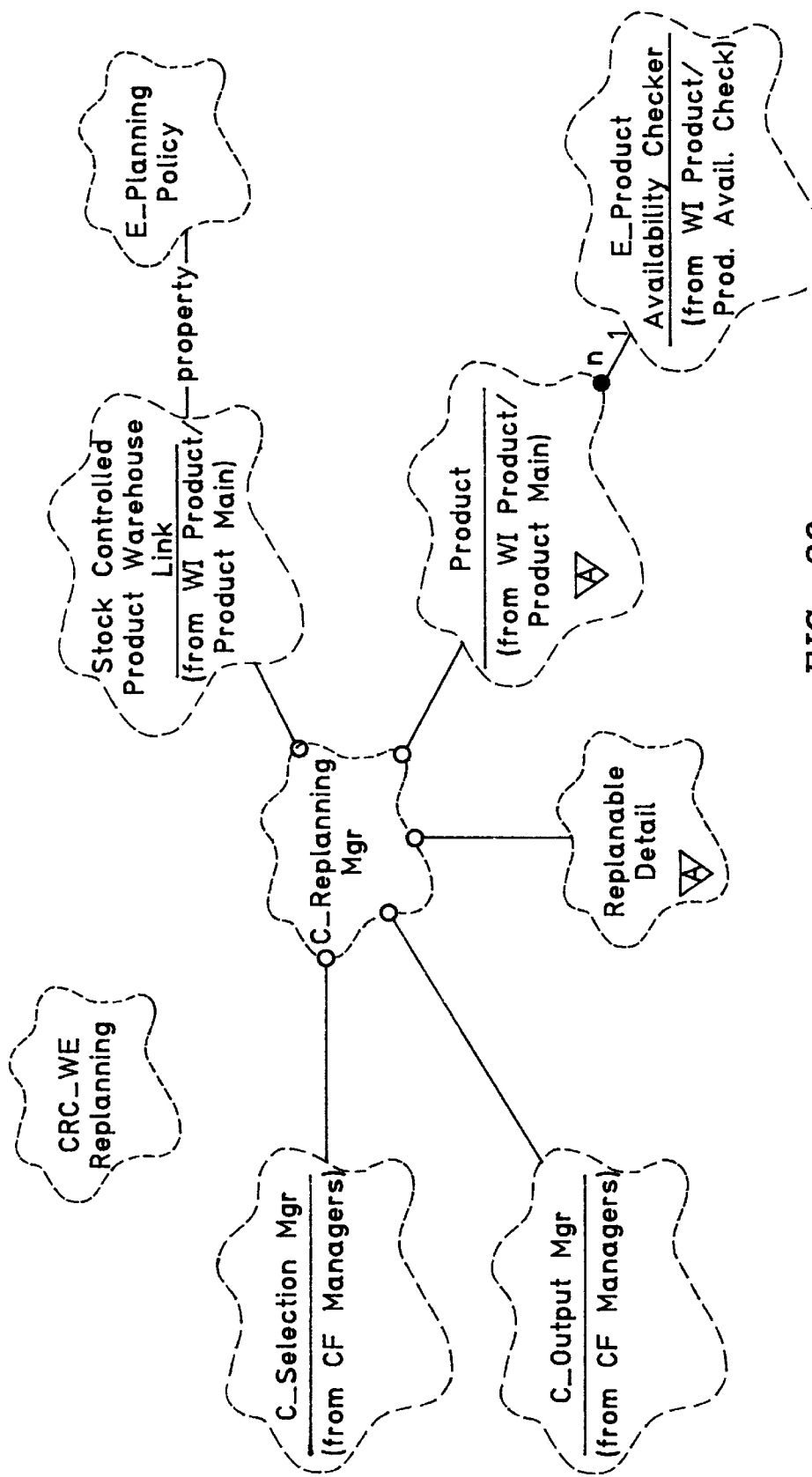
FIG. 26 is a class diagram of the WE Replanning category illustrated in FIG. 15, showing the Replanning Manager class and related classes.

FIG. 26 illustrates the WE Replanning category, which checks to determine if the originally promised delivery dates or demands are still valid. The demands may comprise, for example, sales orders or stock movement detail lines. Detail lines can be reported and/or updated if promise dates cannot be met.

The WE Replanning category includes the Replanning Manager control class, which has overall responsibility for recalculating shipping and delivery times based upon the current stock situation and future reception. The Replanning Manager class uses the Replanning Policy class, which is an extension class associated with the Stock Control Product Warehouse Link class, which is from the Warehouse Internal mechanism. The Replanning Policy class can be at a Product/Warehouse, Product, Warehouse, or Company level. This class controls when, under what conditions, and for type of demands replanning will occur.

The Replanning Manager class also uses the Product Availably Checker class, which is an extension class associated with a Product in which the application provider/framework user will implement an availability checker algorithm that meets their business needs. This class is used by the Replanning Manager to determine what options exist for rescheduling a Replannable Detail. The Replanning Manager class also uses the Replannable Detail class, which is an abstract base class that provides the common structure and behavior for any demand that need to be rescheduled. Each process that manages demands that can be replanned will further specialize the Replannable Detail class by defining a subclass that supports the unique requirements of that process. In the preferred embodiment, only sales orders and possibly stock movement will create Replannable Detail class members, but other processes such as Production Orders also can be made to create such class members. The Replanning Manager class also uses the Output Manager class, an extension point to interface with application specific printing functions, and also uses the Selection Manager class, which queries the Replannable Details class members to select which ones to reschedule.

l. WE Stock Movements.

Figure 27:
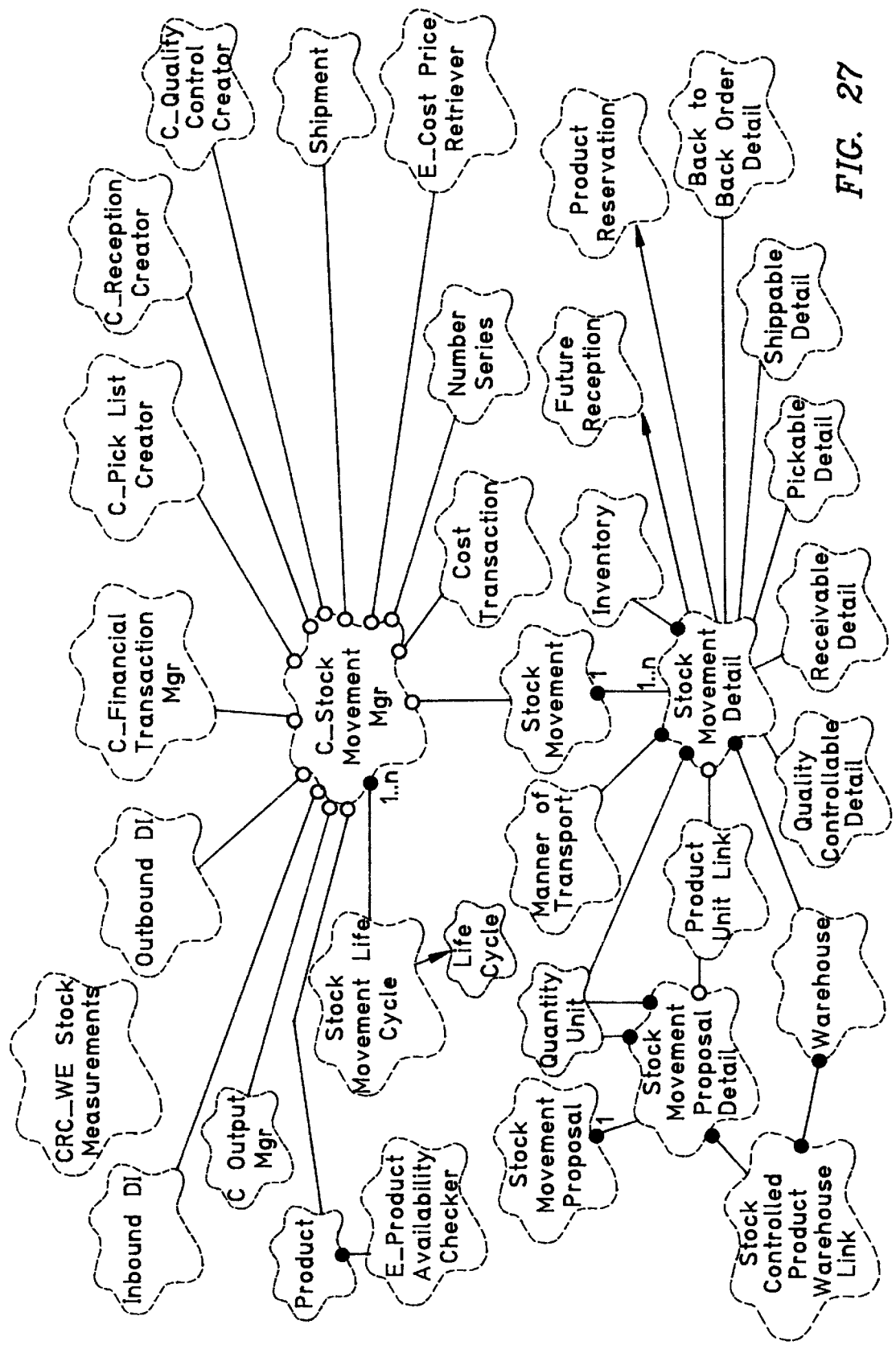
FIG. 27 is a class diagram of the WE Stock Movements category illustrated in FIG. 15, showing the Stock Movement Manager class and related classes.

FIG. 27 is a class diagram that illustrates the WE Stock Movements category, which manages stock movements between warehouses. This category also maintains reservations and initiates picking and shipping at the supplying warehouse. It initiates reception, quality inspection, and stock balance maintenance at the receiving warehouse.

m. WE Quality Control from Stock.

Figure 28:
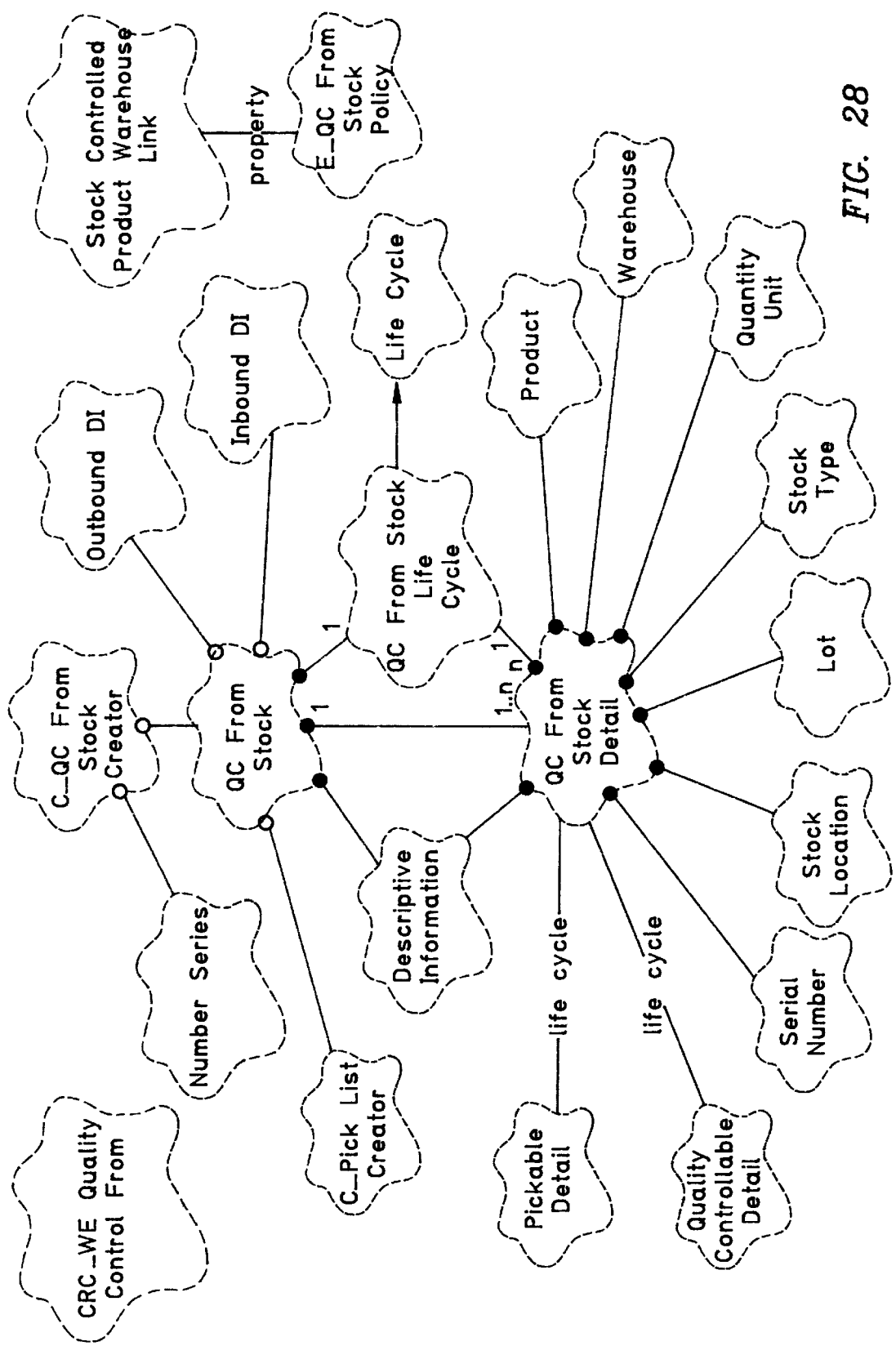
FIG. 28 is a class diagram of the WE Quality Control from Stock category illustrated in FIG. 15.

FIG. 28 is a class diagram that illustrates the WE Quality Control from Stock category, which selects stock to inspect, initiates picking, records inspection results, and returns products to stock. This category uses the WE Picking and WE Reception categories to control the movement to and from stock, and uses the WE Quality Control category to record inspection results.

n. WE Internal Replenishment.

Figure 29:
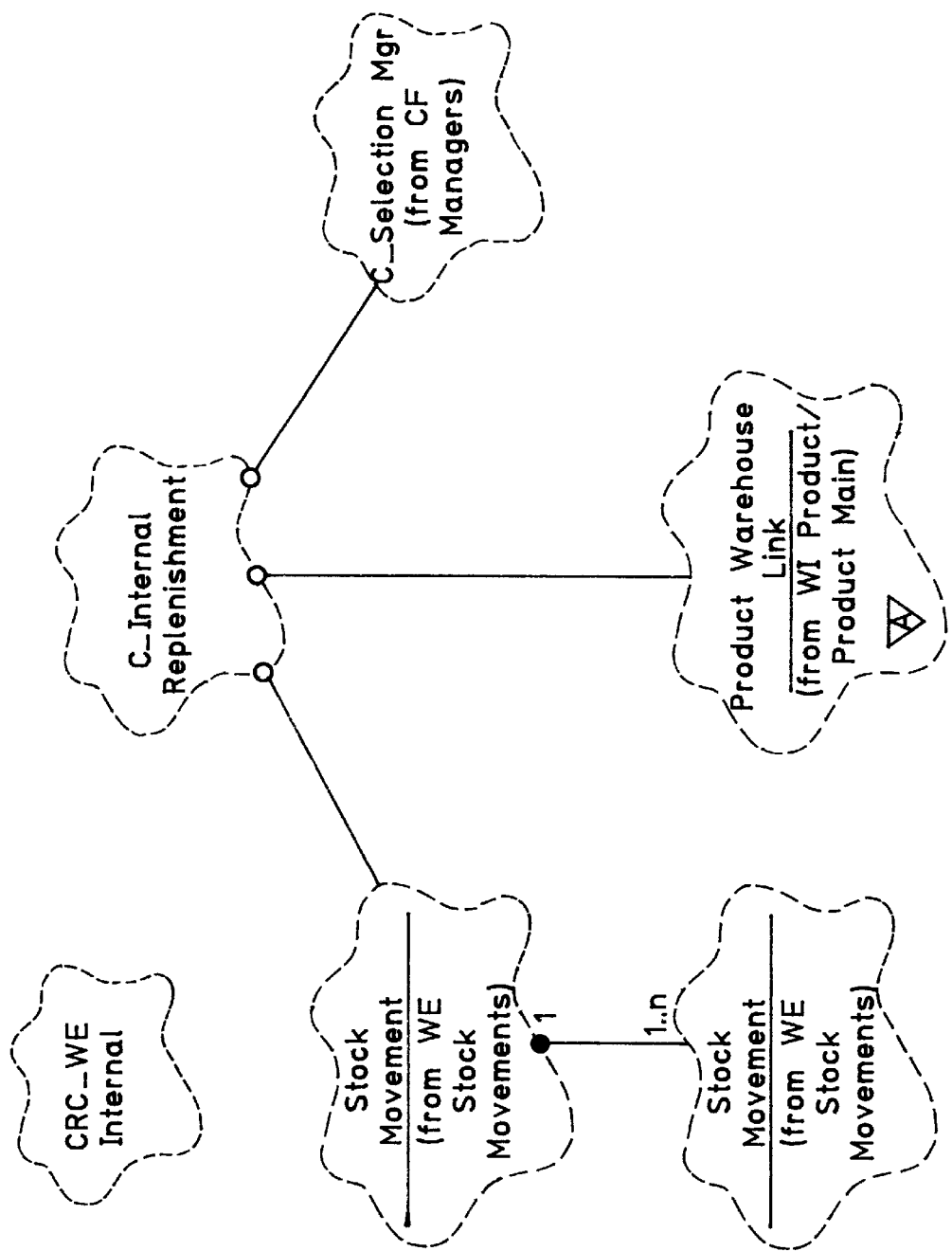
FIG. 29 is a class diagram of the WE Internal Replenishment category illustrated in FIG. 15.

FIG. 29 is a class diagram that illustrates the framework WE Internal Replenishment category, which reviews the stock situation for a product at a warehouse. This category includes the Internal Replenishment control class, which generates an Internal Replenishment proposal if the stock situation for a product at a warehouse is below the minimum stock levels set. Accordingly, the Internal Replenishment class uses the Product Warehouse Link class of the WI mechanism and uses the Stock Movement class described above in connection with the WE Stock Movements category of FIG. 27.

8. Processing of Extended Framework

The framework user/application developer will utilize the class and method definitions, as described above, with appropriate extensions and overrides, to produce a desired application program. Thus, as is the case with object oriented programming principles, details of the extended framework processing will depend on the particular extensions implemented by the framework user. Nevertheless, the processing enabled by the framework can be described in terms of the classes and methods defined by the present invention. Particular processing tasks performed by classes of the extended system can be described in a step-wise, procedural fashion. The following description, therefore, should be understood to apply to the operating steps performed by the extended framework. Those skilled in the art, however, will understand that the flow of processing is not necessarily sequential through the flow diagram boxes, as objects will perform processing in accordance with their attributes and methods.

The framework classes define products, populate inventories, set up warehouse locations, track product inventories as take requests are received and satisfied, and monitor inventory quality. The Warehouse Internal mechanism tracks inventory transactions as they relate to the warehouse inventory and stock analysis functions of the distribution system. The Warehouse External mechanism tracks product shipments to customers so far as grouping shipment lots at a loading area, receives and processes requests for stock, determines inventory requirements in view of retrieval times and orders, and determines when stock must be replenished from outside suppliers.

a. Operation of the Product Manager.

Figure 30:
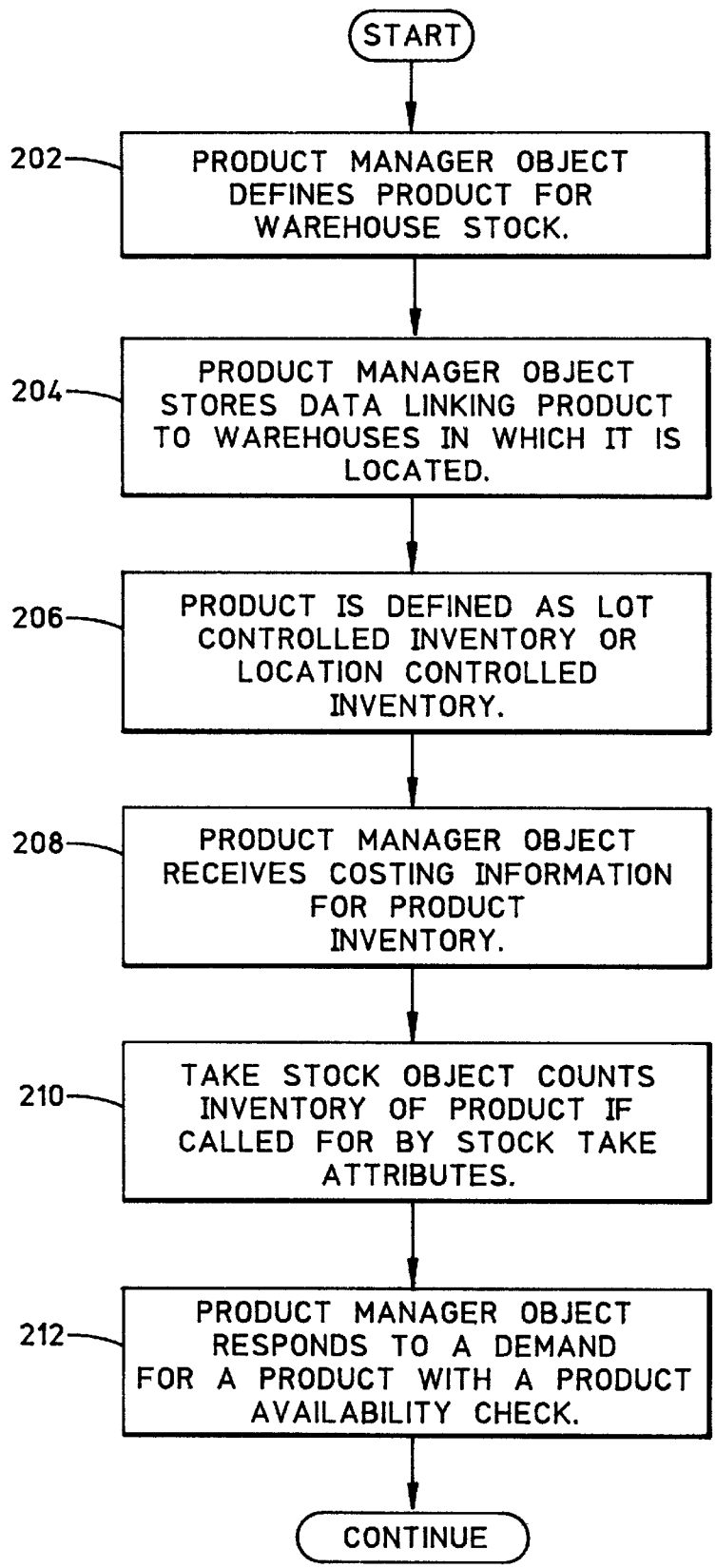
FIG. 30 is a flow diagram representation of the processing carried out by the WI Product category illustrated in FIG. 7.

The application program to be generated from the framework is intended to help manage the warehouse and distribution system of a Company and to manage business transactions with the Business Partners of the Company. The Company will be defined to have a certain inventory made up of Products kept at Warehouse Locations. As described above, the WI Product category includes a control class called Product Manager. A control class is responsible for performing a business task by interacting with one or more business objects significant to the task. It will react to received information requesting that the task be performed and will return information reflecting the result of the task. In the case of the WI Product category, Product Manager is responsible for overseeing the product definition steps that will permit an end user of the application program to input product data for the Company warehouse distribution system. The Product Manager might not actually carry out specified actions, but it will be responsible for initiating such actions and, for purposes of this description, will be characterized as carrying out or performing such actions. Thus, the first step illustrated in the Product Manager processing diagram of FIG. 30 is for a Product Manager object to define a Product for warehouse stock in accordance with product specifications, policies, and kit assembly definitions, if applicable. The creation of the Product can be implemented by the shared core objects (CF) described above. Generally, user interaction prompts such initial processing. In particular, the application program user will communicate the desire for product creation through the user interface, which can be crafted by the application program developer according to well-known programming techniques. For example, a graphical user interface may be presented to the application user on a display such as illustrated in FIG. 2. In the preferred embodiment, an application user that is a client of a server is not permitted to create persistent data objects. Therefore, after the object oriented programming environment is established, any persistent objects must be created and stored in the server. Thus, an application user in a client-server environment must provide the data necessary for creation of the desired object to the server. The server will then invoke a command that will call the object method, pass the received information, and cause creation of the specified object. This portion of Product Manager processing is represented by the FIG. 30 flow diagram box numbered 202.

The next step of Product Manager processing is for the Product Manager to store data linking a Product to one or more warehouses in which the Product will be stored. This step is represented by the flow diagram box numbered 204. Next, the Product Manager causes Products to be associated with defined inventories, Lot Controlled Inventory, and/or Location Controlled Inventory, as represented by the flow diagram box numbered 206. In the processing indicated by the FIG. 30 flow diagram box numbered 208, the Product Manager links a Product with information concerning costing data, lead time retrieval, and business policies associated with the Product. Next, the Product Manager will initialize the Stock Take attributes. These are the parameters that control the timing and conditions for the Stock Take action.

The next processing step, represented by the flow diagram box 212, is for the Product Manager object to perform a product availability check in response to a request for stock. The check involves determining if sufficient stock is available in inventory or on orders to satisfy a demand. Processing then continues. In the case of an executing application program, processing would eventually return to the flow diagram box numbered 202 and flow downward, executing program operations such as Product definition and/or Stock Take actions as needed, in response to new products and new requests for product.

b. WE Stock Control Operation.

The Stock Control category of the WE mechanism provides a set of classes that support tracking warehouse product movement actions such as product reception, picking, and shipment. In this way, the Stock Control category exploits the object oriented programming concepts of polymorphism and inheritance. In particular, the Stock Control Creator control class manages the stock control processing. When a warehouse transaction process of the application, such as reception, picking, or shipment, requests its corresponding activity, it notifies the Stock Control Creator object. Such processes are represented as Stock Controllable Detail objects. Thus, the first step of WE Stock Control processing illustrated in FIG. 31 is indicated by the flow control diagram box numbered 220, which recites that a Stock Controllable Detail object requests service to perform a stock activity, such as inventory reception, picking, or shipment.

It often is desirable to process some of the Stock Controllable Details together. Therefore, in the next step of processing represented by the flow diagram box numbered 222, the Stock Control Creator object selects Stock Controllable Details to process together. Next, the Stock Control Creator object selects the Stock Control Details that make up the Stock Controllable Details tasks. This step is represented by the flow diagram box numbered 224. In the next step of processing, the Stock Control Creator creates Stock Control objects that group together the Stock Control Details for processing, as represented by the flow diagram box numbered 226.

Figure 31:
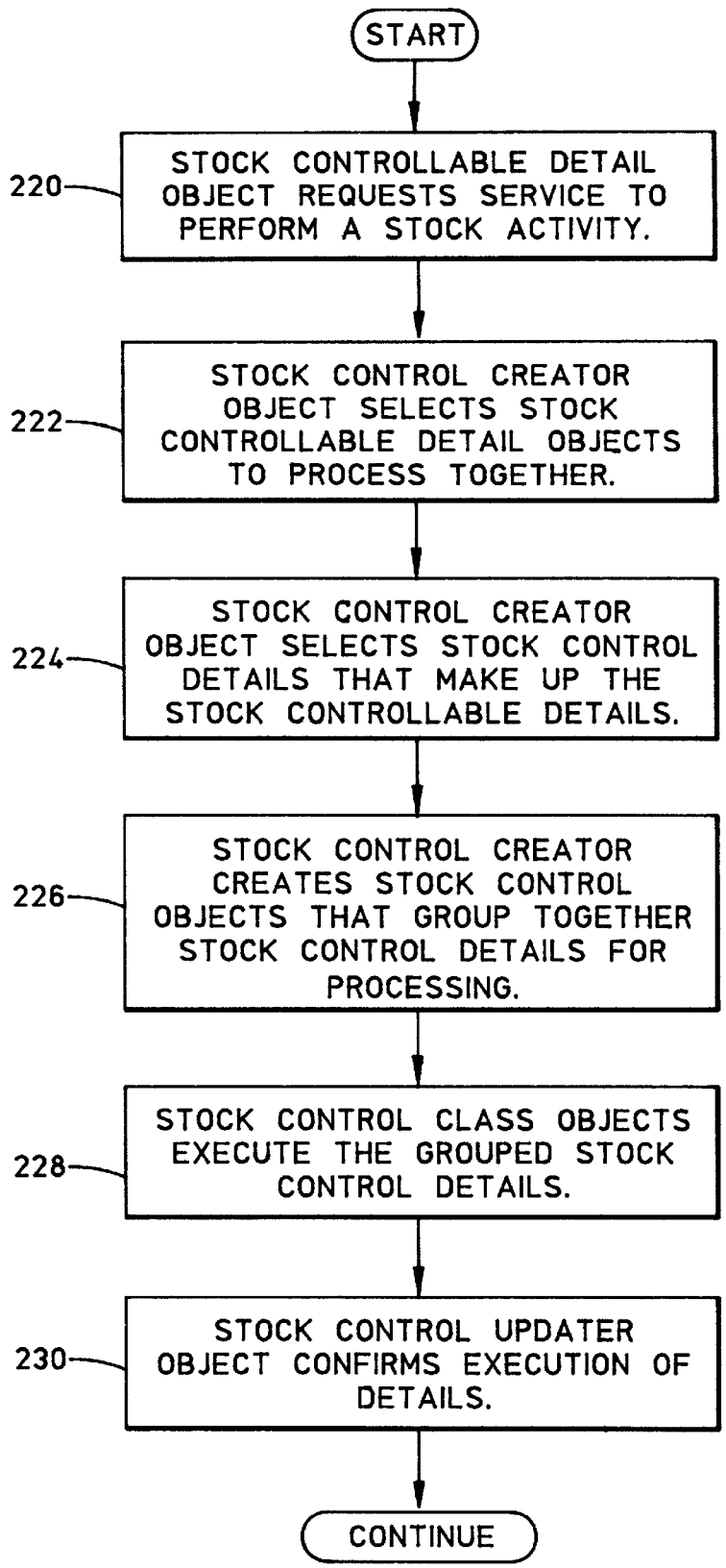
FIG. 31 is a flow diagram representation of the processing carried out by the WE Stock Control category illustrated in FIG. 16.

After the grouping of Stock Control Details, the Stock Control objects execute the grouped detail tasks, indicated by the FIG. 31 flow diagram box numbered 228. As a final processing step, the Stock Control Updater confirms the execution of the Stock Control Details. This processing is represented by the flow diagram box numbered 230. System processing then continues.

c. Warehouse Product Activity.

The Stock Controllable Detail class and Stock Control Detail class described above are abstract base classes from which corresponding "reception" activity details are derived. The "pick" activity details and "shipment" activity details are similarly derived. Thus, the framework developer will add specific processing onto the Stock Controllable Detail processing to provide the desired reception, picking, and shipment functioning.

Figure 32:
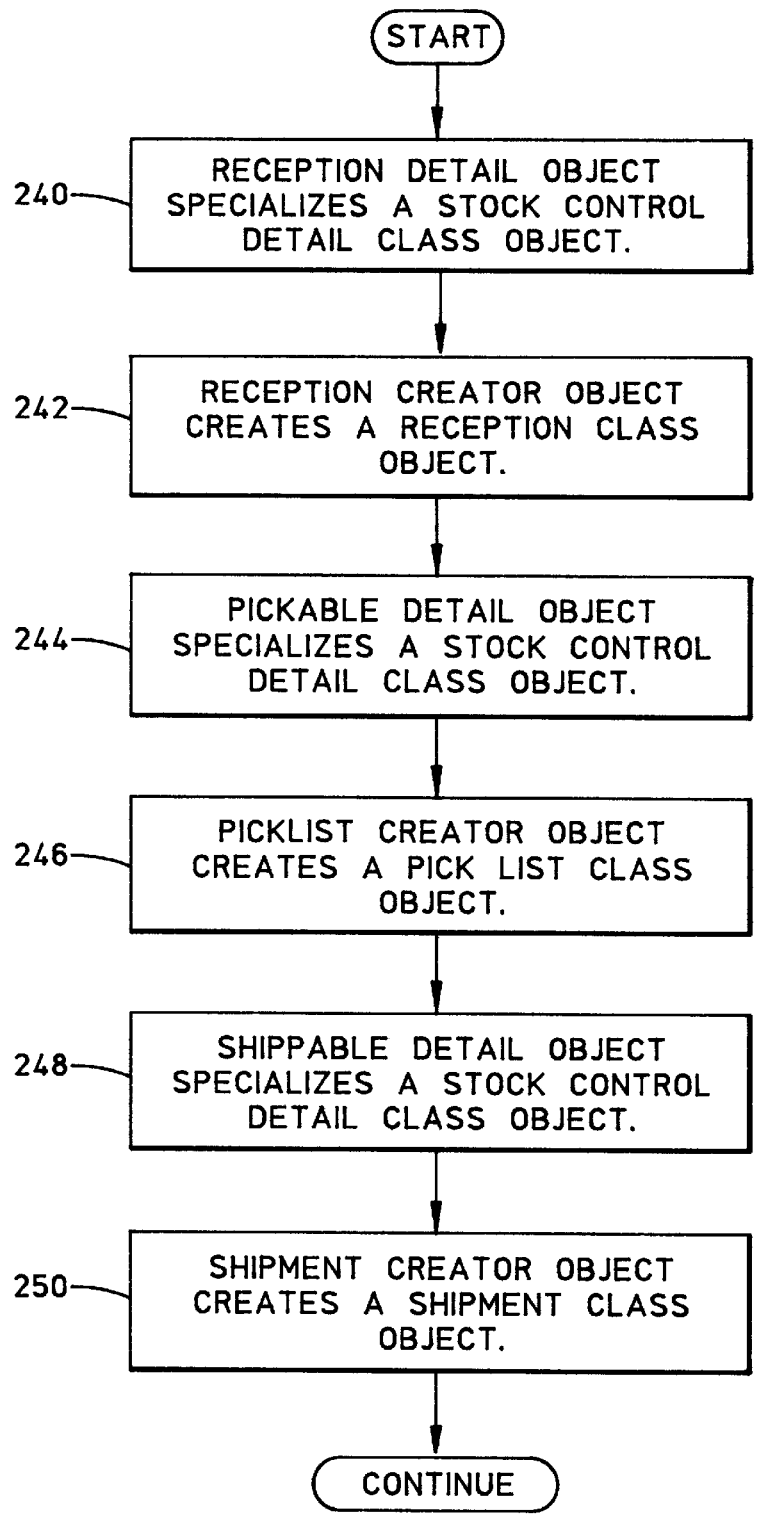
FIG. 32 is a flow diagram representation of the processing carried out by the WE Picking category illustrated in FIG. 17, the WE Reception category illustrated in FIG. 18, and the WE Shipment category illustrated in FIG. 19.

FIG. 32 is a flow diagram representation of the processing carried out in performing the reception, picking, and shipment activities. The sequence of reception, picking, and shipment should be understood to be arbitrary, in the sense that such activities are performed as the corresponding requests for service are made, not always in a predetermined sequence. It also should be understood that the processing illustrated in FIG. 32 takes place in response to the task processing initiated by the processing of a Stock Controllable Details object requesting service, as indicated by the flow diagram box numbered 224 of FIG. 31.

The first step of activity processing, indicated by the FIG. 32 flow diagram box numbered 240, is for a Receivable Detail object to specialize a Stock Control Detail class and add attributes and behaviors common to all product reception activities. In the next step, a Reception Creator object creates Reception class objects. Each Reception class object groups together one or more Reception Details objects, each of which is a specific instance of a product quantity received. The Reception Creator class objects derive much of their attributes and behaviors from the Stock Control Creator class, with added attributes and behaviors for the reception tasks. The creation of the Reception class and related processing is represented in FIG. 32 by the flow diagram box numbered 242.

The next step of activity processing is represented by the FIG. 32 flow diagram box numbered 244 and is for a Pickable Detail object to specialize a Stock Control Detail class and add attributes and behaviors common to all product demands that are ready for picking from inventory. The next step, represented by the flow diagram box numbered 246, is for a Picklist Creator object to create Pick List class objects. Each of the Pick List class objects groups together one or more Pick List Details objects, each of which is a specific instance of a product quantity to be picked from stock inventory. For example, a Pick List object may comprise all items on a single sales order, and the items on the sales order would constitute particular Pick List Details. The Picklist Creator class objects derive much of their attributes and behaviors from the Stock Control Creator class, with added attributes and behaviors for the picking tasks.

In the next step of activity processing, indicated by the FIG. 32 flow diagram box numbered 248, is for a Shippable Detail object to specialize a Stock Control Detail class and add attributes and behaviors common to all product shipment activities. In the next step, a Shipment Creator object creates Shipment class objects. Each of the Shipment class objects groups together one or more Shipment Details objects, each of which is a specific instance of a product quantity to be shipped. The Shipment Creator class objects derive much of their attributes and behaviors from the Stock Control Creator class, with added attributes and behaviors for the product shipment tasks. The creation of the Shipment class and related processing is represented in FIG. 32 by the flow diagram box numbered 250. Processing is then continued.

d. Targeting Manager Operation.

The WE Targeting category lets the application user determine how receptions of products will be used. For example, future receptions may be reserved for satisfying a particular order, or may be destined for a particular warehouse, or in some other way may be directed to a specific request or order. Such targeting is carried out under control of the Targeting Manager class of the WE Targeting category, which is illustrated in the FIG. 33 flow diagram.

Figure 33:
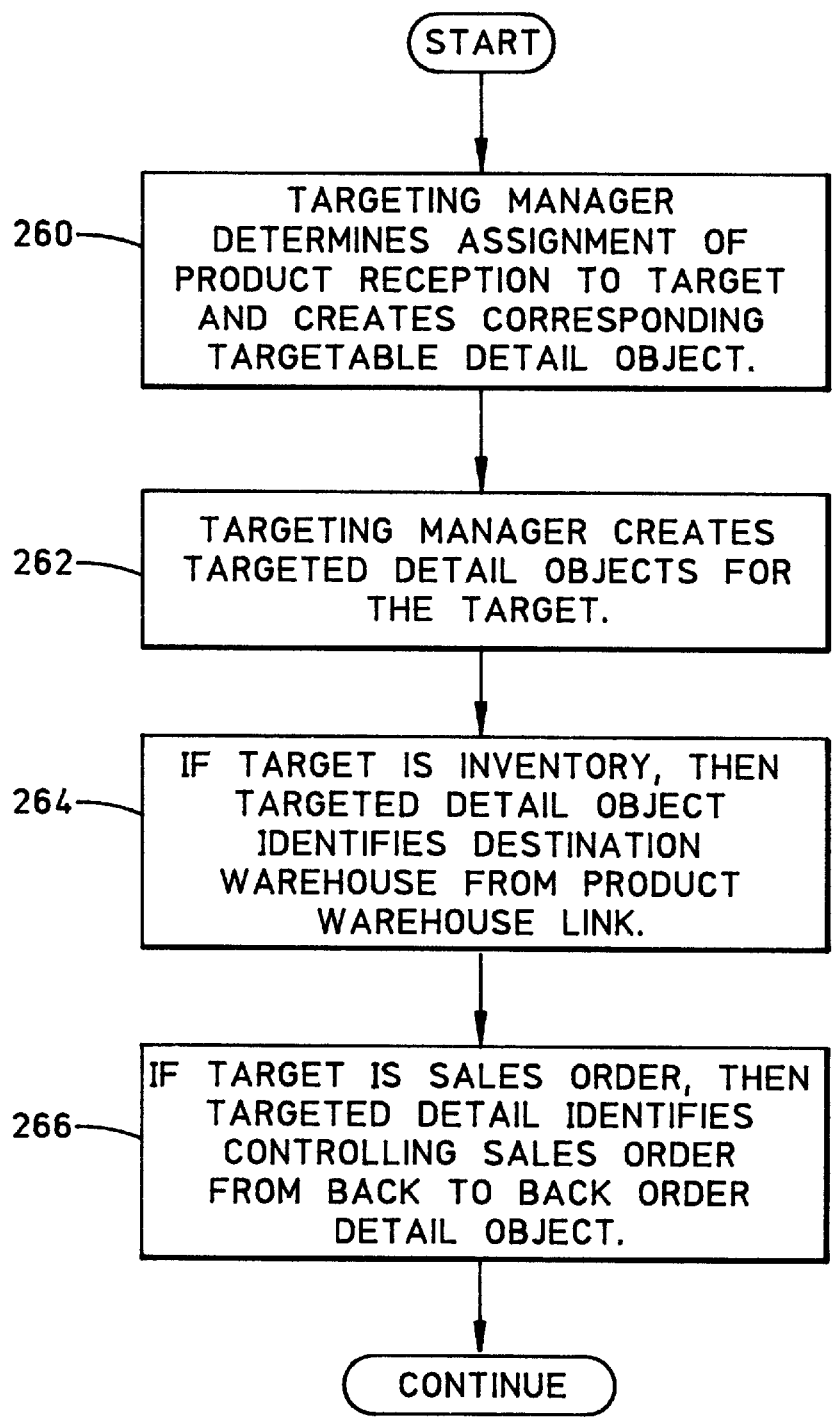
FIG. 33 is a flow diagram representation of the processing carried out by the WE Targeting category illustrated in FIG. 20.

The first step of the Targeting Manager operation is represented by the FIG. 33 flow diagram box numbered 260, which indicates that the Targeting Manager determines when a future product reception should be assigned to a target and, if appropriate, creates a Targetable Detail object. When a product reception occurs for which there is a Targetable Detail, the Targeting Manager creates one or more Targeted Detail objects to represent a quantity of a product to be delivered to the corresponding target. This processing is represented by the flow diagram box numbered 262.

The next processing operation is represented by the flow diagram box numbered 264: If the target is to inventory, then the Targeted Detail object identifies the destination warehouse from information stored in the Product Warehouse Link object. If the target is a specific sales order, then the Targeted Detail object is referred to a Back to Back Order Detail for the sales order information. This processing is represented by the flow diagram box numbered 266. System processing then continues.

e. Back to Back Order Manager Processing.

A back to back order refers to a situation when a demand order (such as a sales order) can be satisfied by a supply order (a purchase order, request for movement of stock, a kit assembly). The processing of such back to back orders is carried out by the WE Back to Back Order Delivery category, whose operation is illustrated by the flow diagram of FIG. 34.

The demand order to be filled is typically a Sales Order Detail object. The supply order that will satisfy the demand order is typically specified by a Supply Order Detail object. The Back to Back Order Manager object of the category associates a demand order with a supply order by creating a Back to Back Request Detail object that contains the necessary information from the Sales Order Detail object and creating a Back to Back Order Details object that contains the necessary information from the Supply Order Detail object, and then linking the two objects via a Back to Back Request Link object. Therefore, in the first step of processing shown by the flow diagram box numbered 280, the Back to Back Order Manager object determines when a demand order will be satisfied by a supply order, and in the second step of processing shown by the flow diagram box numbered 282, the Back to Back Order Manager creates a Back to Back Request Detail object contained by the Demand Order and creates a Back to Back Order Detail object contained by the Supply Order, and the Back to Back Request Detail object references the Back to Back Request Link to associate the two together.

Figure 34:
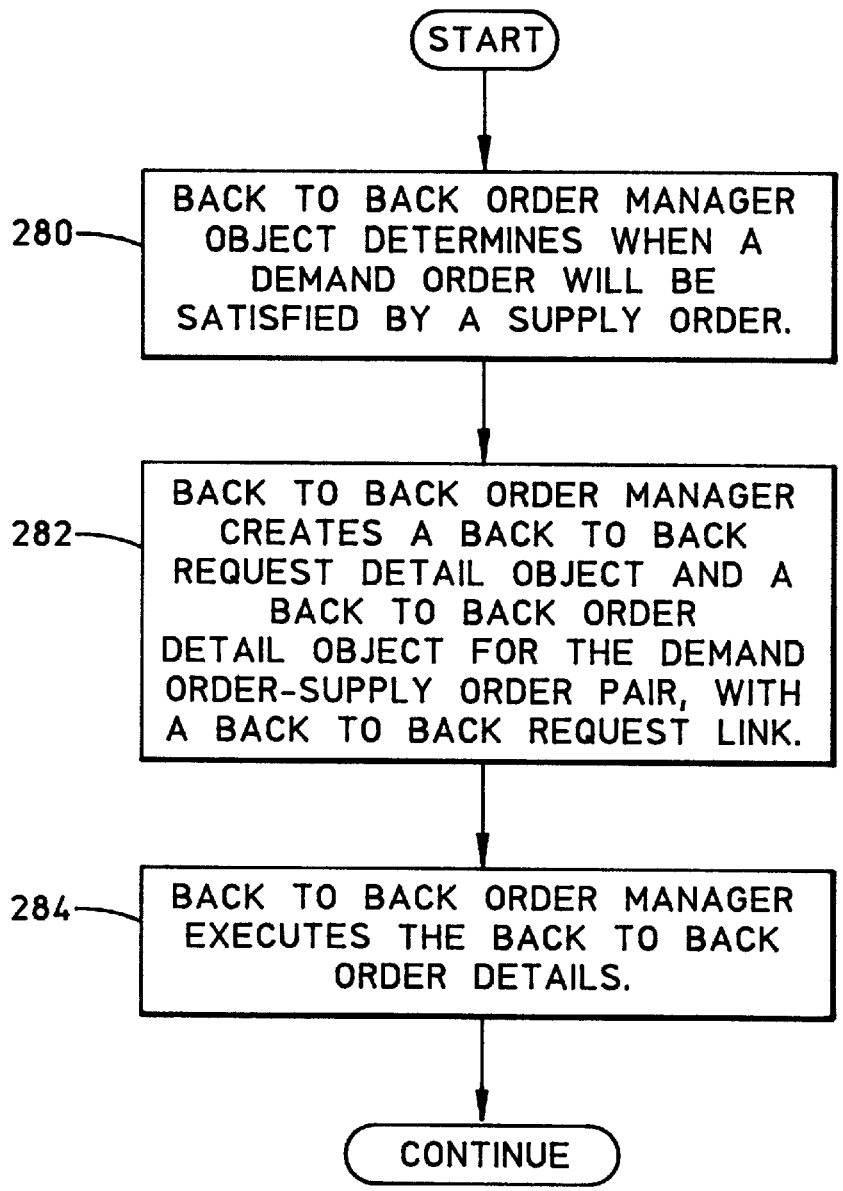
FIG. 34 is a flow diagram representation of the processing carried out by the WE Back to Back Order Detail category illustrated in FIG. 25.

In the next processing step, represented by the FIG. 34 flow diagram box numbered 284, the Back to Back Order Manager object prompts execution of the Back to Back Order Details to move the stock and satisfy the supply order, in accordance with the information stored in the respective objects described above. Processing in the system then continues.

Advantages of the Invention

Thus, the reusable framework of the invention provides a set of objects that perform warehouse control and permit a framework user to add extensions to the framework for specific processing features, thereby producing a warehouse control application program for managing the warehouse distribution system of a company, including internal warehouse operations and external (product reception and shipment) warehouse operations. An application program developer can thereby more quickly conclude program development and maintain programs with updates and improvements. The developer must provide the end-user interface, which establishes a means for the end-user to communicate with the application program to receive, process, and report data. The program developer is thereby free to concentrate on application program features, building upon the framework.

We claim:

1. A computer system comprising:
    a central processing unit;
    a user interface; and
    a main memory having an operating system that supports an object oriented programming environment containing an object oriented framework that includes a plurality of pre-defined object oriented classes that may be extended by a user, wherein the framework provides an extensible warehouse control system for a Company that is specified by a data object.

2. A computer data processing system as defined in claim 1, wherein the memory includes a Warehouse Internal mechanism comprising a Logistics Company category of cooperating objects that identify one or more warehouses of the Company and a Warehouse External mechanism comprising a Stock Control category of cooperating objects that identify stock control activities of the Company.

3. A computer data processing system as defined in claim 2, wherein:
    the Logistics Company category of cooperating objects further contains object classes that identify an inventory of products and identify costing methods followed by the Company with respect to the products, and
    the Stock Control category of cooperating objects further contains object classes that identify stock control activities and perform the identified stock control activities on the warehouse inventory of products such that the cooperating objects update the product inventory as a result of performing the identified stock control activities.

4. A computer system as defined in claim 3, wherein the Warehouse Internal mechanism further includes a Stock Transactions category of cooperating objects that identify stock transaction activities comprising additions and deletions of the products from the warehouse inventory of products, and that adjust the warehouse inventory of products in accordance with the stock transaction activities.

5. A computer system as defined in claim 4, wherein the cooperating objects identifying stock transaction activities contain object classes comprising Manual Stock Transactions activities wherein a change to the warehouse inventory of products is made immediately upon a Manual Stock Transactions activity.

6. A computer system as defined in claim 3, wherein the Stock Control category further includes object classes identifying stock transaction activities comprising stock reception, picking, and shipment.

7. A computer system as defined in claim 6, wherein the Warehouse External mechanism further includes cooperating objects containing object classes that identify a sales order to which a future stock reception will be directed.

8. A computer system as defined in claim 6, wherein the Warehouse External mechanism further includes cooperating objects containing object classes that identify Kit Assembly processes that specify product components that may be assembled into complete products and perform data update actions to track the assembly of warehouse inventory into assembled complete products.

9. A computer system as defined in claim 6, wherein the Warehouse External mechanism further includes cooperating objects containing object classes that identify Back to Back Order Delivery processes that associate a demand order for a product with a supply order detail that will satisfy the demand order.

10. A framework as defined in claim 9, wherein the cooperating objects identifying stock transaction activities contain object classes comprising Manual Stock Transactions activities wherein a change to the warehouse inventory of products is made immediately upon a Manual Stock Transactions activity.

11. A framework as defined in claim 9, wherein the Stock Control category further includes object classes identifying stock transaction activities comprising stock reception, picking, and shipment.

12. An object oriented extensible warehouse control system framework that includes a plurality of pre-defined object oriented classes that may be extended by a user for use in a computer system having an operating system that supports an object oriented programming environment and includes a memory in which cooperating objects comprising object classes can be stored, the framework providing an extensible warehouse control system for a Company specified by a data object and further including:
    a Warehouse Internal mechanism comprising a Logistics Company category of cooperating objects that identify one or more warehouses of the Company, and
    a Warehouse External mechanism comprising a Stock Control category of cooperating objects that identify stock control activities of the Company.

13. A framework as defined in claim 12, wherein:
the Logistics Company category of cooperating objects further contains object classes that identify an inventory of products and identify costing methods followed by the Company with respect to the products, and
the Stock Control category of cooperating objects further contains object classes that identify stock control activities and perform the identified stock control activities on the warehouse inventory of products such that the cooperating objects update the product inventory as a result of performing the identified stock control activities.

14. A framework as defined in claim 13, wherein the Warehouse Internal mechanism further includes a Stock Transactions category of cooperating objects that identify stock transaction activities comprising additions and deletions of the products from the warehouse inventory of products, and that adjust the warehouse inventory of products in accordance with the stock transaction activities.

15. A framework as defined in claim 13, wherein the Warehouse External mechanism further includes cooperating objects containing object classes that identify a sales order to which a future stock reception will be directed.

16. A framework as defined in claim 13, wherein the Warehouse External mechanism further includes cooperating objects containing object classes that identify Kit Assembly processes that specify product components that may be assembled into complete products and perform data update actions to track the assembly of warehouse inventory into assembled complete products.

17. A framework as defined in claim 13, wherein the Warehouse External mechanism further includes cooperating objects containing object classes that identify Back to Back Order Delivery processes that associate a demand order for a product with a supply order detail that will satisfy the demand order.

18. A program product data storage device, tangibly embodying a program of machine-readable instructions executable by a computer system having an operating system that supports an object oriented programming environment, the program product comprising:
a recordable media;
an object oriented framework recorded on the recordable media, the framework providing an extensible warehouse control system, the framework including a plurality of predefined object oriented classes that may be extended by a user, the framework having
a Warehouse Internal mechanism comprising a Logistics Company category of cooperating objects that identify one or more warehouses of the Company, and
a Warehouse External mechanism comprising a Stock Control category of cooperating objects that identify stock control activities of the Company.

19. A program product s defined in claim 18, wherein:
the Logistics Company category of cooperating objects further contains object classes that identify an inventory of products and identify costing methods followed by the Company with respect to the products, and
the Stock Control category of cooperating objects further contains object classes that identify stock control activities and perform the identified stock control activities on the warehouse inventory of products such that the cooperating objects update the product inventory as a result of performing the identified stock control activities.

20. A program product as defined in claim 19, wherein the Warehouse Internal mechanism further includes a Stock Transactions category of cooperating objects that identify stock transaction activities comprising additions and deletions of the products from the warehouse inventory of products, and that adjust the warehouse inventory of products in accordance with the stock transaction activities.

21. A program product as defined in claim 20, wherein the cooperating objects identifying stock transaction activities contain object classes comprising Manual Stock Transactions activities wherein a change to the warehouse inventory of products is made immediately upon a Manual Stock Transactions activity.

22. A program product as defined in claim 20, wherein the Stock Control category further includes object classes identifying stock transaction activities comprising stock reception, picking, and shipment.

23. A program product as defined in claim 22, wherein the Warehouse External mechanism further includes cooperating objects containing object classes that identify a sales order to which a future stock reception will be directed.

24. A program product as defined in claim 22, wherein the Warehouse External mechanism further includes cooperating objects containing object classes that identify Kit Assembly processes that specify product components that may be assembled into complete products and perform data update actions to track the assembly of warehouse inventory into assembled complete products.

25. A program product as defined in claim 22, wherein the Warehouse External mechanism further includes cooperating objects containing object classes that identify Back to Back Order Delivery processes that associate a demand order for a product with a supply order detail that will satisfy the demand order.

26. A method of distributing a program product, the method comprising the steps of:
establishing a connection between a first computer system and a second computer system; and
transmitting the program product from the first computer system to the second computer system, wherein the program product comprises an object oriented framework that includes a plurality of pre-defined object oriented classes that may be extended by a user, the framework providing an extensible warehouse control system, the framework having
a Warehouse Internal mechanism comprising a Logistics Company category of cooperating objects that identify one or more warehouses of the Company, and
a Warehouse External mechanism comprising a Stock Control category of cooperating objects that identify stock control activities of the Company.

27. A method as defined claim 26, wherein:
the Logistics Company category of cooperating objects further contains object classes that identify an inventory of products and identify costing methods followed by the Company with respect to the products, and
the Stock Control category of cooperating objects further contains object classes that identify stock control activities and perform the identified stock control activities on the warehouse inventory of products such that the cooperating objects update the product inventory as a result of performing the identified stock control activities.

28. A method as defined in claim 27, wherein the Warehouse Internal mechanism further includes a Stock Transactions category of cooperating objects that identify stock transaction activities comprising additions and deletions of the products from the warehouse inventory of products, and that adjust the warehouse inventory of products in accordance with the stock transaction activities.

29. A method as defined in claim 28, wherein the cooperating objects identifying stock transaction activities contain object classes comprising Manual Stock Transactions activities wherein a change to the warehouse inventory of products is made immediately upon a Manual Stock Transactions activity.

30. A method as defined in claim 28, wherein the Stock Control category further includes object classes identifying stock transaction activities comprising stock reception, picking, and shipment.

31. A method as defined in claim 28, wherein the Warehouse External mechanism further includes cooperating objects containing object classes that identify a sales order to which a future stock reception will be directed.

32. A method as defined in claim 28, wherein the Warehouse External mechanism further includes cooperating objects containing object classes that identify Kit Assembly processes that specify product components that may be assembled into complete products and perform data update actions to track the assembly of warehouse inventory into assembled complete products.

33. A method as defined in claim 28, wherein the Warehouse External mechanism further includes cooperating objects containing object classes that identify Back to Back Order Delivery processes that associate a demand order for a product with a supply order detail that will satisfy the demand order.

* * * * *